(12) United States Patent
Hadani et al.

(10) Patent No.: US 12,101,145 B2
(45) Date of Patent: Sep. 24, 2024

(54) LOCALIZATION AND AUTO-CALIBRATION IN A WIRELESS NETWORK

(71) Applicant: Cohere Technologies, Inc., Santa Clara, CA (US)

(72) Inventors: Ronny Hadani, Santa Clara, CA (US); Shlomo Selim Rakib, Santa Clara, CA (US)

(73) Assignee: Cohere Technologies, Inc., San Jose, CA (US)

( * ) Notice: Subject to any disclaimer, the term of this patent is extended or adjusted under 35 U.S.C. 154(b) by 0 days.

(21) Appl. No.: 18/006,470

(22) PCT Filed: Aug. 2, 2021

(86) PCT No.: PCT/US2021/071086
§ 371 (c)(1),
(2) Date: Jan. 23, 2023

(87) PCT Pub. No.: WO2022/027073
PCT Pub. Date: Feb. 3, 2022

(65) Prior Publication Data
US 2023/0268964 A1   Aug. 24, 2023

Related U.S. Application Data

(60) Provisional application No. 62/706,114, filed on Jul. 31, 2020.

(51) Int. Cl.
*H04B 7/0456*   (2017.01)
*H04B 7/06*   (2006.01)

(52) U.S. Cl.
CPC .......... *H04B 7/0486* (2013.01); *H04B 7/063* (2013.01); *H04B 7/0632* (2013.01)

(58) Field of Classification Search
CPC .... H04B 7/0486; H04B 7/061; H04B 7/0619; H04B 7/063; H04B 7/0632; H04L 25/0202; H04L 25/0222; H04W 16/00; H04W 16/18; H04W 64/003
USPC ......... 375/259, 260, 262, 267; 370/328–330, 370/332, 343, 345; 455/440, 443, 446,
(Continued)

(56) References Cited

U.S. PATENT DOCUMENTS

2005/0206566 A1   9/2005  Stilp et al.
2008/0310405 A1   12/2008 Cox et al.
2014/0093005 A1   4/2014  Xia et al.
(Continued)

OTHER PUBLICATIONS

Examination Report for co-pending Australian Application No. 2021316062 dated Aug. 23, 2023, 4 pages.
(Continued)

*Primary Examiner* — Young T. Tse
(74) *Attorney, Agent, or Firm* — Perkins Coie LLP

(57) ABSTRACT

Methods, systems and devices for wireless communication, which include localization and auto-calibration, are described. One example method includes receiving, at a wireless device, signal transmissions from one or more network devices, and generating, by processing the signal transmissions, a feedback signal for antenna calibration of the one or more network devices. In some embodiments, the antenna calibration is used for performing device localization and feature map generation that is subsequently used for scheduling transmissions in a wireless network.

20 Claims, 56 Drawing Sheets

(58) Field of Classification Search
USPC ...... 455/456.1, 456.5, 456.6, 500, 513, 524, 455/63.2, 67.11, 69
See application file for complete search history.

(56) References Cited

U.S. PATENT DOCUMENTS

| | | | |
|---|---|---|---|
| 2017/0325210 A1* | 11/2017 | Green | H04W 72/51 |
| 2019/0097712 A1 | 3/2019 | Singh et al. | |
| 2019/0260495 A1* | 8/2019 | Nammi | H04L 1/0016 |
| 2020/0081130 A1* | 3/2020 | Modarres Razavi | G01S 19/44 |
| 2021/0152307 A1* | 5/2021 | Takeda | H04L 25/0224 |
| 2022/0029685 A1* | 1/2022 | Li | H04B 7/0626 |

OTHER PUBLICATIONS

International Search Report and Written Opinion for PCT/US2021/071086, dated Dec. 14, 2021, 10 pages.
Second Examination Report for co-pending Australian Application No. 2021316062 dated Mar. 15, 2024 3 pages.
Notice of Acceptance for co-pending Australian Application No. 2021316062 dated Mar. 26, 2024 4 pages.

* cited by examiner

| Persons | Job | | | |
|---|---|---|---|---|
| | J1 | J2 | J3 | J4 |
| I | 86 | 78 | 62 | 81 |
| II | 55 | 79 | 65 | 60 |
| III | 72 | 65 | 63 | 80 |
| IV | 86 | 70 | 65 | 71 |
| V | 72 | 70 | 71 | 60 |

FIG. 28

LOCALIZATION AND AUTO-CALIBRATION IN A WIRELESS NETWORK

CROSS-REFERENCE TO RELATED APPLICATION

The present document is a 371 of International Patent Application No. PCT/US2021/071086, filed Aug. 2, 2021 which claims priority to and benefits of U.S. Provisional Application No. 62/706,114, filed on Jul. 31, 2020, the disclosure of which is hereby incorporated by reference herein in its entirety.

TECHNICAL FIELD

The present document relates to wireless communication.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks. Many of those activities involve situations in which a large number of user devices may be served by a network.

SUMMARY

This document discloses techniques that may be used by wireless networks to achieve several operational improvements.

In one example aspect, a wireless communication method is disclosed. The method includes receiving, at a wireless device, signal transmissions from one or more network devices, and generating, by processing the signal transmissions, a feedback signal for antenna calibration of the one or more network devices.

In another example aspect, a wireless communication method is disclosed. The method includes transmitting one or more transmissions from one or more network devices to one or more wireless devices in a coverage area, receiving feedback reports from the one or more network devices based on the one or more transmissions, determining geographic locations of the one or more wireless device based on the feedback reports, and performing antenna calibration to adjust an antenna angle bias for the one or more network devices.

In yet another example aspect, a wireless communication method is disclosed. The method includes generating, for a coverage area comprising user devices, a feature map that includes information about channel quality parameters at multiple geographical locations in the coverage area and channel quality estimates for the user devices, wherein the feature map stored as a function of time, predicting, based on a first snapshot of the feature map at a first time, a second snapshot of the feature map at a second time in future, and controlling transmissions in the coverage area based on the predicted second snapshot.

In yet another example aspect, a wireless communication method is disclosed. The method includes estimating, by a network device, using a signal transmission received from a wireless device, a spatial orientation estimate of the wireless device, and using the spatial orientation estimate for planning a future communication to or from the wireless device.

In yet another example aspect, a wireless communication apparatus that implements the above-described methods is disclosed.

In yet another example aspect, a wireless system in which one or more of the above described methods are implemented is disclosed.

In yet another example aspect, the method may be embodied as processor-executable code and may be stored on a computer-readable program medium.

In yet another aspect, a wireless communication system that operates by providing a single pilot tone for channel estimation is disclosed.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

FIG. 28 shows an example data representation in a tabular form.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion or the embodiments to the respective sections only. Furthermore, certain standard-specific terms are used for illustrative purpose only, and the disclosed techniques are applicable to any wireless communication systems.

In wireless communication, to achieve greater throughput in wireless communication, transmission beams may be used to limit the radiated bandwidth along a certain direction between a transmitter device and an intended receiver of that transmission. A transmitter may be configured to provide wireless transmissions to multiple receiver devices, such as a base station in a wireless network. A pre-coding technique may be applied to achieve the beamforming. The pre-coding often tends to be geometric in nature and attempts to steer the beam in a particular direction while adding nulls in certain other directions. To be able to achieve effective pre-coding it is useful to have the antenna accurately calibrated.

However, in practical wireless systems, presently there are no techniques available to systematically measure antenna directions and no reference signals are used for calibration or measurement of antenna angular or gain distortion. The bias due to angular misalignment might enter computations of gain, phase and channel measurements.

The techniques described in the present document provide techniques for measurements of angular positioning of antennas, localization of receivers that helps with the angular positioning of antenna and using this information to provide additional improvements to the operation of a wireless network including, e.g., more throughput, better scheduling of data traffic and other advantages described throughout the present document.

1. Example Wireless Systems

Figure 1:
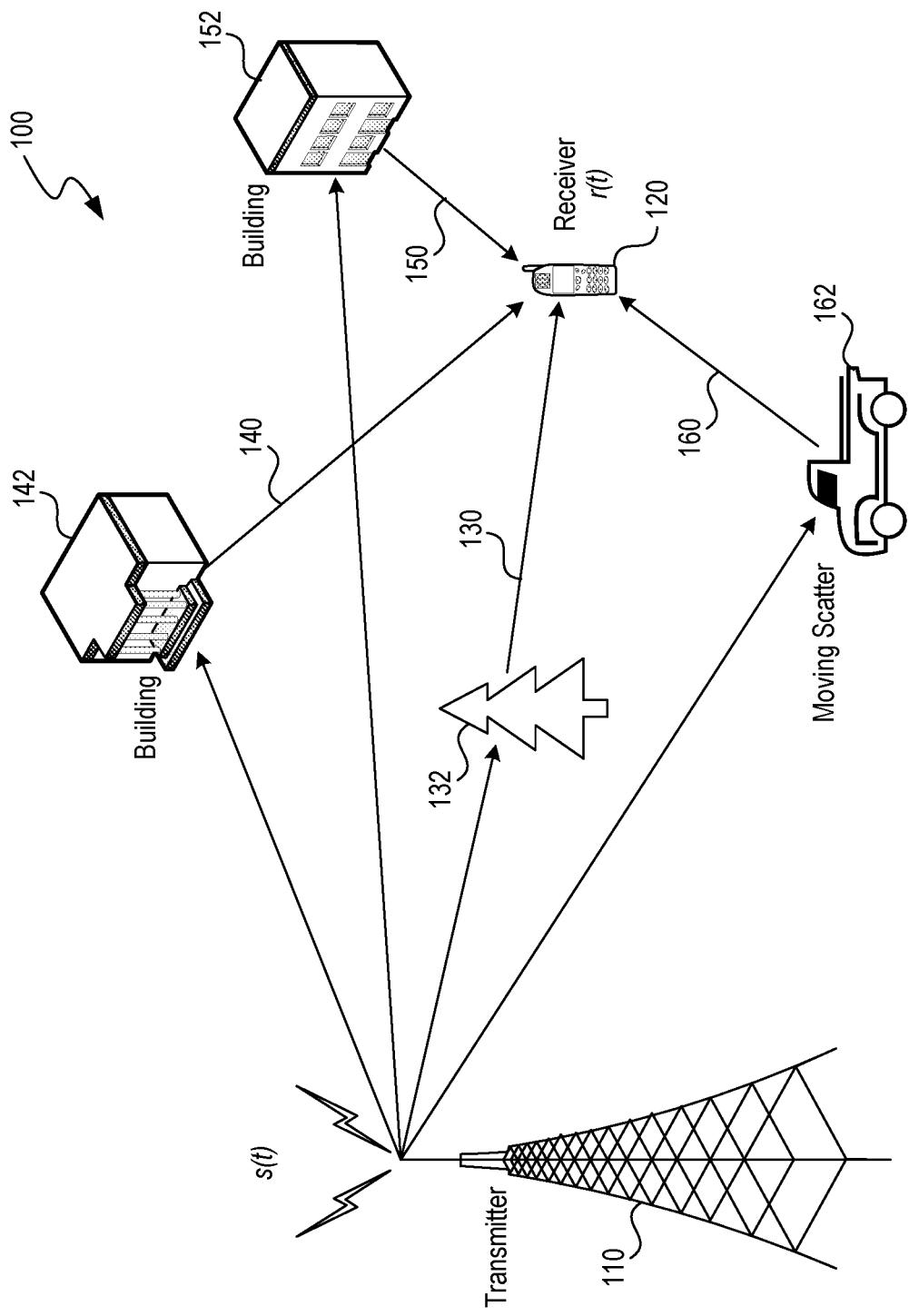
FIG. 1 shows an example communication network.

FIG. 1 shows an example of a wireless communication system 100 in which a transmitter device 102 transmits signals to a receiver 104. The signals may undergo various wireless channels and multipaths, as depicted. Some reflectors such as buildings and trees may be static, while others such as cars, may be moving scatterers. The transmitter device 102 may be, for example, a user device, a mobile phone, a tablet, a computer, or another Internet of Things (IoT) device such as a smartwatch, a camera, and so on. The receiver device 104 may be a network device such as the base station. The signals transmitted from the base station to the transmitter 102 may experience similar channel degradations produced by static or moving scatterers. The techniques described in the present document may be implemented by the devices in the wireless communication system 100. The terms "transmitter" and "receiver" are simply used for convenience of explanation and, as further described herein, depending on the direction of transmission (uplink or downlink), the network station may be transmitting or receiving and user device may be receiving or transmitting.

Figure 2:
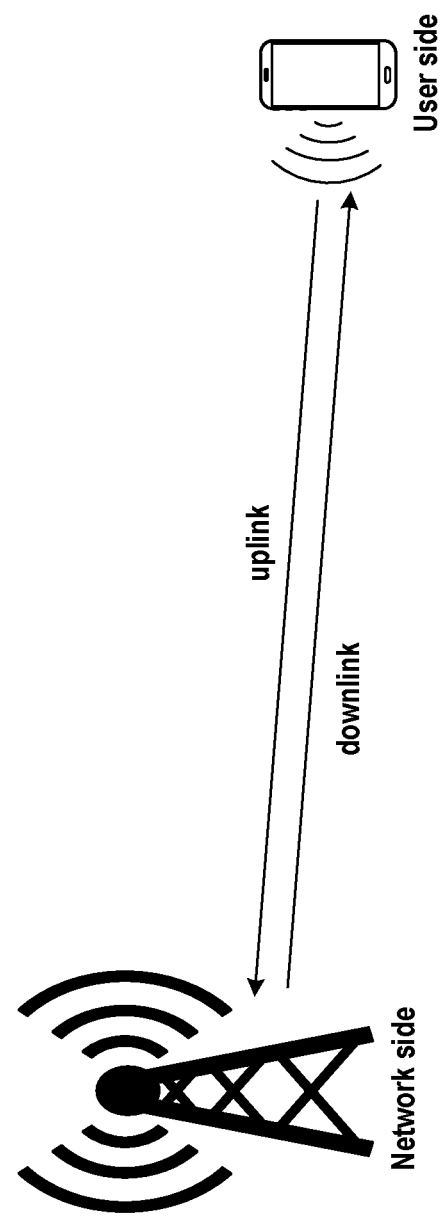
FIG. 2 shows a simplified example of a wireless communication system in which uplink and downlink transmissions are performed.

FIG. 2 shows a simplified wireless network to highlight certain aspects of the disclosed technology. A transmitter transmits wireless signals to a receiver in the wireless network. Some transmissions in the network, variously called as downlink or downstream transmissions, a network-side node such as a base station acts as a transmitter of wireless signals and one or more user devices act as the receiver of these wireless signals. For some other transmissions, as depicted in FIG. 2, the direction of transmission may reversed. Such transmissions are often called uplink or upstream transmissions. For such transmissions, one or more user devices act as transmitters of the wireless signals and a network-side node such as the base station acts as the receiver of these signals (as depicted in FIG. 2). Other type of transmissions in the network may include device-to-device transmissions, sometimes called direct or sideband transmissions. While the present document primarily uses the terms "downlink" and "uplink" for the sake of convenience, similar techniques may also be used for other situations in which transmissions in two directions are performed—e.g., inbound or incoming transmissions that are received by a wireless device and outbound or outgoing transmissions that are transmitted by a wireless device. For example, downlink transmissions may be inbound transmissions for a user device, while outbound transmissions for a network device. Similarly, uplink transmission may be inbound transmissions for a network device while outbound transmissions from a wireless device. Therefore, for some embodiments, the disclosed techniques may also be described using terms such as "inbound" and "outbound" transmission without importing any 3GPP-specific or other wireless protocol-specific meaning to the terms "uplink" and "downlink."

In frequency division multiplexing (FDM) networks, the transmissions to a base station and the transmissions from the base station may occupy different frequency bands (each of which may occupy continuous or discontinuous spectrum). In time division multiplexing (TDM) networks, the transmissions to a base station and the transmissions from the base station occupy a same frequency band but are separated in time domain using a TDM mechanism such as time slot based transmissions. Other types of multiplexing are also possible (e.g., code division multiplexing, orthogonal time frequency space, or OTFS, multiplexing, spatial multiplexing, etc.). In general, the various multiplexing schemes can be combined with each other. For example, in spatially multiplexed systems, transmissions to and from two different user devices may be isolated from each other using directional or orientational difference between the two end points (e.g., the user devices and a network station such as a base station).

2. Brief Discussion

Figure 3:
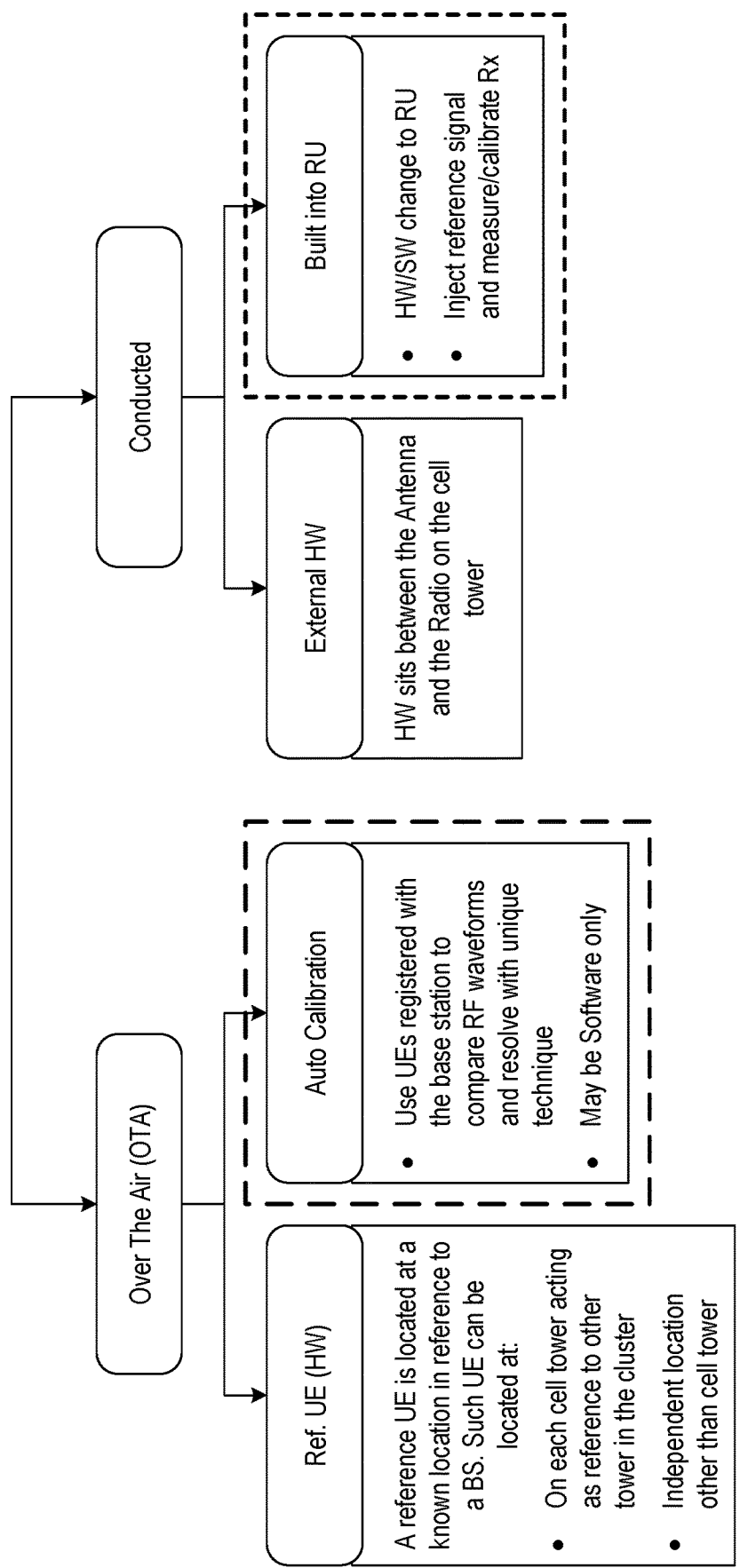
FIG. 3 is a pictorial description of various options for calibration of a receiver.

FIG. 3 is a pictorial description of various options for calibration of a receiver. To be effectively able to us a zero forcing technique for user multiplexing in a wireless system, it is advantageous to calibrate the transmit side (Tx) so that the zero-forcing effectively works by minimizing unwanted signal leakage to other receivers. However, in addition to calibration of the Tx side, it may also be useful to calibrate the receive side (Rx) for forming beams that maximize inband transmission while minimizing out-of-band signal energy. As shown in FIG. 3, Rx calibration may be performed using two approaches. In the over the air (OTA) approach, shown on left side of the drawing, in a first method, reference UE hardware may be used. The reference UE may be placed at a known location in reference to a base station. The location may be, e.g., each cell tower in order to measure transmissions from other neighboring cell towers, or another location in a wireless cell. Using a second method, auto-calibration may be performed using UEs registered with a base station to compare RF waveforms and resolve. Such an implementation may be deployed as a software-only solution.

As shown on the right-hand side of FIG. 3, the calibration may be performed in a conducted manner as follows. In some embodiments, external hardware may be positioned between antenna and radio portion of a cell tower to perform the calibration. In some embodiments, the calibration function may be built into the radio unit (RU). For example, a reference signal may be injected in the received transmissions for measuring and calibrating the Rx. If equipped with this capability, and when needed, the integrated RU should initiate a self-calibration of the relative phase, gain and delay between transmit antenna ports.

To create sufficiently accurate beam patterns with a uniform linear array antenna, the calibrated radio may meet the following specifications between transmit antenna ports:

Maximum phase variation: 2 degrees
Maximum gain variation: 0.25 dB
Maximum delay variation: 0.15 ns A delay of 0.15 ns assuming a propagation velocity of 0.7c (c is speed of light) corresponds to 3.2 cm, so it is feasible that this degree of delay matching can be met by such an implementation or a one-time calibration in manufacturing.

Figure 4:
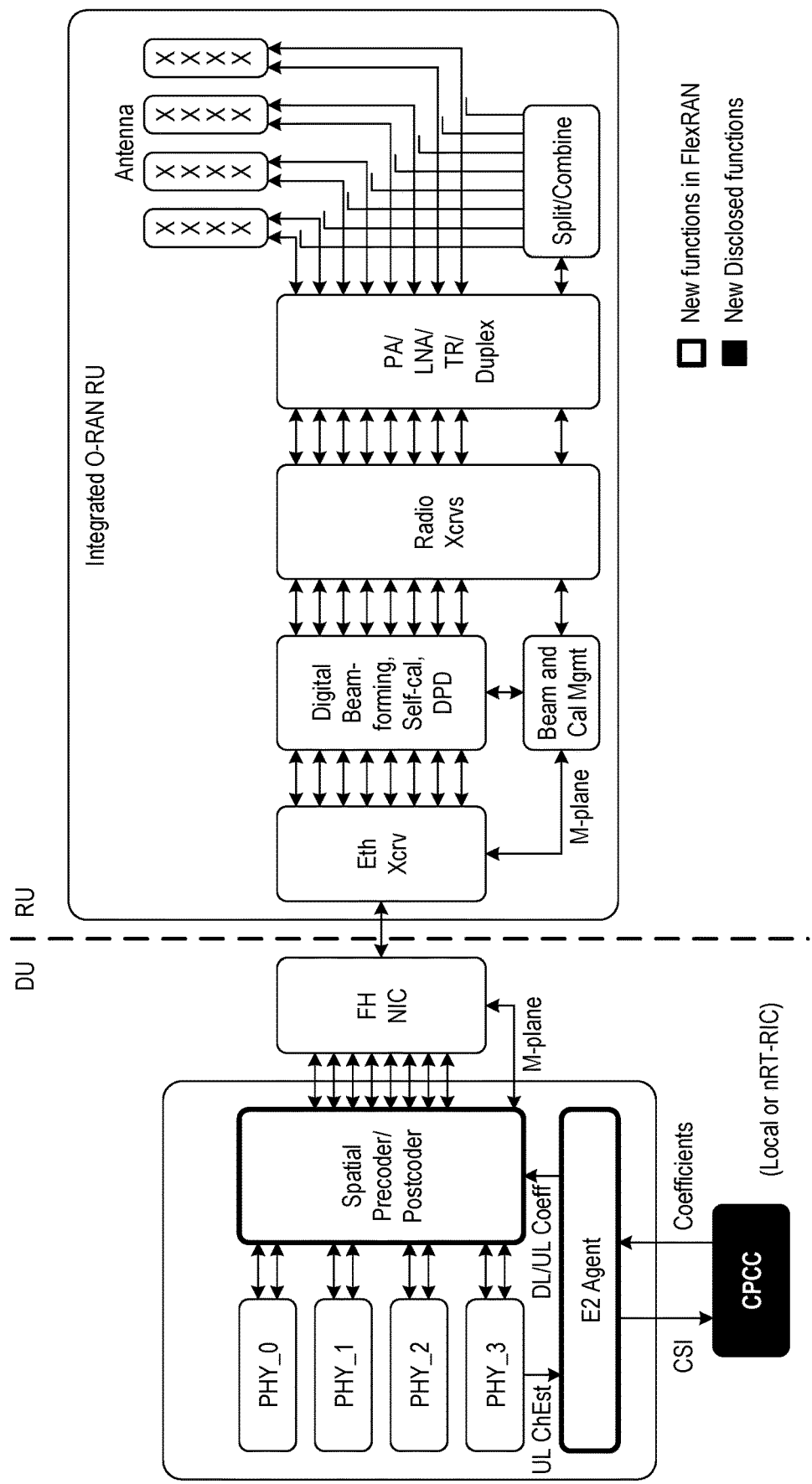
FIG. 4 is a block diagram of an example implementation of an integrated radio unit (RU) and a distributed unit (DU) in a wireless network.

FIG. 4 is a block diagram of interfacing between an example implementation of an integrated radio unit (RU) and a distributed unit (DU) in a wireless network. Various functions on the left correspond to distributed unit (DU) functionality and functions shown on the right corresponds to functions performed by a radio unit (RU). The RU shown in FIG. 4 is an example of an integrated Open RAN (O-RAN) RU, which enables the DU to be developed and implemented independently from the development and implementation of the RU.

As shown in FIG. 4, the DU functions include multiple physical (PHY) layer protocol stack implementations, a spatial precoder or postcoder, and an E2 agent. The E2 agent may interface with the CPCC (channel prediction, channel calibration) function to communicate channel state information (CSI) to the CPCC and receive coefficient estimates for the channel. The E2 agent may receive uplink channel estimates from the PHY layer protocol stack implementations and may provide the downlink or uplink coefficients to the spatial precoder or postcoder. The CPCC in the O-RAN architecture is implemented based on a near Real-Time RAN Intelligent Controller (nRT-RIC). In some embodiments, the nRT-RIC may be configured to use artificial intelligence (AI) or machine learning (ML) models for radio network automation, e.g., determining downlink and uplink coefficients based on channel state information (CSI). In other embodiments, the nRT-RIC may be configured to use the AI and ML models to implement radio resource management (RRM) functions, e.g., traffic steering, mobility management, and/or interference management. In the embodiments described herein, the nRT-RIC is generally configured to control and optimize RAN elements and resources via fine-grained data collection and actions via the E2 agent (as shown in FIG. 4).

The spatial precoding or postcoding function in the DU communicates using a network interface (e.g., a network interface card (NIC) or backbone fiber interface) with a radio unit (RU). The RU may include network interfaces (e.g., ethernet transceivers) that receive and send data (often referred to as Fronthaul Transport), a digital beam-forming and/or self-calibration module (e.g., part of the lower PHY modules) that may be coupled with radio transceivers (e.g., part of the digital front-end) that are in turn coupled with multiple antennas (e.g., part of the RF front-end) through a splitter/combiner. As shown in FIG. 4, the network interfaces in the DU and RU communicate with functions in their respective units using the management plane (M-plane).

Figure 5:
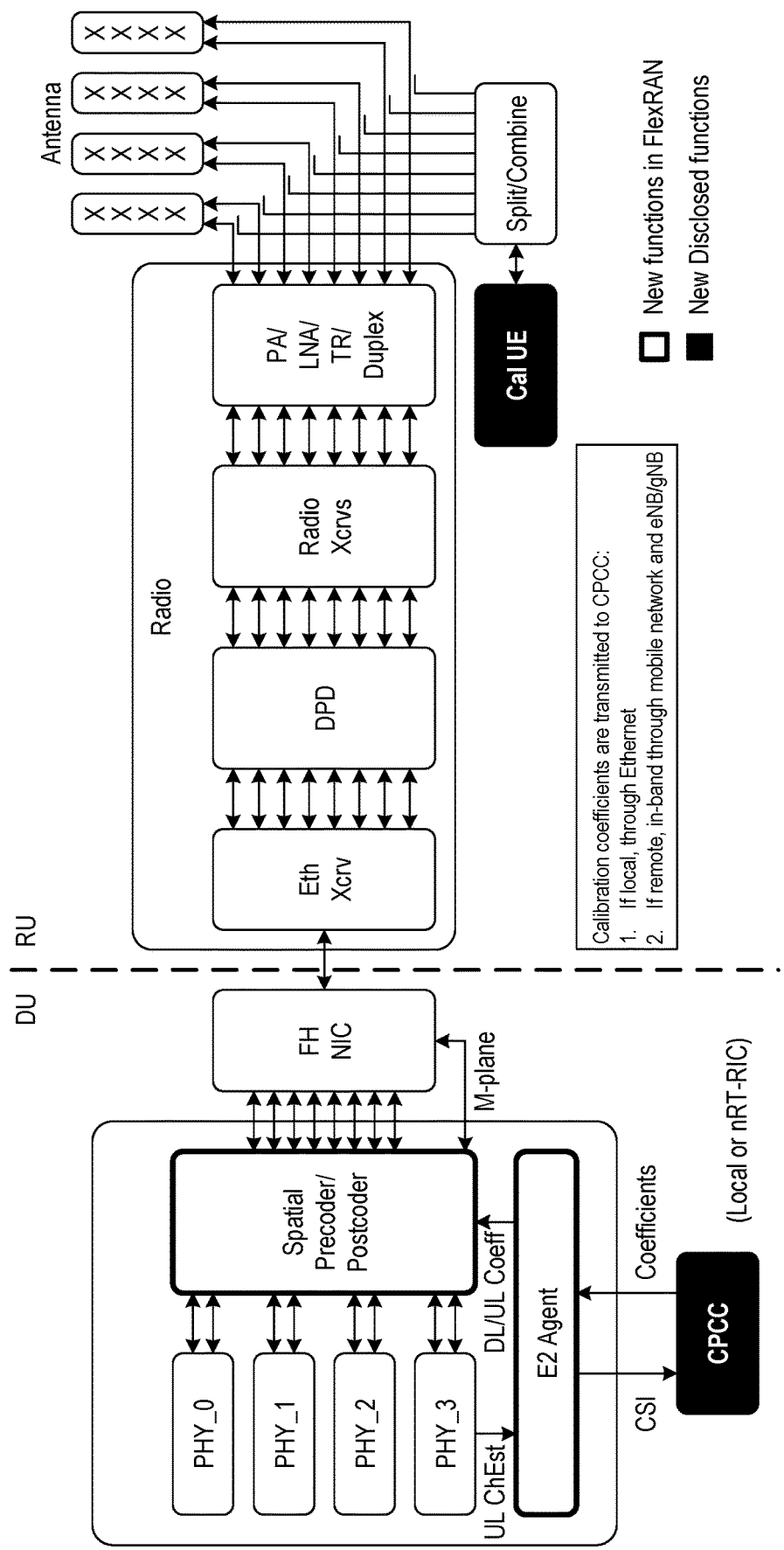
FIG. 5 is a block diagram of an example embodiment in which radio and antenna are separately shown.

FIG. 5 is a block diagram of an example embodiment in which radio and antenna are separately shown. In comparison with the implementation in FIG. 4, the block diagram shown in FIG. 5 may have separate radio and antenna implementations. In this configuration, calibration coefficients may be transmitted to the CPCC through a local ethernet connection, or through an in-band communication path in the wireless network.

Figure 6:
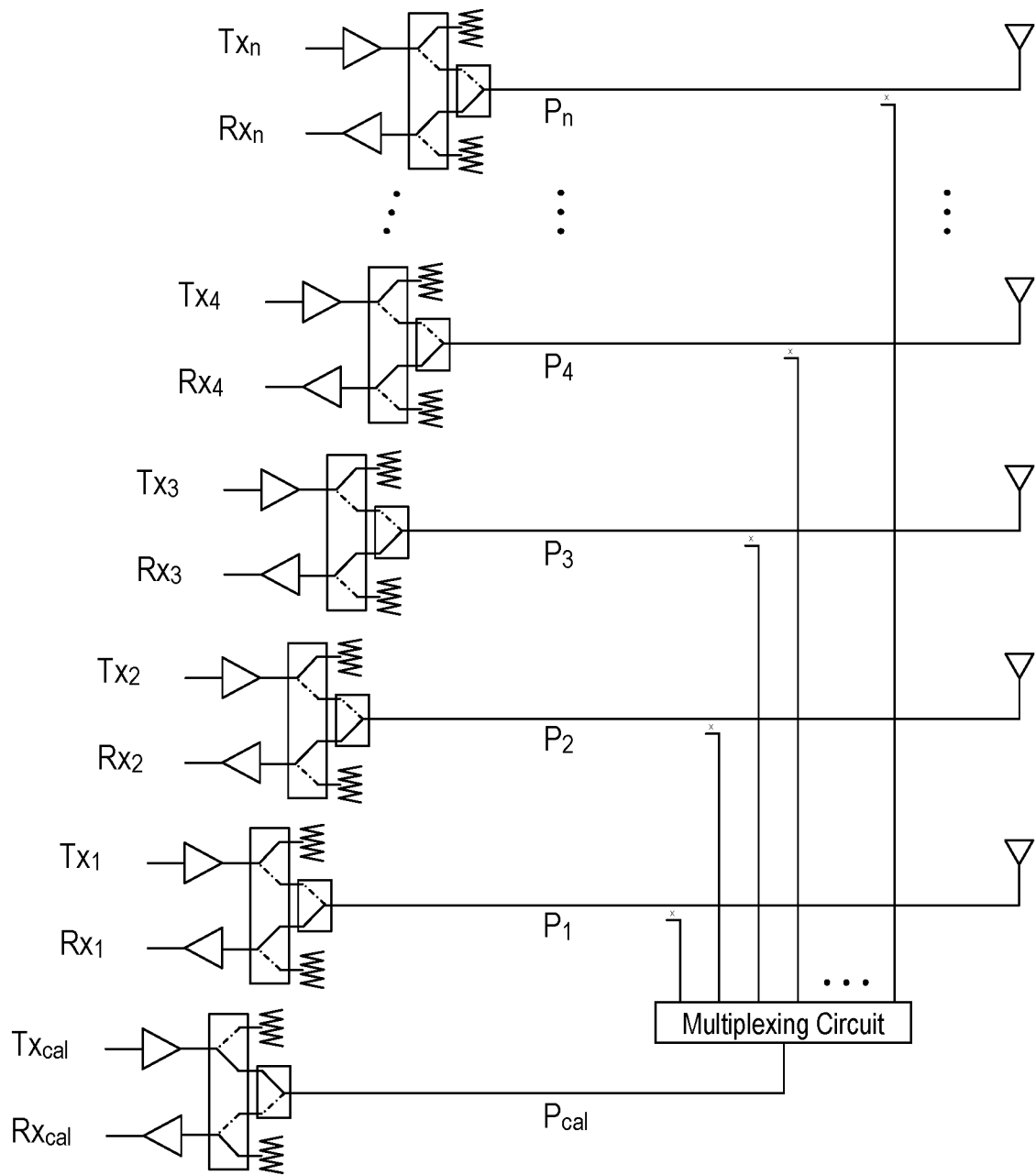
FIG. 6 depicts an example circuit for antenna calibration.

FIG. 6 depicts an example circuit for antenna calibration. For a number n of antennas (shown on right side of the drawing), the antennas are electrically coupled to corresponding transceivers. The signals from/to the antennas are also coupled to a calibration transceiver through a multiplexing circuit that is used during calibration signal transmission or reception. The calibration circuitry may be internal to the device in such embodiments. In some embodiments, calibration for the n UE-side antennas is based on feedback signals generated based on signals transmissions received from the network devices.

Figure 7:
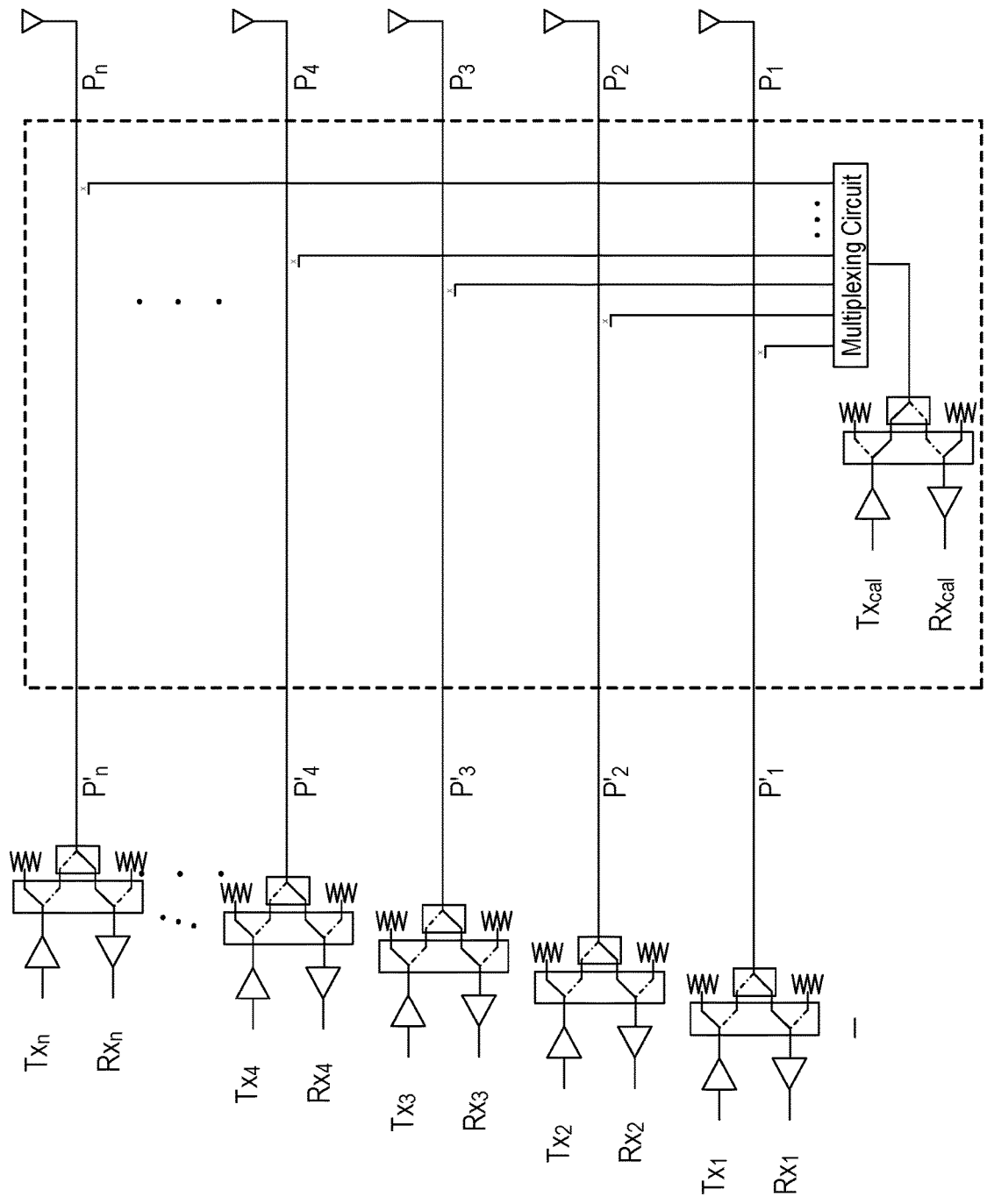
FIG. 7 depicts an example implementation in which an external calibration box is used for external antennas.

FIG. 7 depicts an example implementation in which an external calibration box is used for external antennas. In some embodiments, the external calibration box can calibrate the antennas based on feedback signals generated based on transmissions received from network devices, whose coverage area the corresponding UEs (or wireless devices) are operating in (e.g., as described in the context of FIG. 9).

Figure 8:
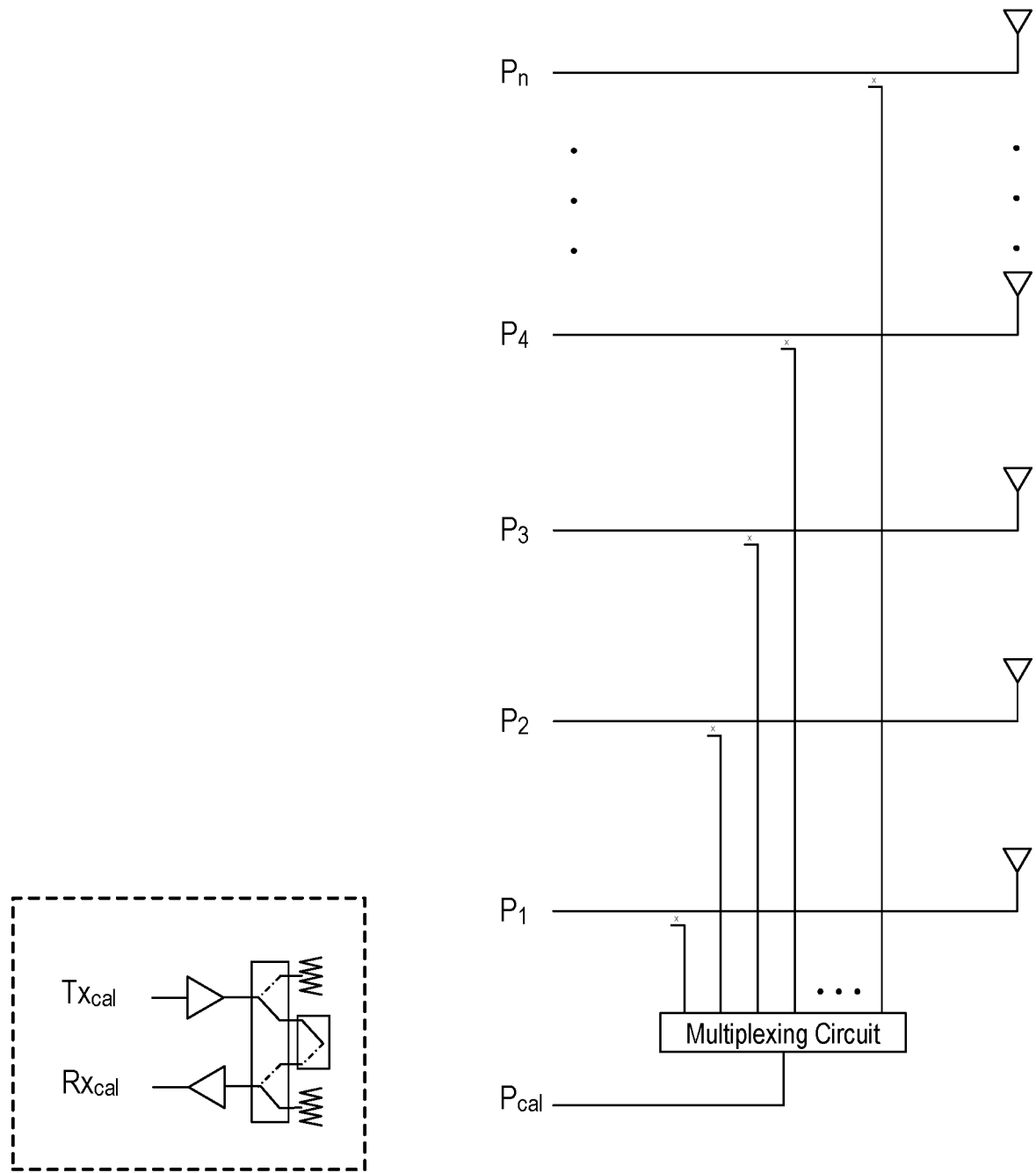
FIG. 8 shows an example implementation of antenna calibration port.

FIG. 8 shows an example implementation of an antenna calibration port. In some embodiments, the antenna calibration port is the one shown in FIG. 7.

Figure 9:
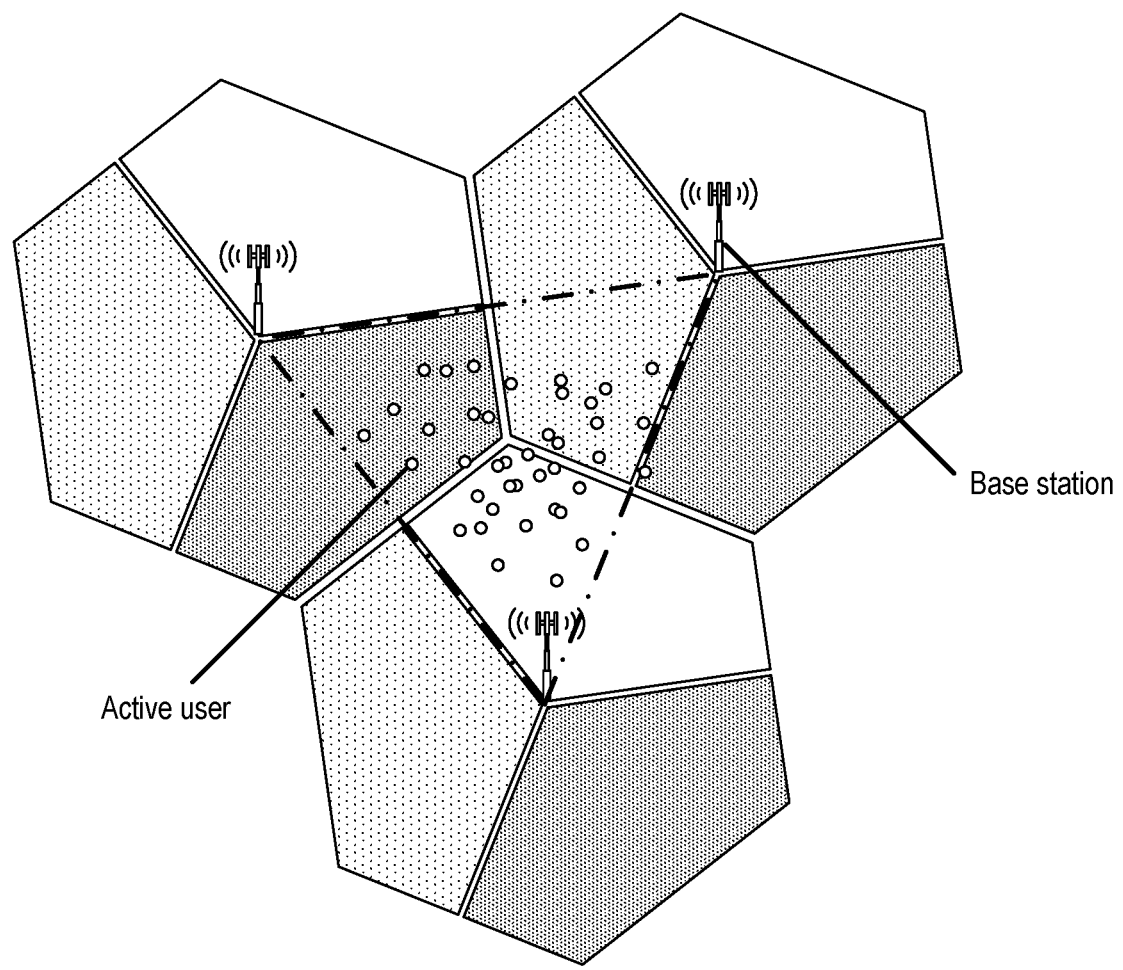
FIG. 9 shows an example configuration of three wireless cells in which receiver localization and calibration is performed.

FIG. 9 shows an example configuration of three wireless cells in which receiver localization and calibration is performed. The dashed triangle in the middle represents a region of the wireless network with dots representing various wireless devices operating within the cell. In some embodiments described in the present document, active users, whose wireless device will be frequently transmitting or receiving data from one or more of the base stations (shown at the center of the hexagons) may be used for calibrating antennas.

Figure 10:
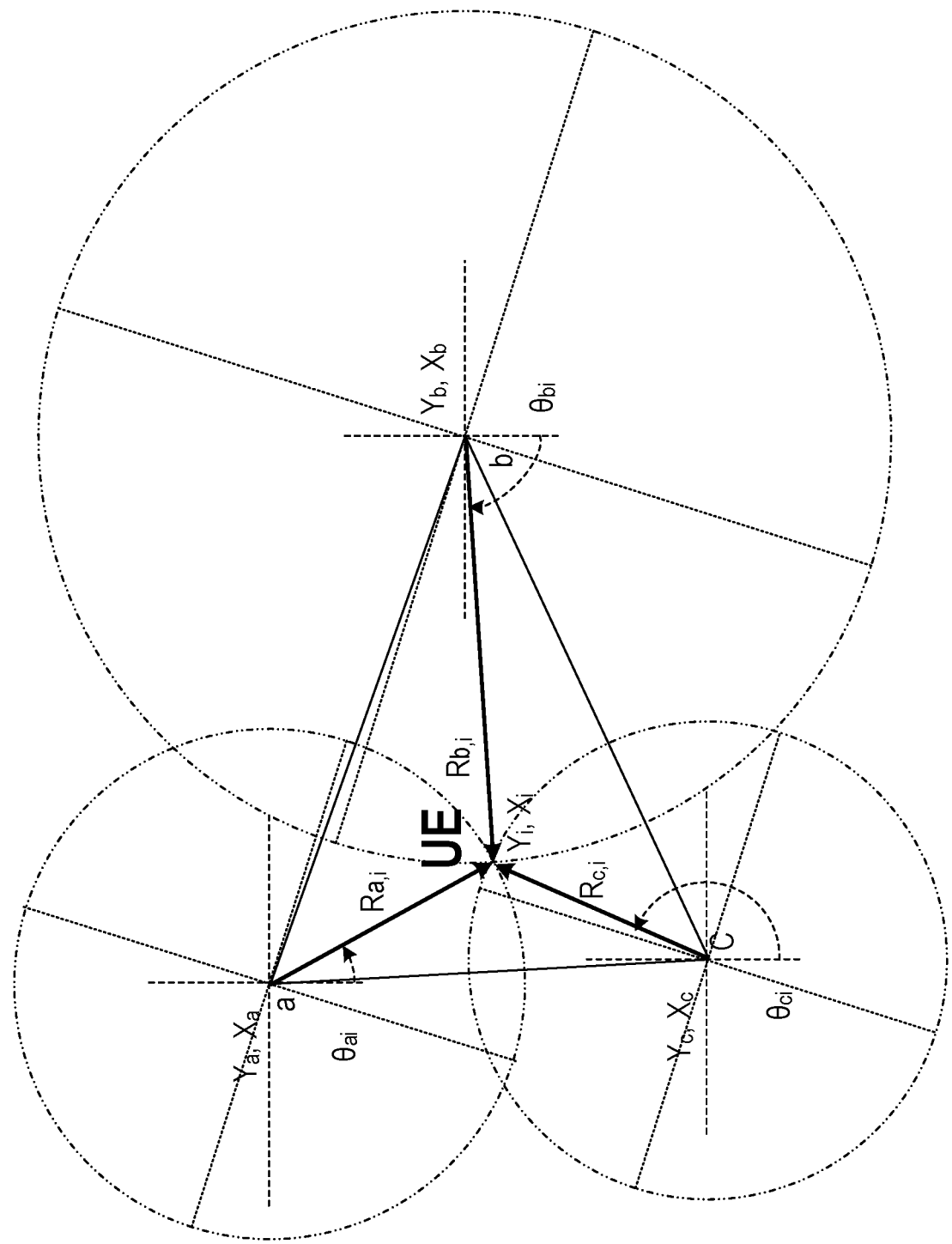
FIG. 10 shows an example implementation of a trilateration process.

FIG. 10 shows an example implementation of a trilateration process. At a UE, signals from three base stations a, b and c may be received. Based on the strength of the received circle and know attenuation characteristics of the transmission medium (e.g., air), an isobar can be drawn around each base station indicative of the locations at which the signal strength would be equal to the signal strength seen and reported by the UE. In FIG. 10, this isobar is shown as a circle for simplicity. The common intersection point of the three circles identifies the location of UE based on signal measurements.

Once UE location is known, denoted as $(X_i, Y_i)$, that information may be used along with locations of the base stations a, b, c, which are denoted as $(X_a, Y_a)$, $(X_b, Y_b)$ and $(X_c, Y_c)$, this information can be used to estimate an angle of orientation based on the straight line connected between the UE location and each base station. The straight lines are denoted as Rai, Rbi and Rci, respectively. Based on the estimated angle of orientation, and measurements from received signals, a difference between actual (observed) angle of orientation and the estimated angle of orientation based on the position of UE can be calculated (angles θ, denotes by subscripts with base station and UE identities). This difference provides an estimate of angular misalignments of the antenna arrays for each base station a, b and c, respectively.

Figure 11:
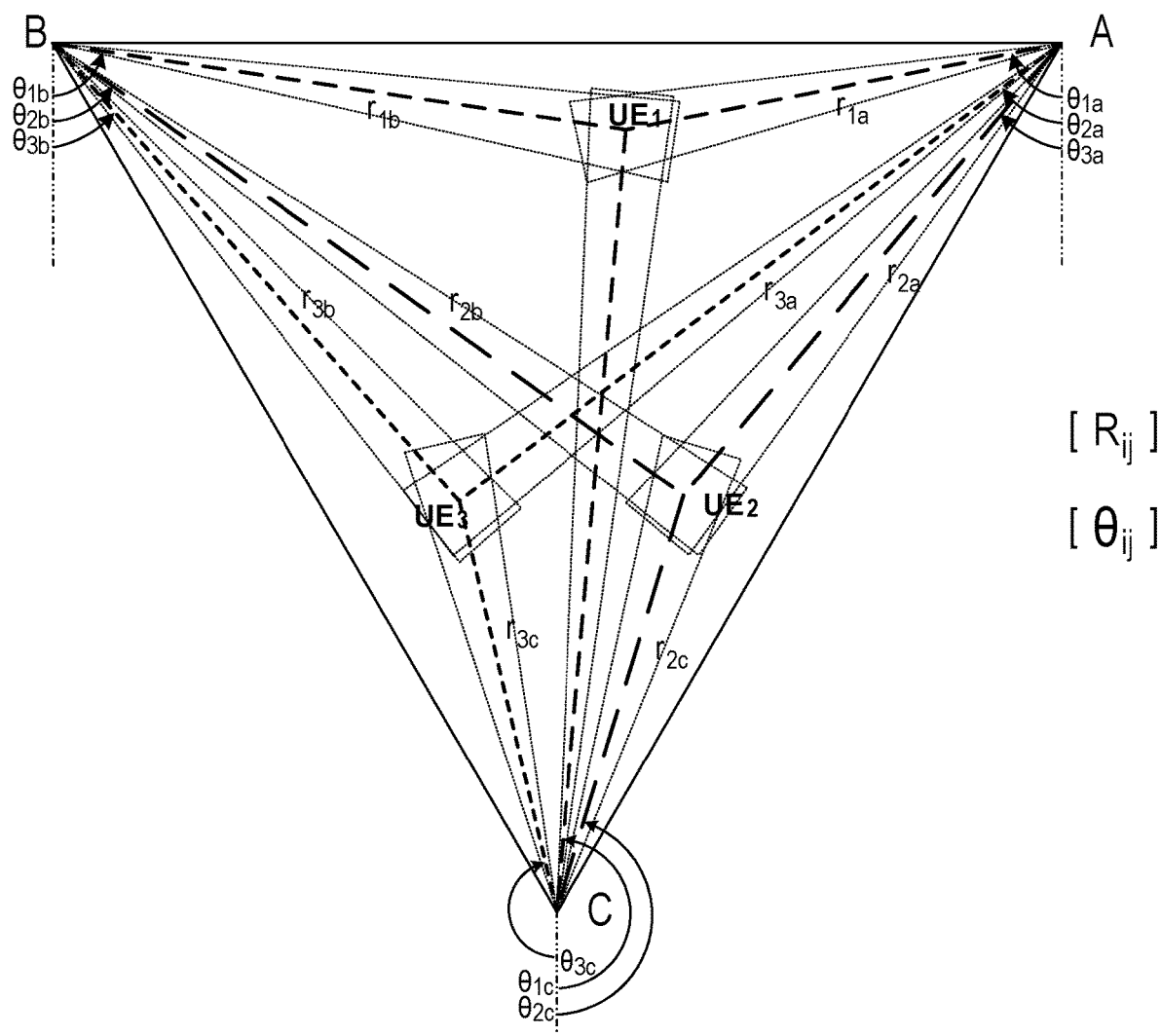
FIG. 11 shows an example implementation of receiver triangularization in a wireless network.

FIG. 11 shows an example implementation of receiver triangularization in a wireless network. The process described with respect to FIG. 10 may be repeated for several available UEs in the common coverage area (UE1, UE2 and UE3, in this example), to estimate the respective distances [Rij] and angles of orientations [θij] of UEs within the coverage area.

Figure 12:
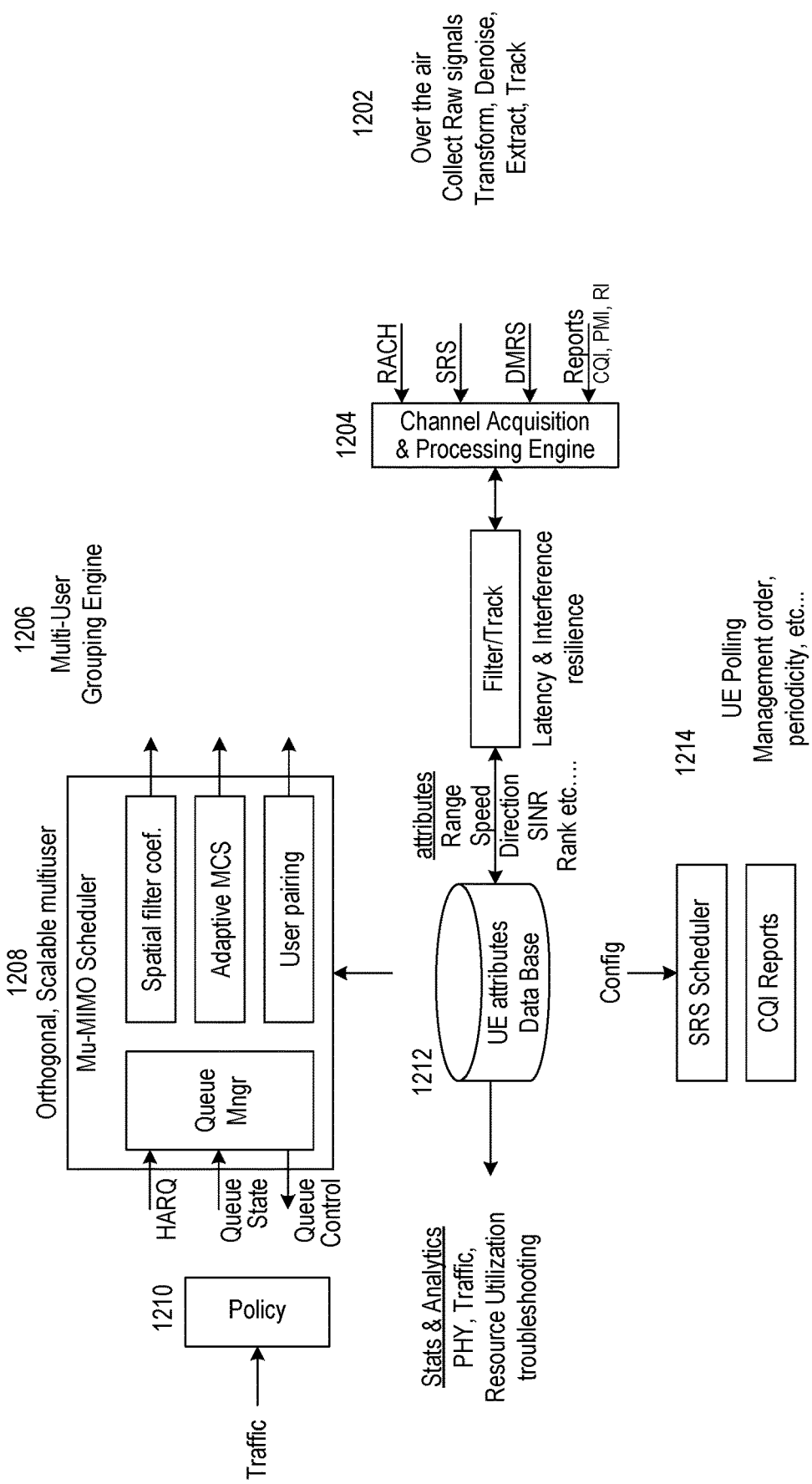
FIG. 12 is a block diagram showing example functional blocks of a multi-user multi-input multi-output (MIMO) implementation.

FIG. 12 is a block diagram showing example functional blocks of a multi-user multi-input multi-output (MIMO) implementation. At 1202, various over the air signals are collected and processed. The processing includes transformation (or inverse transformation) of signals from one domain into another domain (e.g., delay-Doppler to time frequency domain or from frequency domain to time domain). The transformed signaled may be denoised by averaging or other noise filtering techniques, and signals may be extracted. Finally, signal beams may be tracked based on the extracted signals. As depicted in 1204, examples of these signals include traditional reference signals such as demodulation reference signal (DMRS) and sounding reference signal (SRS), and transmissions on a random access channel (RACH). Other received signals may include various system reports such as channel quality indicator (CQI) information, pre-coding matrix indicator (PMI) information, resource indicator (RI) information, and so on. This information may be used by a channel acquisition and processing engine that estimates the channel between the receiver that performs the estimation and transmitter of the OTA signals. Each UE that sends this information may be tracked individually for its position and channel quality to generate information about how much latency or interference is being experienced by the UE. At the same time, such measurements may also be associated with the UE at that time, but also with the position of the UE.

Put differently, UE measurements over a period of time may be used to generate UE-specific measurements and position-specific measurements. For example, over a period of time, a given geographical location may be occupied by several UEs at different times. Accordingly, a network-side computing device may collect channel quality information from multiple UEs, and extract the commonality to associate this with the particular geographic location. By doing so, over a period of time, the network may become aware of a topology heat map (or feature map) of the channel at all geographical locations within the coverage area.

With respect to the UE-specific parameters being collected, the network may use attributes such as the UE's range, speed, direction, reported signal to interference and noise ratio (SINR), rank, and so on. This information may be added to a UE attributes database, as shown at 1212. This information, along with the position-specific attributes may be used to perform various network side calculations related to statistics and analysis for improving use of physical layer resources, managing data traffic, resource utilization and also for trouble shooting. For example, the network heat map may make the network aware of certain geographic locations that have a blind spot with respect to some or all base stations. In such cases, transmissions or receptions may be configured to avoid such blind spots by using non-blind resources such as frequencies or beam directions.

Further referring to FIG. 12, the network may also implement a control function, as shown in 1214, for managing the whole process of polling UEs for information, periodicity of report generation, scheduling of reference signals and CQI reports, and so on.

The information from the UE attributes database may also be used for grouping and scheduling of UEs. A MU-MIMO scheduler 1208 may use UE-specific and position-specific information and use this information to provide a platform for generating orthogonal, multi-user schedules using techniques, including—deciding coefficients of spatial filters used for transmitting or receiving multi-user beams, a modulation and coding scheme (MCS) decision function that is adaptive to the changing nature of a wireless environment. The scheduler 1208 may also decide user pairing and may work with a multi-user grouping engine 1206 to generate user groups that can be simultaneously served with a same transmit beam, or conversely, can share a same uplink beam.

The scheduler 1208 may further include a queue management function for scheduling data transmissions based on received HARQ response from UEs or transmit queue statuses of UEs. A traffic policy function 1210 may be used to control overall user data allocation for transmission/reception. This function may, for example, ensure that the MU-MIMO transmission grouping is performed according to a network slice instance allocated to each UE.

For example, in some embodiments, the user localization, autocalibration, uplink signal separation and downlink spatial multiplexing may be performed using the following steps.

(1) Acquire channel fingerprint relative to adjacent base stations using available emitted UE reference signals in time frequency and space
(2) Derive location from acquired channel fingerprint relative to each base stations as well as motion speed and direction.
(3) Derive direction to auto calibrate the antenna array for each base station.
(4) Calculate coefficients for any desired spatial filtering (beamforming and null steering)
(5) Apply spatial filtering and calibration to track user & enhance reference acquisition
(6) Apply spatial filtering and calibration to separate uplink users' signals
(7) Apply spatial filtering and calibration to spatially multiplex downlink users
(8) Learn feature map (capacity, interference, line-of-sight (LOS) condition, user density, traffic, etc. . . . )

Example steps for antenna calibration may include:
(A) Find the maximum likelihood location for each user based on acquired channel state Information (CSI) from participating base stations
(B) Find the maximum likelihood velocity vector for each user based on the acquired CSI
(C) Find a maximum likelihood angle to each user relative to participating base stations
(D) Estimate a sparse representation of the channel
(E) Calibrate the gain and phase of each antenna for every tone.

Figure 13:
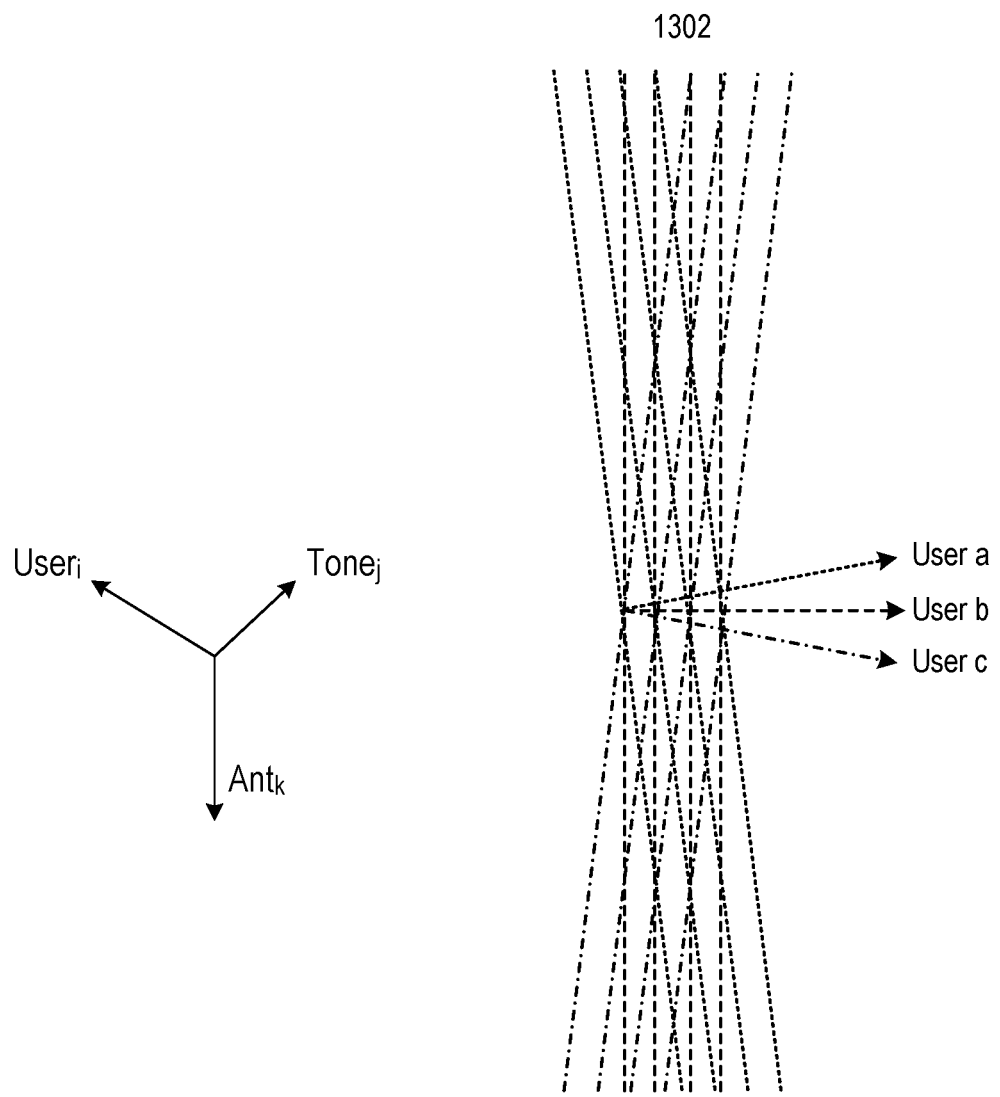
FIG. 13 depicts examples of antenna gain or phase misalignment.

In some embodiments, the above-described network management functions may further be used for managing cooperative multipoint operation and performing handover in the wireless network. For example, the following operations may be performed:
(1) Using interference (feature) map and user-specific location, handover decisions could be enhanced significantly
(2) Geometry-based CoMP based on traffic activity along with user attributes database FIG. 13 depicts examples of antenna gain or phase misalignment. As shown on the left, various localization measurements may be performed along three different independent axes—for multiple user devices, denoted as users (i), at multiple frequencies or tones, shown as tones (j) and for multiple antennas (ant). The concept of antenna gain or phase misalignment is depicted in example 1302. Each set of parallel lines represents a waveform traveling along a direction, intended to/from each of users a, b or c. Ideally, these waveforms will be traveling from left to right. However, for users a and c, due to antenna misalignment, the waveform direction is slightly off—which would result in a slightly different gain and phase of the received (or conversely transmitted) signal for these user devices.

Figure 14:
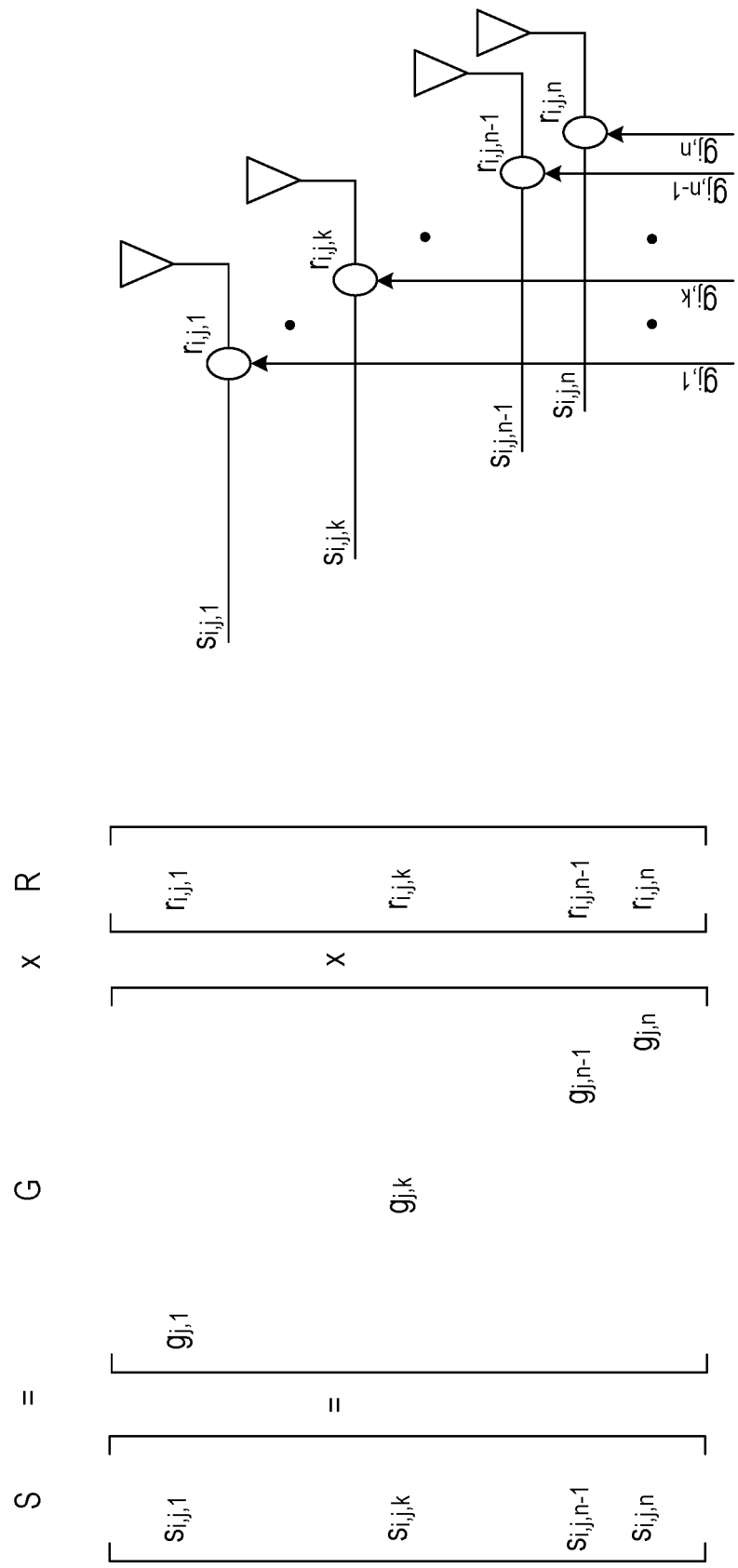
FIG. 14 depicts an example implementation of determination of antenna gain and phase misalignment.

FIG. 14 depicts an example implementation of determination of antenna gain and phase misalignment. The distortion due to misalignment may be represented as a matrix multiplication of three matrices—S, G and R. Herein, the entries of the S matrix represent actual signal transmissions that are obtained by multiplying the observed signal values r with a corresponding gain factor g. The symbols s are indexed using a triplet of indices—representing positions (i,j) of user devices and antenna index n.

Figure 15:
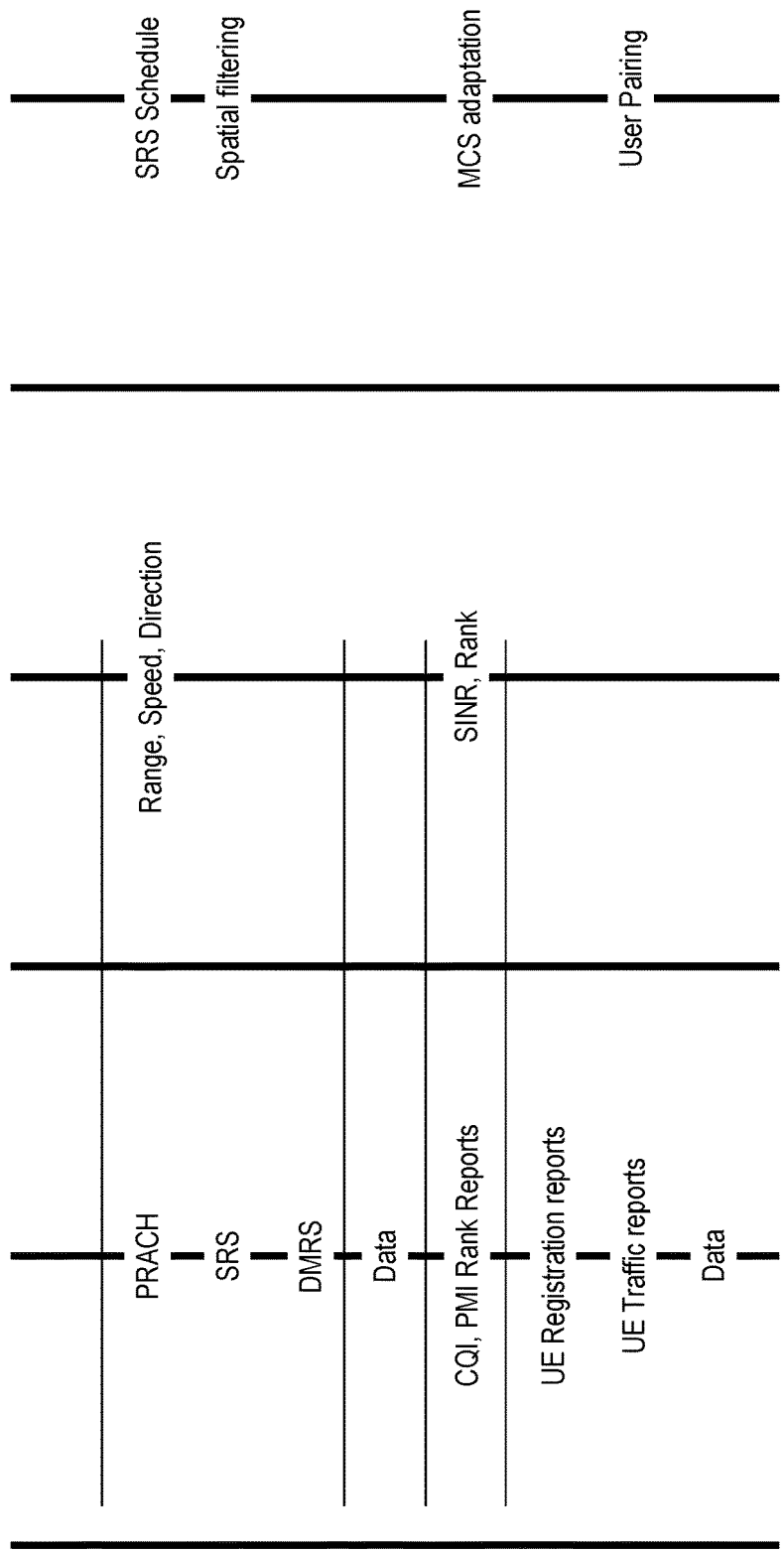
FIG. 15 shows a listing of various transmissions performed in a wireless network.

FIG. 15 shows a listing of various transmissions in a wireless network that may be used for performing measurements and subsequently used for making scheduling or other decisions for network operation. The signals include PRACH, SRS, DMRS, data transmissions, CQI and PMI rank reports, UE registration reports, UE traffic reports, and so on. The middle column shows that these transmissions could be used for determining range, speed and direction of the UE. These transmissions may further be used to determined SINR and rank for transmission with UEs and also the geographic position at which the UE is located. The accumulation of these measurements can be used for SRS scheduling, spatial filtering for beamforming, MCS adaptation and grouping of users.

Figure 16:
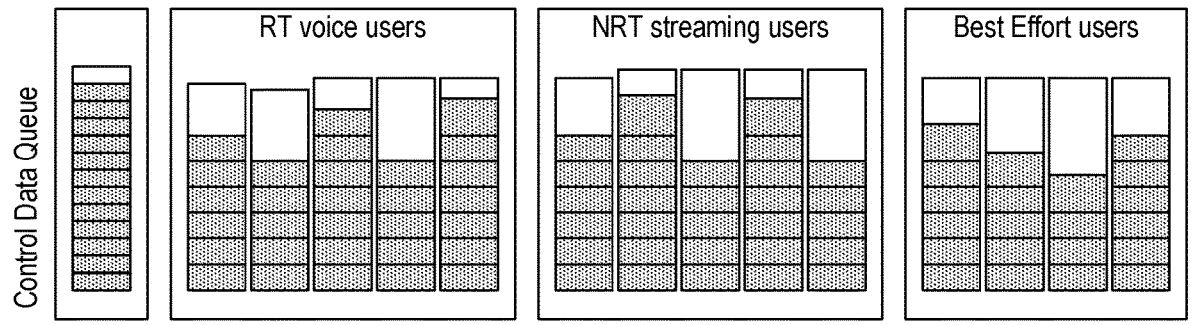
FIG. 16 shows example stack implementing wireless data communication.
Figure 16:
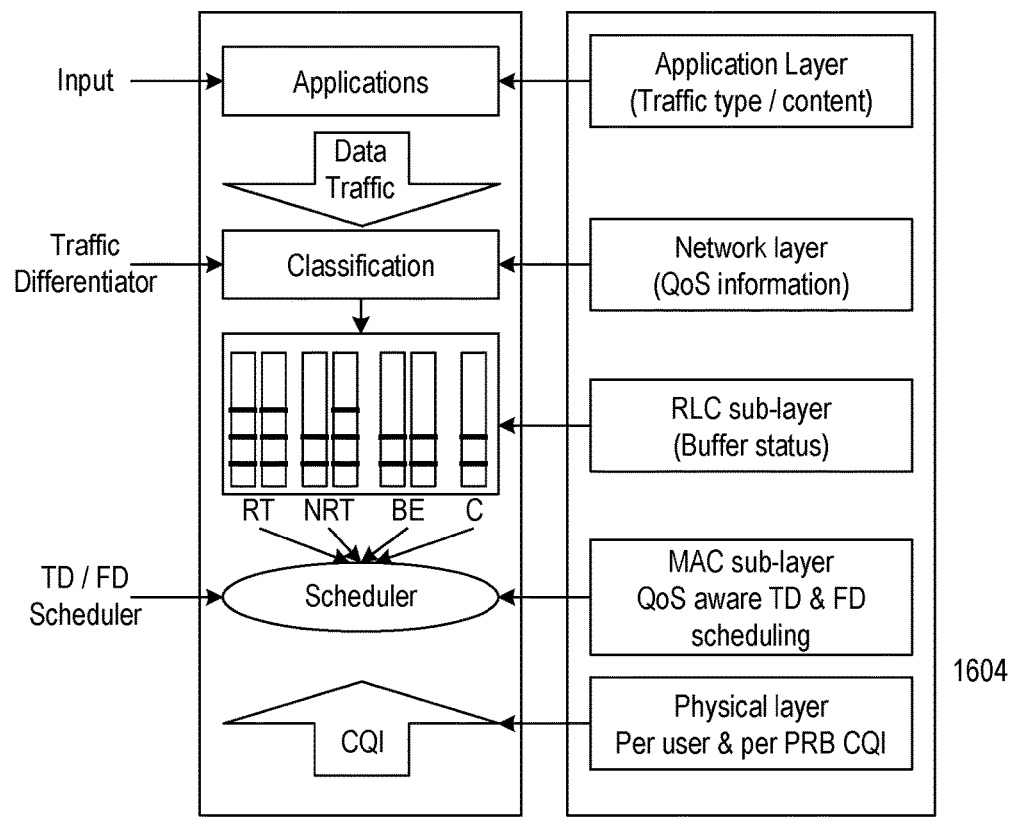

FIG. 16 shows an example stack implementing wireless data communication. The stack may be able to handle various types of data traffic according to the required transmission qualities. An example is shown in Table 1.

TABLE 1

Different data traffic types

| Traffic type | Transmission requirement | Example |
| --- | --- | --- |
| Control data | High priority | Scheduling information |
| Real time (RT) | Low latency | Voice |
| Non real time (NRT) | High throughput | Streaming video |
| Best effort (BE) | Low priority | Email, SMS |

In FIG. 16, 1602 pictorially depicts an example of a control data queue that includes various types of data transmissions as above, and 1604 shows a stack of various OSI layers, including an application layer, a network layer, a radio link control (RLC) sub-layer, a medium access control (MAC) sub-layer, and a physical (PHY) layer. These layers of the stack are correspondingly responsive for implementing the following functions.

TABLE 2

Functions implemented by specific OSI layers

| OSI Layer | Function |
| --- | --- |
| Application layer | Generate/provide data traffic having type according to applications |
| Network layer | Includes QoS information and classifies data according to the QoS information to differentiate traffic of each type |
| RLC sub-layer | Provide separate queues for different data types |
| MAC sub-layer | QoS aware sublayer that is responsive to time or frequency duplexed scheduling for various data type ques according to a scheduler |
| Physical layer | Map or decode data on a per user, per physical resource block basis according to channel quality |

Figure 17:
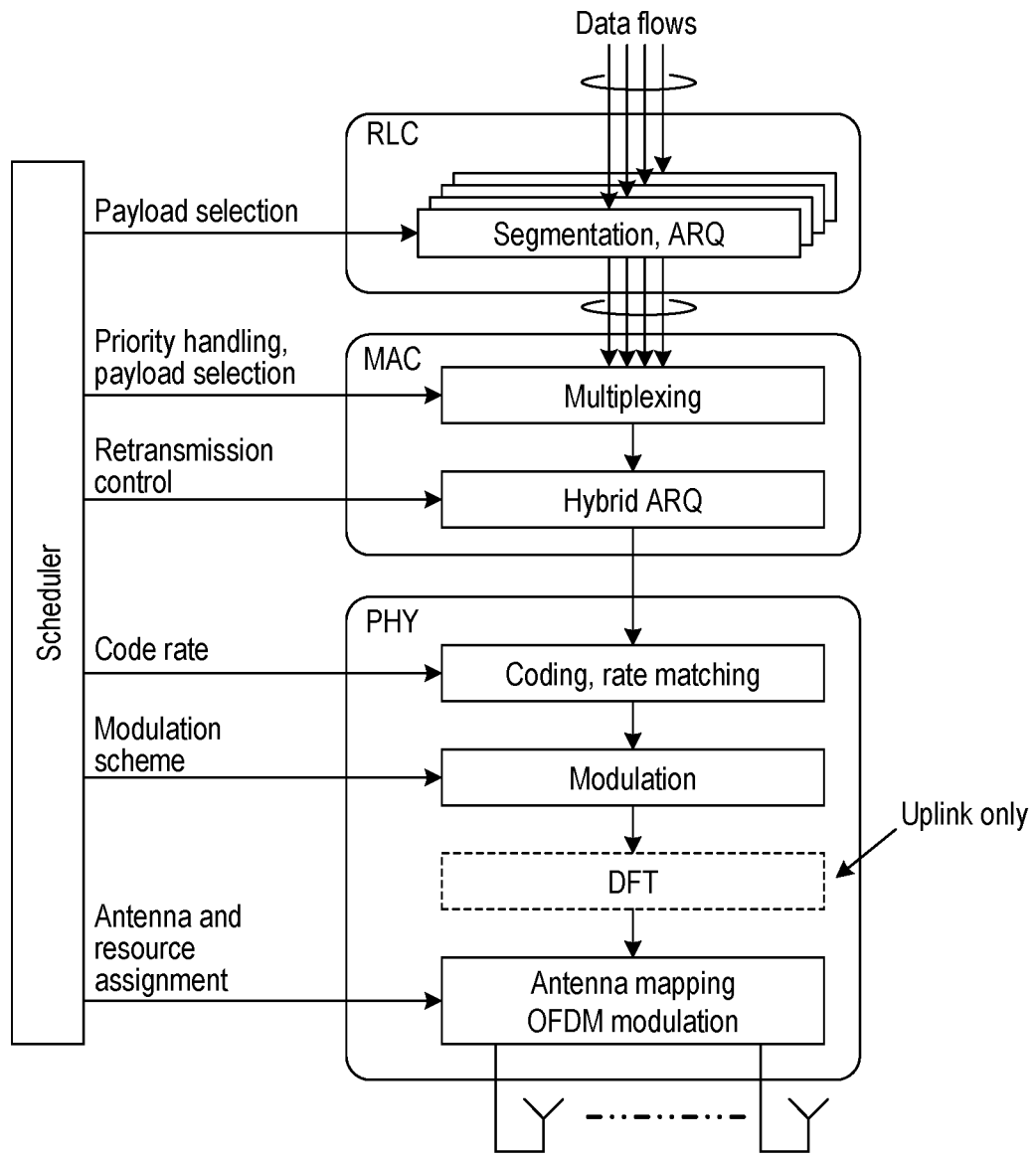
FIG. 17 shows another example stack implementing wireless data communication.

FIG. 17 shows another example stack implementing wireless data communication. In this embodiment, data flow occurs as follows under the control of a scheduler. Data from higher layers (e.g., the application layer) is input to a segmentation and automatic repeat request (ARQ) function in the radio link control (RLC) layer. The output of the RLC layer is input to a medium access control (MAC) layer that implements multiplexing and hybrid ARQ function. Data is then passed between the MAC layer and PHY layer for performing coding and rate matching, followed by modulation mapping followed by discrete Fourier transform application (for uplink transmissions) and mapping to antenna for transmission. Similar functions are repeated in reverse for receive side. Various control signals provided by the scheduler at each stage of the data pipeline are also depicted in FIG. 17.

Figure 18:
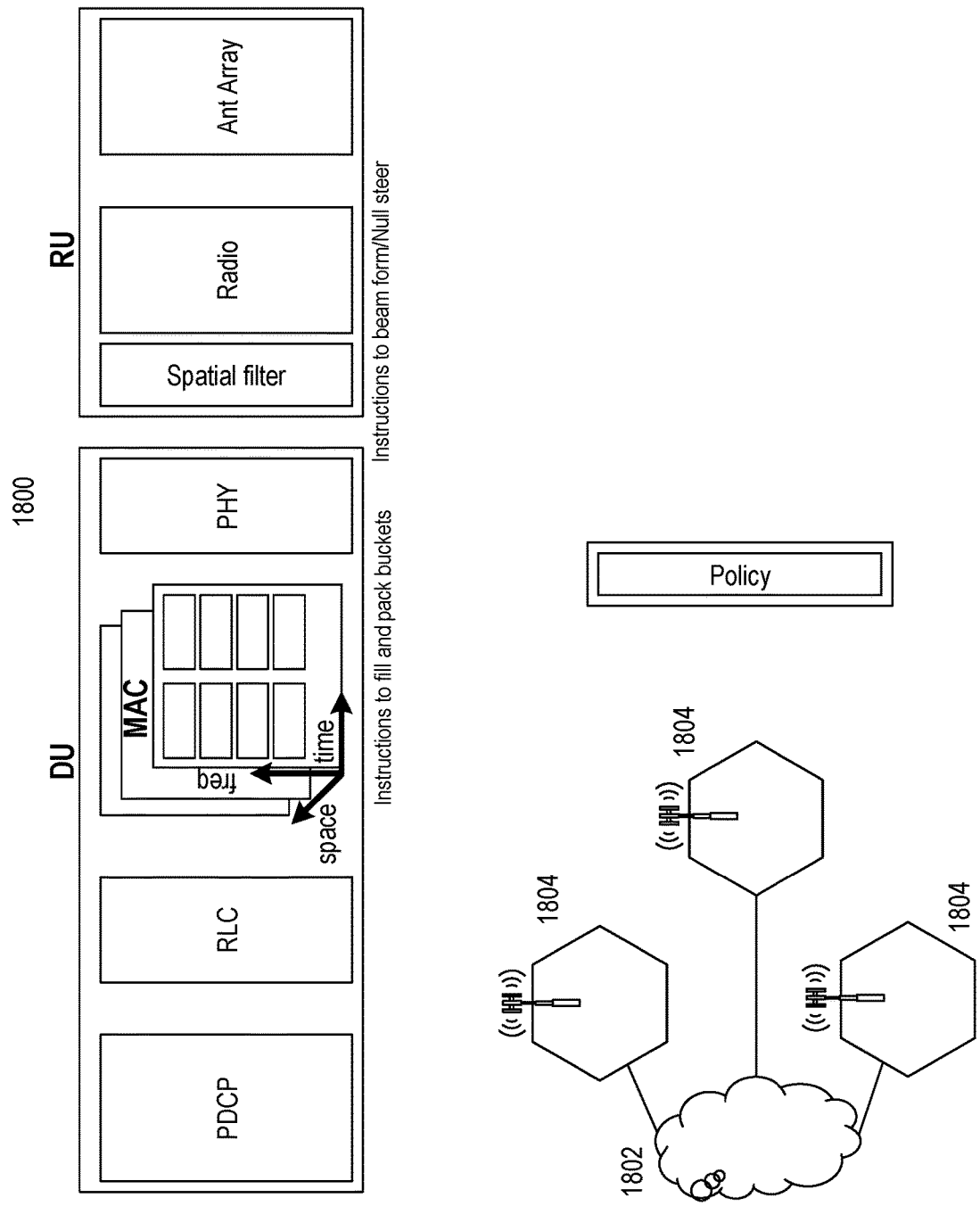
FIG. 18 shows an example of architecture of a cooperative multipoint (COMP) network operation.

FIG. 18 shows an example of architecture of a cooperative multipoint (COMP) network operation and an implementation of a communication device 1800 in such a network.

The COMP network includes cells 1804 with their individual cell towers or base stations, all in communication with each other through a core network 1802. Collectively, the network may implement a policy for scheduling and grouping of UEs based on localization data.

An example network device 1800 may be implemented as DU-RU logical partitioning. Here, the RU partition includes an antenna array for MIMO communication, a radio for transmission and reception of RF signals and a spatial filter to be able to receive or transmit spatially selective signals such as transmission beams. The RU may be responsive to instructions for beam forming or null steering.

The DU may include a protocol stack implementation that includes a packet data convergence protocol (PDCP) layer, an RLC layer, a MAC layer and a PHY layer. Of note is the MAC layer that may be able to transmit and receive data that is multiplexed along time, frequency and space dimension based transmission resources (e.g., different time slots, different frequency tones and difference spatial layers).

Figure 19:
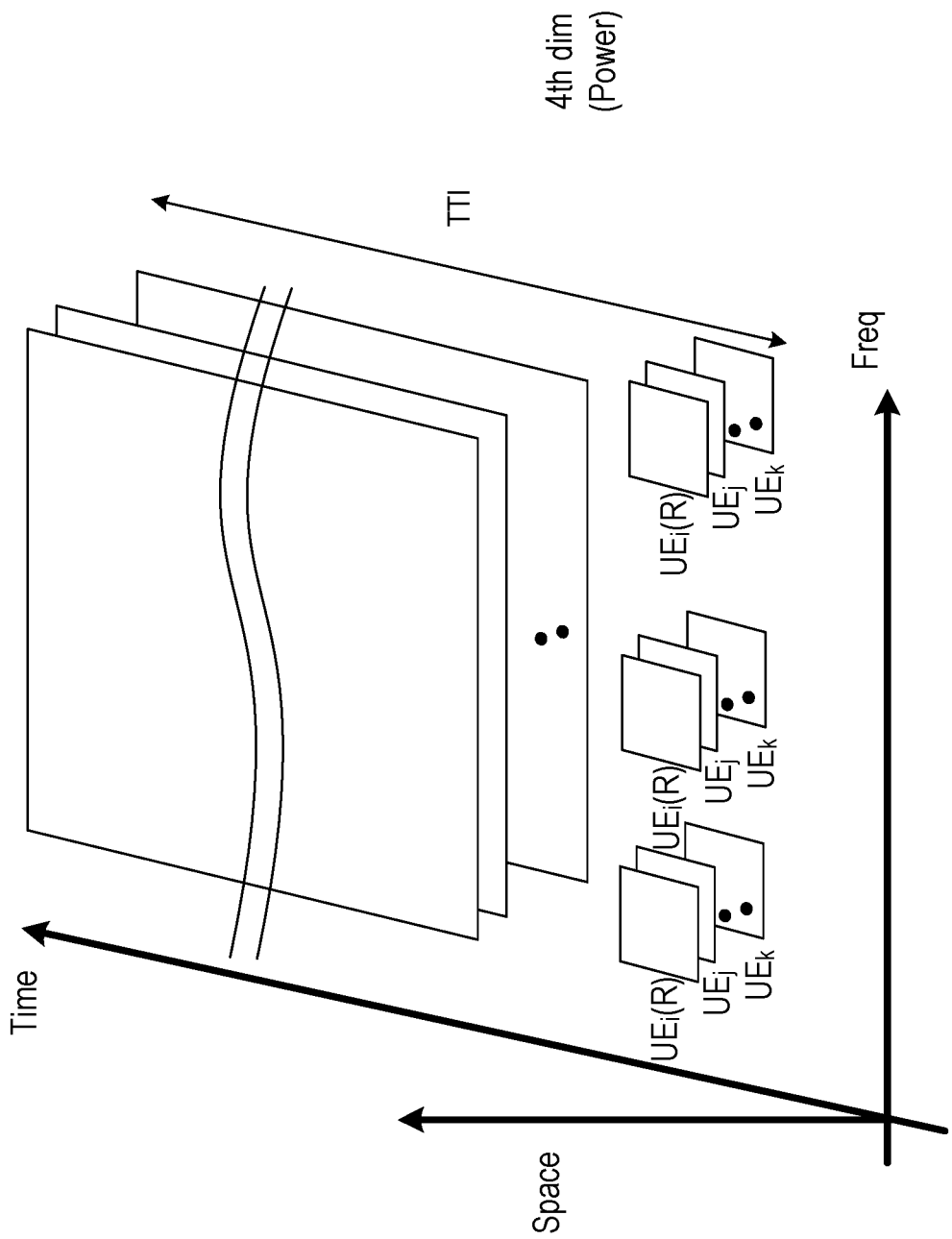
FIG. 19 pictorially depicts an example of time, frequency and space multiplexing of data traffic for multiple users.

FIG. 19 pictorially depicts an example of time, frequency and space multiplexing of data traffic for multiple users. The three orthogonal axes depict time, frequency and space, with each UE being assigned one or more contiguous portions in such a space. A fourth dimension of power may also be used to manage interference levels among various transmissions.

Figure 20:
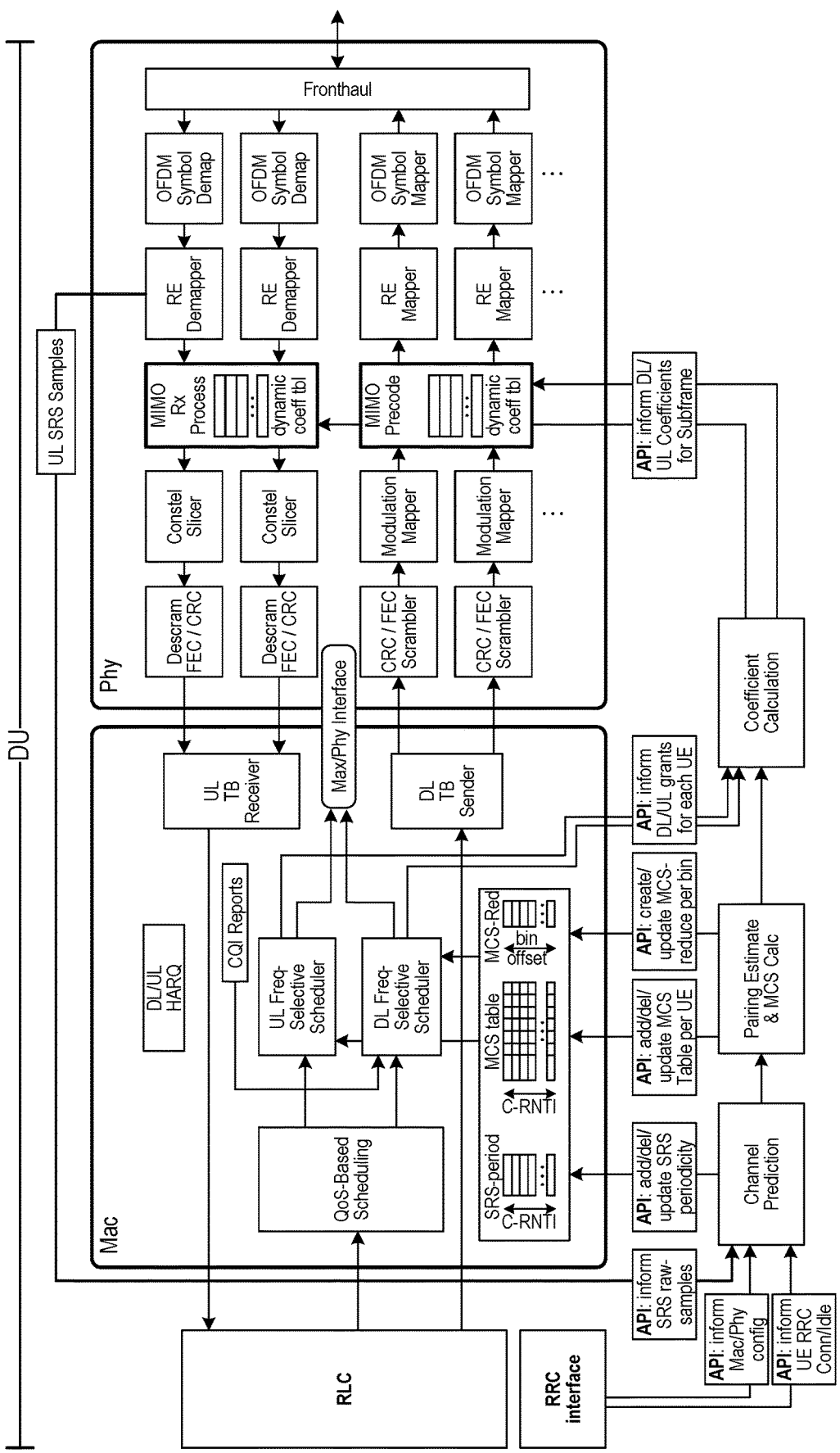
FIG. 20 shows an example implementation of a MIMO DU.

FIG. 20 shows an example implementation of MAC, PHY and RLC layers of a MIMO DU and various application programmers interfaces (APIs) among these layers of the implementation stack. The drawing shows MAC and PHY layer functions implemented separately and communicating via a MAC Phy interface.

In the example shown in FIG. 20, the following functionality is included in the MAC: a DL/UL HARQ function for implementing hybrid automatic repeat request functionality in the downlink and uplink directions, and an UL transport block (TB) receiver that is configured for receiving uplink transport blocks. This block will provide CQI reports to a DL frequency-selective scheduler. The MAC functionality further includes an UL frequency selective scheduler block generates schedules for UL. Both these blocks communicate with the PHY layer via the MAC-PHY interface, and are controlled by an input from a QoS based scheduling function that receives commands form radio link control (RLC) layer. The schedulers use and specify various transmission resources such as MCS tables, SRS period, and so on.

At the PHY layer, one or more receive chains may receive signals via a fronthaul connection, perform OFDM symbol demapping followed by remapping, a MIMO Rx process for separating out MIMO data streams, a constellation slicer and a descrambler, forward error correction, and a cyclic redundancy check function. In the transmit chain, data from a transport block sender may be processed through forward error correction, scrambler and cyclic redundancy check addition, converted into symbols via a modulation mapper, and processed through a MIMO precoder. The output of the MIMO precoder is processed through a remapper and OFDM symbol mapper, and further processed in the RF domain for transmission on the fronthaul.

Adjacent to the MAC and PHY, a radio resource control (RRC) layer operation and other system functions may be coupled to various functionalities of MAC and PHY via APIs, including APIs to inform SRS raw samples to channel prediction, APIs to add/delete/update SRS periodicity from channel prediction to MAC, APIs to add/delete/update MCS table per UE from a pairing estimate and MCS calculation, APIs to create or update MCS-reduced per bin, based on pairing estimation, APIs to inform MAC/PHY configuration to a channel estimation function and APIs to inform the MAC/PHY of the RRC state (connected or idle). Furthermore, a coefficient calculation function that estimates precoding coefficients will provide this information via APIs to the DL/UL processing on a subframe basis.

Figure 21:
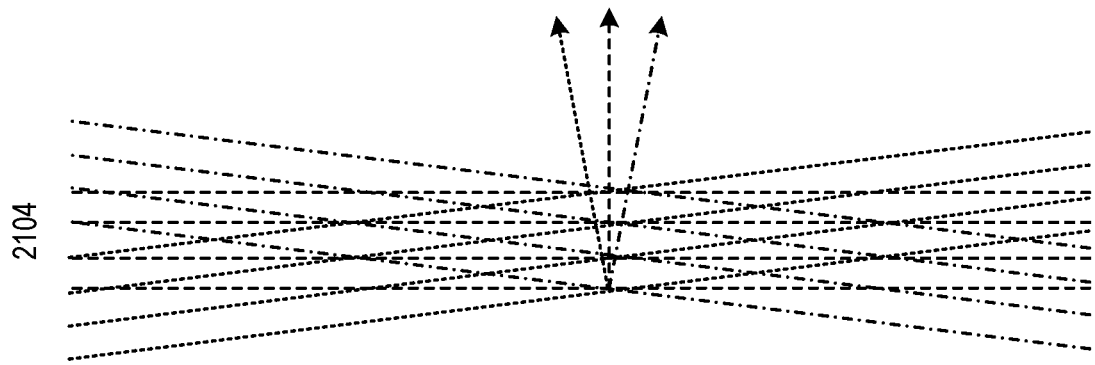
FIG. 21 pictorially depicts an example implementation of spatial filtering in wireless communication.
Figure 21:
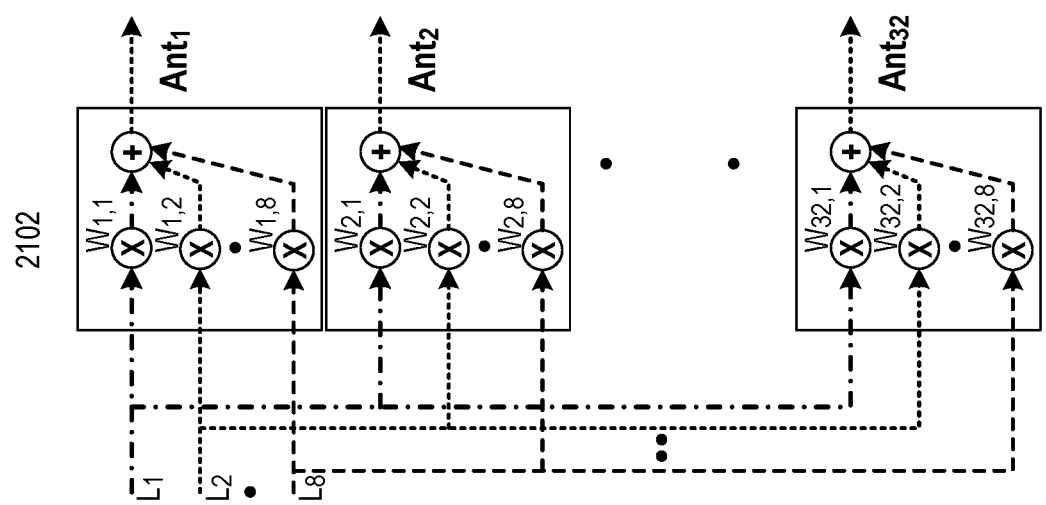
Figure 21:
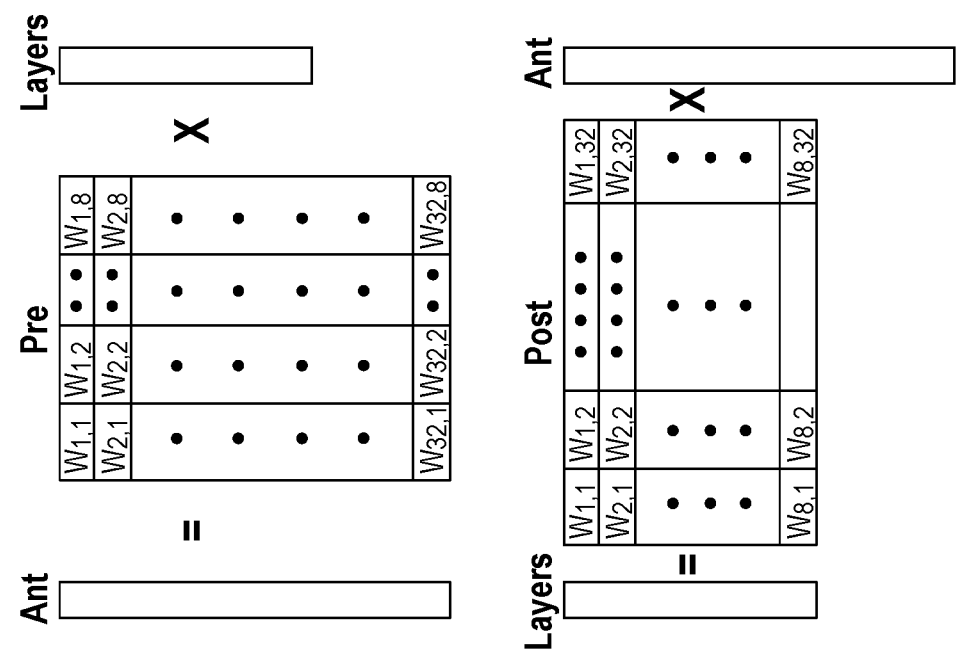

FIG. 21 pictorially depicts an example implementation of spatial filtering in wireless communication. On the transmit sides, mapping to antenna is performed based on a precoding matrix (Pre) operated upon layers of data transmissions. On the receive side, a postcoding operation is used to separate layers of data from signals received on multiple antennas. This operation is pictorially depicted as a signal flow 2102. The resulting signals 2104 are depicted as three layers of transmissions that simultaneously take place without cross-interference.

Figure 22:
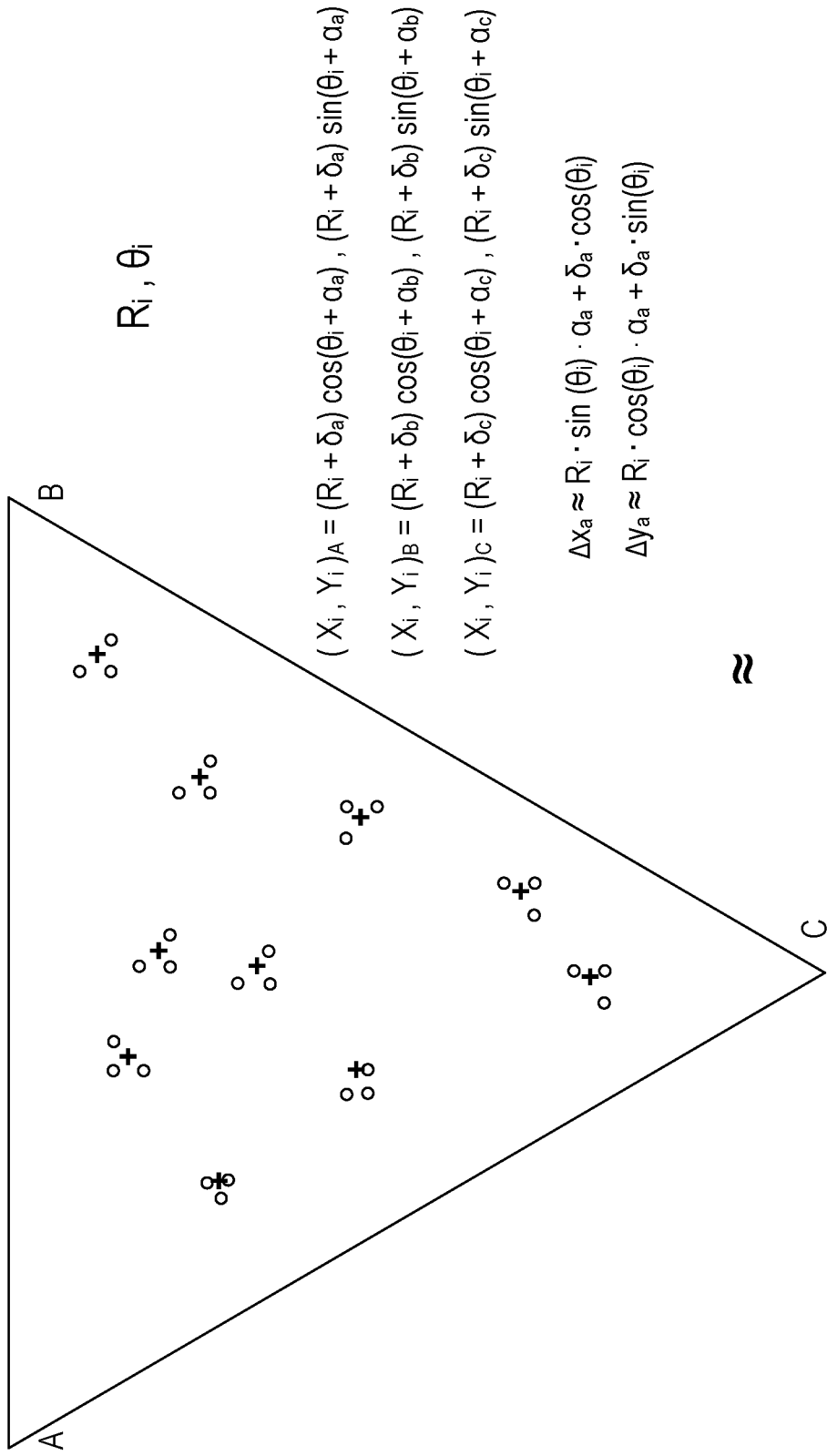
FIG. 22 shows an example implementation of receiver localization.

FIG. 22 shows an example implementation of receiver localization. The various equations show one implementation of estimation of localization error estimation. For example, at the transmitter, antenna mapping may be achieved by showing the operation as a mathematical multiplication of a precoding coefficient matrix with various layers of data streams being transmitted (two are shown in FIG. 21). At the receiver side, the generation of layers from the signaled received on multiple antennas can similarly be represented as a matrix multiplication with a post-coding matrix. The multiplications may be implemented as shown in 2104. The result of the precoding or postcoding may be seen as transmissions in different directions, as shown in wavefronts 2104.

Figure 23:
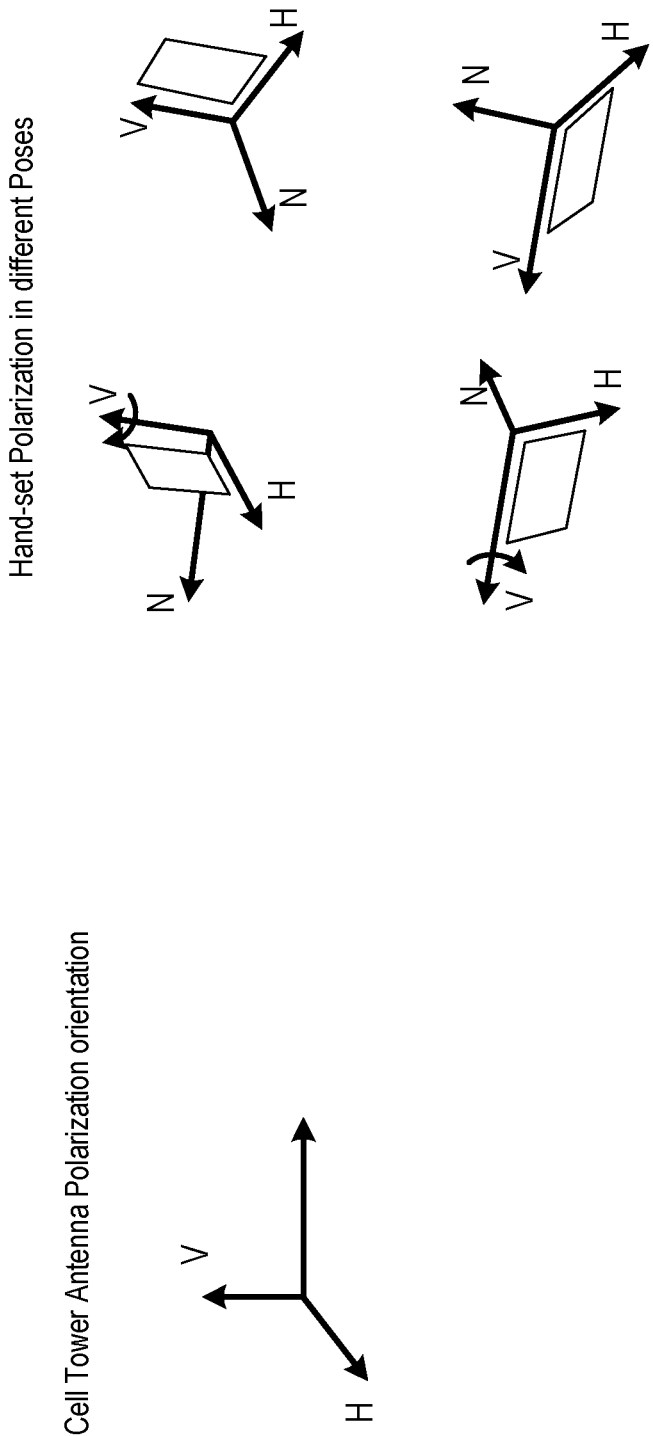
FIG. 23 shows an example of pose or orientation estimation of a user equipment (UE).

FIG. 23 shows an example of pose or orientation estimation of a user equipment (UE). Because the techniques disclosed in the present document provide for precise implementation of range and phase calculation, a pose of a UE may be continuously tracked based on the angles of reception of different layers of signals from UE. The knowledge of rotational properties of the UE may be used on the network side for better scheduling, grouping and tracking the UE. For example, UE's pose may be used for deciding the rank or PMI used for transmission to/from the UE.

Figure 24:
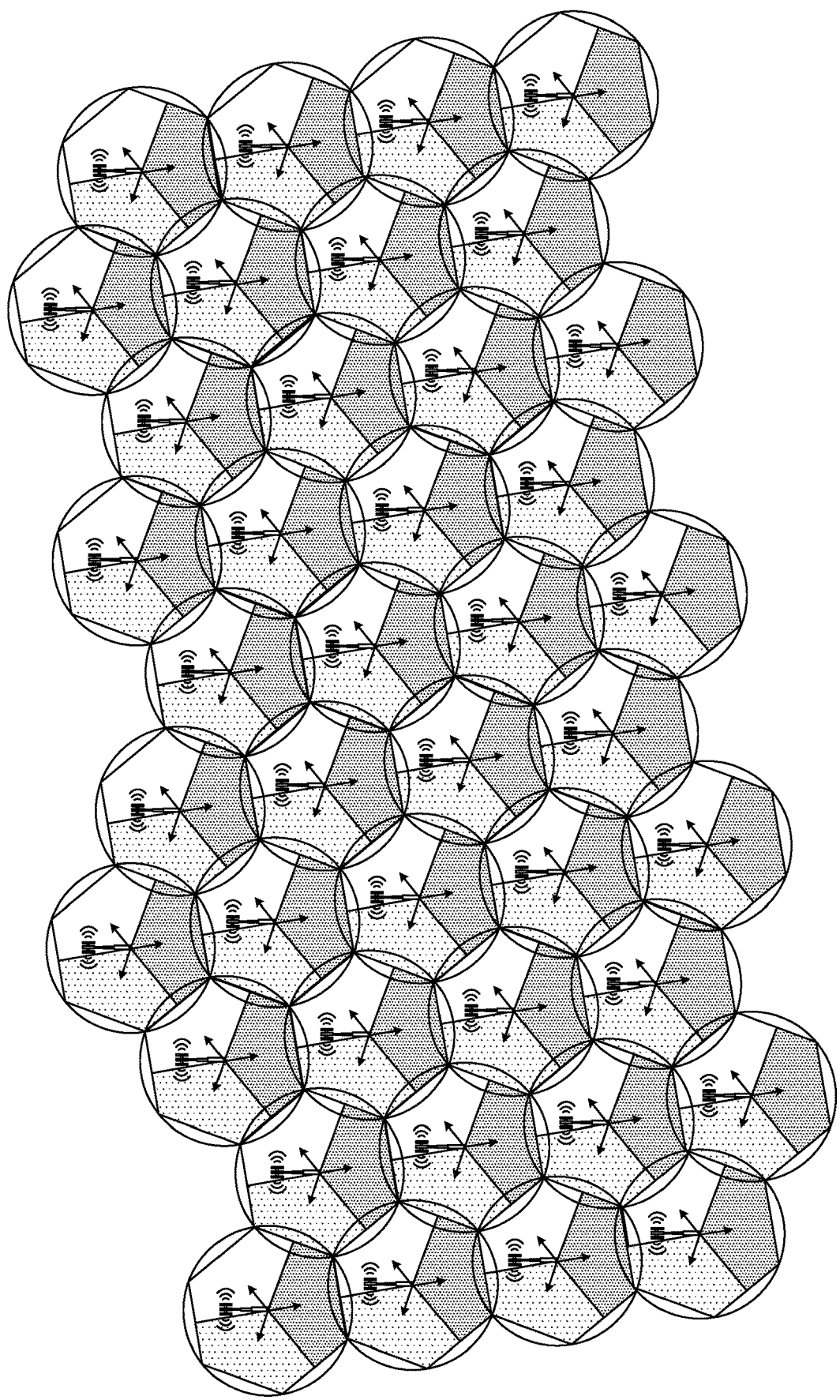
FIG. 24 shows an example of a wireless network that is spread across a wide geographic region.

FIG. 24 shows an example of a wireless network that is spread across a wide geographic region. The various techniques described in the present document may be implemented in such networks that may span across a vast geographic area such as an entire city, county, a country or an entire continent.

Figure 25:
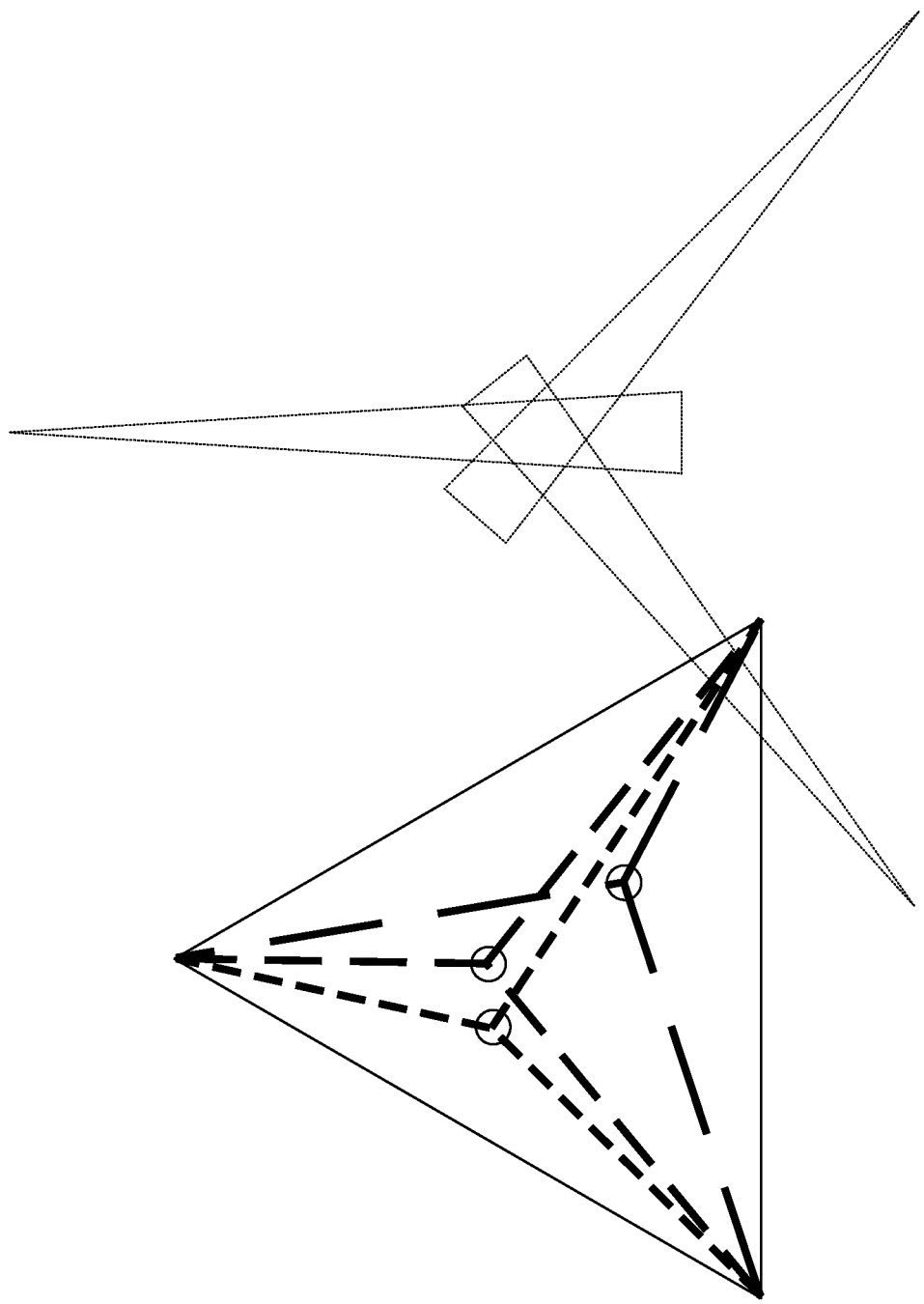
FIG. 25 shows an example of triangularization of receivers in a wireless communication cell.

FIG. 25 shows an example of triangularization of receivers in a wireless communication cell. As can be seen in the drawing, three UEs are in a coverage area of three base stations. Inaccuracy in the estimation of each base stations antenna direction may introduce grow as a distance from the base station, as show in the drawing 2502, by beams that become wider away from the base station. Thus, antenna calibration may directly impact how accurately a UE can be localized using the techniques described in the present document.

Figure 26:
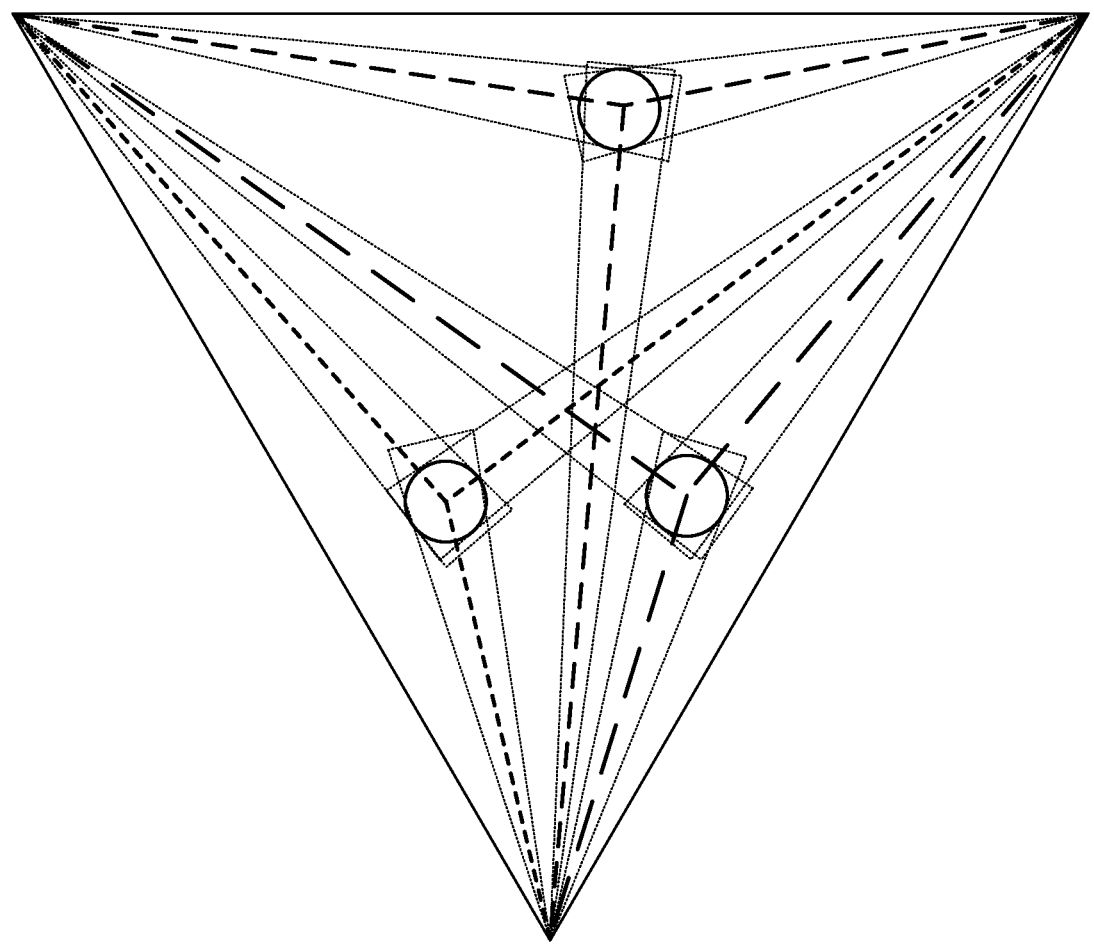
FIG. 26 shows another example of triangularization.

FIG. 26 shows another example of triangularization using the accurate calibration to achieve better localization.

Figure 27:
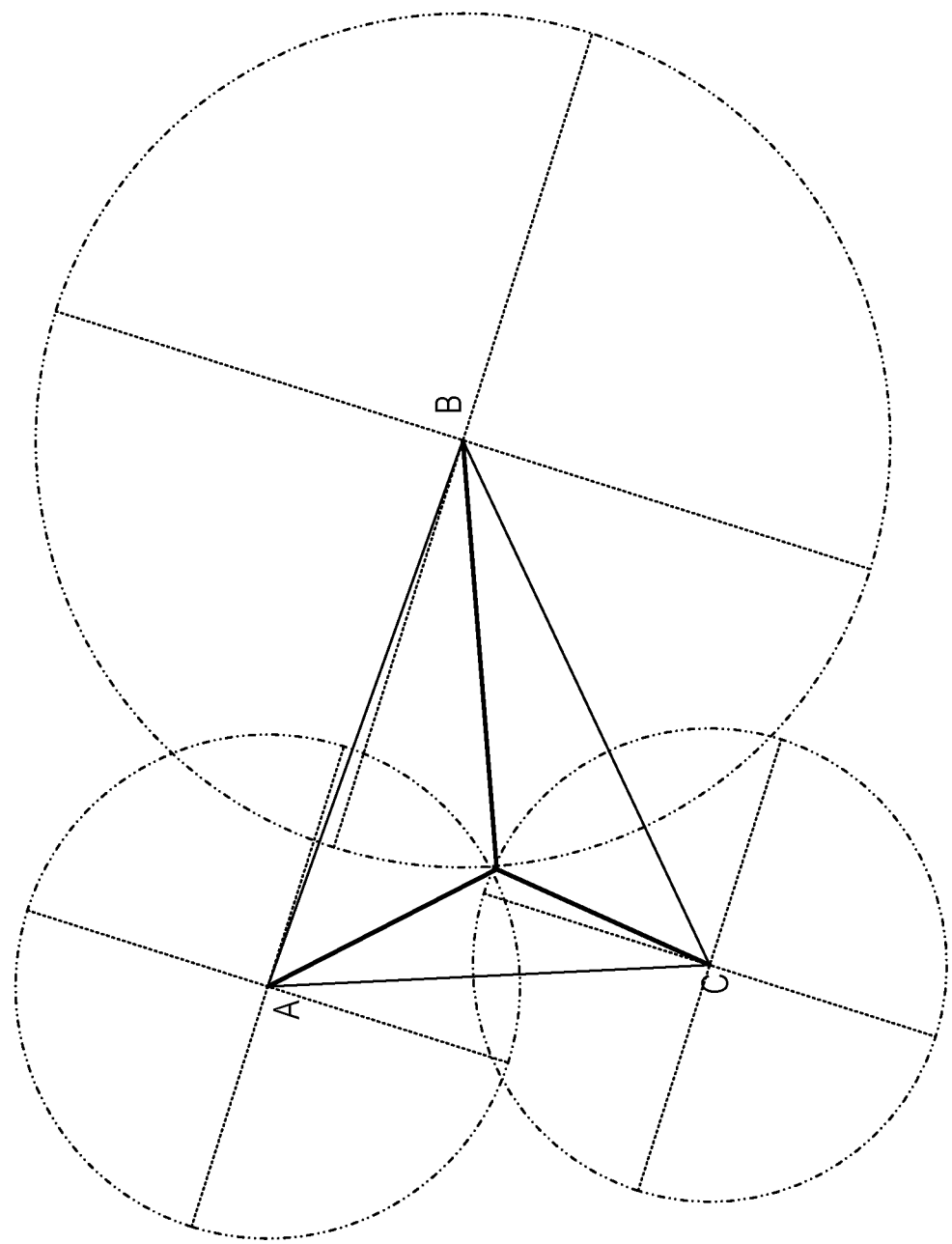
FIG. 27 shows an example of an implementation of passive tracking.

FIG. 27 shows an example of an implementation of passive tracking. As a UE moves around the coverage area, the base stations may be able to estimate how soon a UE may needed to be handed over and which is the best base station to handle the handover.

Various techniques described in the present document may be used to provide improvements to wireless network operations.

In one example aspect, the disclosed localization techniques may be implemented using existing UEs, with no changes to current wireless standards such as 5G, by providing techniques for geometric precoding to increase amount of throughput of a wireless network over traditional implementation.

3. Examples of Solutions

As discussed herein, antenna misalignment may cause errors in gain and phase measurements in wireless systems which may lead to sub-optimal operation. Accordingly, in some embodiments, antenna bias or misalignment of one transmission tower (or base station) may be estimated and eliminated at UE positions by using transmissions from other neighboring base stations. Some example implementations have been described with reference to FIGS. 10 and 11 and may be implemented using an apparatus as discussed with respect to FIG. 4 or 5.

4. Examples of Localization and Antenna Calibration

One advantageous aspect of antenna bias removal by measuring antenna orientation is that, during this operation, triangularization or trilateralization may be used for also estimating UE locations. Furthermore, accuracy of UE location estimation may be improved using an iterative process in which a UE location is first estimated, then used for antenna calibration, and then UE location is estimated again based on the calibrated antenna. This process can be iterated a number of times until no further improvement is obtained in the calibration and location estimate.

As further described in the present document, the knowledge of UE positions may be advantageously used for pairing UEs so that communication between paired or grouped UEs and the base station can be done in a space division duplexed manner on a same beam. The UEs in a same group may share transmission resource via frequency, time, code or layer domain duplexing.

5. Examples of Feature Mapping a Wireless Coverage Area

In some embodiments, the calculations and results from the antenna calibration and UE localization may be collected in a network database for statistics and analysis. For example, a network-wide parameterization of signal to noise ratio (SNR) profiles of UEs as they move around may be maintained. In addition, a feature map of the network may be generated based on SNR and channel estimation performed at each location as various UEs occupy the location over a period of time. Ideally, this databased includes entries from multiple UEs for each (x, y) location in the network. Measurements of each UE at a given location (x, y) may be weighted relative to the UE's performance accuracy across the network in comparison to other UEs. Some examples of measurements performed in the network are described with reference to FIGS. 10, 11, 13, 14, 15, 21, 22, 23 and so on.

6. Examples of Network Bandwidth Management

In some embodiments, a feature map of the network is generated by mapping interference estimates, path losses, time profiles and so on. The time profile may, for example, generate time-dependent characteristic of a location such as peak crowding times or relatively sparse times (e.g., when a café store is closed). Such a feature map may be advantageously used on the network-side to schedule transmission resources, using deployment of base stations to serve a certain area, making additional bandwidth available by increasing power in certain directions at certain times, and so on.

In some embodiments, the various operational parameters collected on the network side may be used for geometric pre-coding to achieve accurate spatial separation. Accordingly, the tasks of calibration data collection, processing, and application to scheduling could be done in a distributed manner. For example, as shown in FIG. 5 and FIG. 18, different base stations or DUs may be used for scheduling according to the antenna calibration of the base station and UE location data. FIGS. 16, 17 show example implementations of data flow management in a protocol stack architecture. FIG. 15 shows that these schemes do not need special signals; legacy reference signals and other transmissions may be used for antenna calibration and UE localization. For example, base stations in a region (e.g., FIGS. 18, 24) may be connected via a backbone connection that provides a high speed low latency (less than 10 msec) connection for transfer of localization and channel quality data to enable a frame-based scheduling in a distributed manner.

In some embodiments, the localization data for UEs and the network feature map may be used to prepare for an upcoming handover by allocating transmission resources to a UE for an upcoming time period, prior to the UE actually being a part of a network.

7. Examples of UE Orientation and Pose Estimation and Use

In some embodiments, the antenna bias measurements may be used for measuring a UE's orientation or pose as a function of time. This information may be used for predicting the UEs movement for allocating transmissions rank and/or precoding transmissions to or from the UE. Furthermore, such information may be of interest to certain higher layer apps such as a health or fitness app and may be made available to the apps via a network server API. Some examples are described with respect to FIG. 23.

In some embodiments, the scheduling approaches described in FIGS. 12, 15-18 and 20, Section 6, and so on, can be implemented in the context of Sections 8-11.

8. Examples of Scheduling MU-MIMO 8.1 Scheduling Approach

One consideration when scheduling in a MU-MIMO system is that even if the wireless channel is considered time-invariant, the importance of data for the different users is usually not. If the only goal were rate maximization, and all users had a continuously full buffers (two assumptions that are often made in state of the art algorithms published in scientific papers), then scheduling in the FWA channel would be a static process that would have to be done only once. However, since in practice all packets have different deadlines, and arrivals at the transmit nodes are random, every data frame may require a re-evaluation of the utility that can be obtained with a particular schedule.

In contrast to wireline channels, the interference in MU-MIMO channels ensures that the scheduling of each users impacts the rate at which all other users can transmit. Thus, the scheduling process is still quite complicated, and in principle may require the solution of a computationally hard problem within each timeframe.

One technique that may be used for complexity reduction is the "paring down" of user combinations that are tested for their utility. For example, some scheduler settings are unlikely in their face to provide useful solutions, and thus should not even be tested. For mobile systems, such pre-selection algorithms may be based on the second-order statistics of the users. In a beam-spaced system, this may be interpreted as "two users with strongly overlapping power angular spectra should not be scheduled at the same time" even if there are instantiations in which they may be scheduled together because of particular instantaneous channel realizations.

In some embodiments, scheduling in FWA systems include the pre-selection algorithm, not based on the second-order statistics, but rather on the time-invariant part of the channel. This may be understood from the fact that the time-invariant parts of the channel are local realizations of the space-variant (not time-variant) fading pattern induced by the multipath components interacting with time-invariant scatterers. Thus, the channel vectors of two users might be orthogonal to each other even if the second-order statistics taken over the spatial ensemble (related to the angular power spectrum) are strongly overlapping.

8.2 Metrics for Scheduling

In some embodiments, the precoding for the downlink may be examined when the overall throughput is to be maximized. As an example, the following discussion assumes that the goal is the maximization of the sum of the weighted capacities for the different users $$U = \sum_{i \in \mathcal{L}} w_i C_i$$

where U is the utility function, $C_i$ is the capacity of the i-th user, $w_i$ is the weight of that user, and $\mathcal{L}$ is the set of selected users. In an example, the weight $w_i$ may be based on the backlog and the deadlines of the packets that need to be transmitted. If all the weights are set to unity, the maximization problem degenerates to the "max sum rate" problem that has been previously explored in the literature.

The capacity $C_i$ may be determined by the power assigned to each user (for the downlink, "power of a user means" power expended at the base station (BS) for the transmission of a signal intended for this user), the precoder, and the noise and inter-cell interference level. In the subsequent examples, is assumed that there is no fast coordination between different cells, so that no CoMP (Coordinated MultiPoint) techniques such as joint transmission of coordinated beamforming may be used, though the techniques described in this document may be generalized and applied to such a scenario. In this scenario, the interference may therefore be considered as spatially white (because beamforming towards different users will "average out" as far as the signal strength in the adjacent cell is concerned), and only the overall control of the power level plays a role in the determination of the adjacent-cell interference.

The aforementioned definitions may be used for the fast selection of the users that are to be scheduled. It is advantageous in that it is a single scalar metric, which allows a unique optimization, and is relatively simple to handle. Formulations that may include inequality constraints (e.g., providing a minimum data rate for all the scheduled users) might make sense in the context of service level agreements, but may require significantly higher mathematical effort, as such problems typically are solved as convex optimization problems with interior point methods (polynomial in complexity, but still very high computational effort).

8.3 Examples of Power Control

In some embodiments, power control in the downlink must be considered. As shown in previous systems, increasing the transmit power for a particular user increases the signal power, but at the same time increases the interference to other users. Specifically, consider:

(1) Consider the impact of the transmit power on the adjacent-cell interference. Assuming that there is no coordination between the transmissions at the different BSs (such as joint transmission or coordinated beamforming), any adjacent-cell interference may be judged by the total power that is leaking into the adjacent cell. The particularities of the beamforming at the transmitting BS may impact the spatial distribution of the interference in the victim cell, but since it is not possible to mitigate the impact on particular victim locations (due to the lack of coordination), only the total transmitted power is taken into account.

(2) The transmit power for a user at the cell edge may be chosen to support the required modulation and coding scheme (MCS), which is a parameter that the scheduler may determine. The transmit power P need not be larger than such as to achieve a desired rate $R=\log(1+P/(N_0+I))$, where I is the interference power from the adjacent cell, which may depend on the transmit power of the adjacent cell, and $N_0$ is the noise spectral density (or equivalently, the noise power in a 1 Hz bandwidth). This procedure may be implemented when the cell-edge interference is larger than the noise level, wherein reducing the transmit power equally in both cells does not decrease the overall throughput.

(3) In some embodiments, the power control procedure may be closely related to the type of beamforming considered in the system. For zero-forcing beamforming, each user could in principle have its own power control, since there is by definition no inter-user interference. For dirty-paper coding (DPC), which may be used as a proxy for Tomlinson-Harashima precoding (THP), there is interference to a subset of users, so that a change of the transmit power influences the SINR, and thus the capacity of the other links.

(4) For zero-forcing beamforming, it may be shown that the optimum power distribution converges to the equal power distribution (instead of a water filling solution) for high SNR. This may be used in the selection of the user distribution, since in this situation it is not necessary to optimize over the power distribution for each candidate set. However, this option is based on the assumption of a sum capacity optimization, while the power distribution for a sum utility maximization may be different.

Thus, a low-complexity solution may not be user power control for the scheduling itself, but the optimization of the transmit power for the chosen schedule based on a metric that can either involve the sum utility in the desired cell, or take into account the interference to adjacent cells.

8.4 Preselection of User Devices

In exemplary existing systems, there may be hundreds of user devices (equivalently, users) in one cell, and the computational effort of testing all possible combinations each of them in each step of the orthogonalization procedure may be quite significant (although the operation is linear in the number of user devices). Thus, in some embodiments, a preselection of users to reduce the overall effort may be beneficial. The preselection may be done in the fixed wireless access (FWA) system based on the time-invariant part of the channel, while it may be done in a mobile system based on the second-order statistics of the channel.

In some embodiments, the preselection algorithm finds "cones" in a vector space that are quasi-orthogonal to each other. Then, only one user is selected out of each cone; in an example, the user that has the best channel (largest channel norm) and highest weight may be selected. Low interference to/from other scheduled users results because of the quasi-orthogonality between the cones.

An existing algorithm that use a preselection algorithm is directed towards an FDD system that aims to minimize the feedback overhead, and does not focus on the computational effort required. Furthermore, the existing algorithm assumes that scheduling in one timeframe needs the feedback from all possibly scheduled users, which may imply a large overhead. By considering "cones" based on the second order statistics, the number of UEs that have to be considered for feedback is thus drastically reduced.

In some embodiments, the proposed approach first defines a set of cones in vector space (the centers of these cones have to be strictly orthogonal to each other, so they cannot be simply the strongest users). Then a maximum admissible amount of crosstalk between users (a metric that is similar to the minimum SIR, but is not quite the same because it does not take into account the relative strength of the channels that can cross-talk) is defined. This quantity determines the opening angle of the cone; two vectors that are at the boundaries of two cones and have equal strength have a defined minimum SINR.

The determination of the cone opening angle may include a difficult tradeoff: if it were too small, there is an appreciable chance that one of the orthogonal set of cones does not contain any user that has data to transmit; if it were too wide, the possible solution set becomes large or (if the selection of users within the cone prevents this), the savings in computational effort vanish.

In some embodiments, a possible computationally efficient method may be to adjust the opening angle to the average load of the system, to ensure that a sufficient number of prospective candidates is located within the cone. In other embodiments, which may be well suited for parallel processing, first independently schedule users in each cone, and then iteratively try "swapping" users within cones such that users that experience the largest interference might be swapped for other users in the cone if those have higher utility under interference situations. In yet other embodiments, a master list of which users may be combined with each other (based on the time-invariant components) may be determined.

In some embodiments, a method for scheduling MU-MIMO transmissions in a wireless communication system includes determining a plurality of sets based on a first characteristic of a plurality of wireless channels, where each of the plurality of sets comprises at least one of a plurality of user devices, and where each of the user devices communicates over a corresponding one of the of wireless channels, determining a subset of user devices by selecting at most one user device from each of the plurality of sets, and scheduling simultaneous transmissions by each of the subset of user devices based on a scheduling algorithm and a second characteristic of the plurality of wireless channels.

In some embodiments, the wireless communication system is a fixed wireless access (FWA) system, and the first characteristic is a time-invariant portion of the wireless channels. In other embodiments, the wireless communication system is a mobile system, and the first characteristic includes second-order statistics of the wireless channels.

In some embodiments, and when the wireless communication system is an FWA system, the second characteristic is the time-varying part of the wireless channels. Furthermore, the user devices that have been scheduled may be assigned a modulation and coding scheme (MCS) based on the second characteristic. In other embodiments, the second characteristic may include both the time-invariant and the time-varying part of the wireless channels. In yet other embodiments, the second characteristic may be identical to the first characteristic.

In some embodiments, each of the wireless channels may be characterized by a channel capacity, and the scheduling algorithm uses an optimization algorithm to maximize a utility function that may be defined as a sum of products of the channel capacities and a set of weights. In an example, the optimization algorithm is a greedy scheduling algorithm with zero-forcing DPC. In another example, the optimization algorithm is an iterative water-filling algorithm. In some embodiments, each of the weights is based on a backlog and deadlines of packets that need to be transmitted by the corresponding user device that is being scheduled.

9. Examples of Scheduling in Wireless Networks

In some embodiments, scheduling in wireless networks includes dynamic bandwidth allocation and multi-beam scheduling, which can be incorporated into the beam scheduling and fractional beam scheduling approaches described in Section 10 and 11, respectively.

FIG. 28 shows an example table that pictorially depicts the mathematical aspect of scheduling. First column shows resources or people available to perform certain jobs, and the cost of doing these jobs (J1 to J4) is shown in each corresponding entry in the table, e.g., based on rates or charges of each of the person for that job.

A scheduler would schedule the jobs to these people in the "best" manner possible.

In general, scheduling is a NP-hard problem. For most practical considerations, the number of possible schedules to choose from is large. For example, 10 jobs and 20 users willing to do the jobs—6.7e11 possibilities. Scheduling is generally considered to be an NP-Hard problem. Actually, it could be show that scheduling is NP-Complete.

In wireless networks, jobs may represent transmission resources such as channels, timeslots, antenna beams, etc. In this analogy, people may be the mobile stations (MS) that are wanting to use the transmission resources at a cost that represents network profit such as a throughput by scheduling the particular user device—resource pair.

9.1 Dynamic Bandwidth Allocation Embodiments

Dynamic bandwidth allocation may be used to deliver traffic for specific services: Voice, video, per-user SLA, etc. FWA distributes traffic to multiple users on a shared medium.

Dynamic bandwidth allocation (DBA) is a technique by which bandwidth in a shared medium can be allocated on demand and fairly between different users. The sharing of a link adapts in some way to the instantaneous traffic demands of the nodes connected to the link. DBA takes advantage of several attributes of shared networks: All users are typically not using the network at one time. While active, users are not transmitting data/voice/video at all times. Most traffic occurs in bursts—there are gaps between packets that can be filled with other user traffic. DBA allows QoS, to preferentially.

Figure 29:
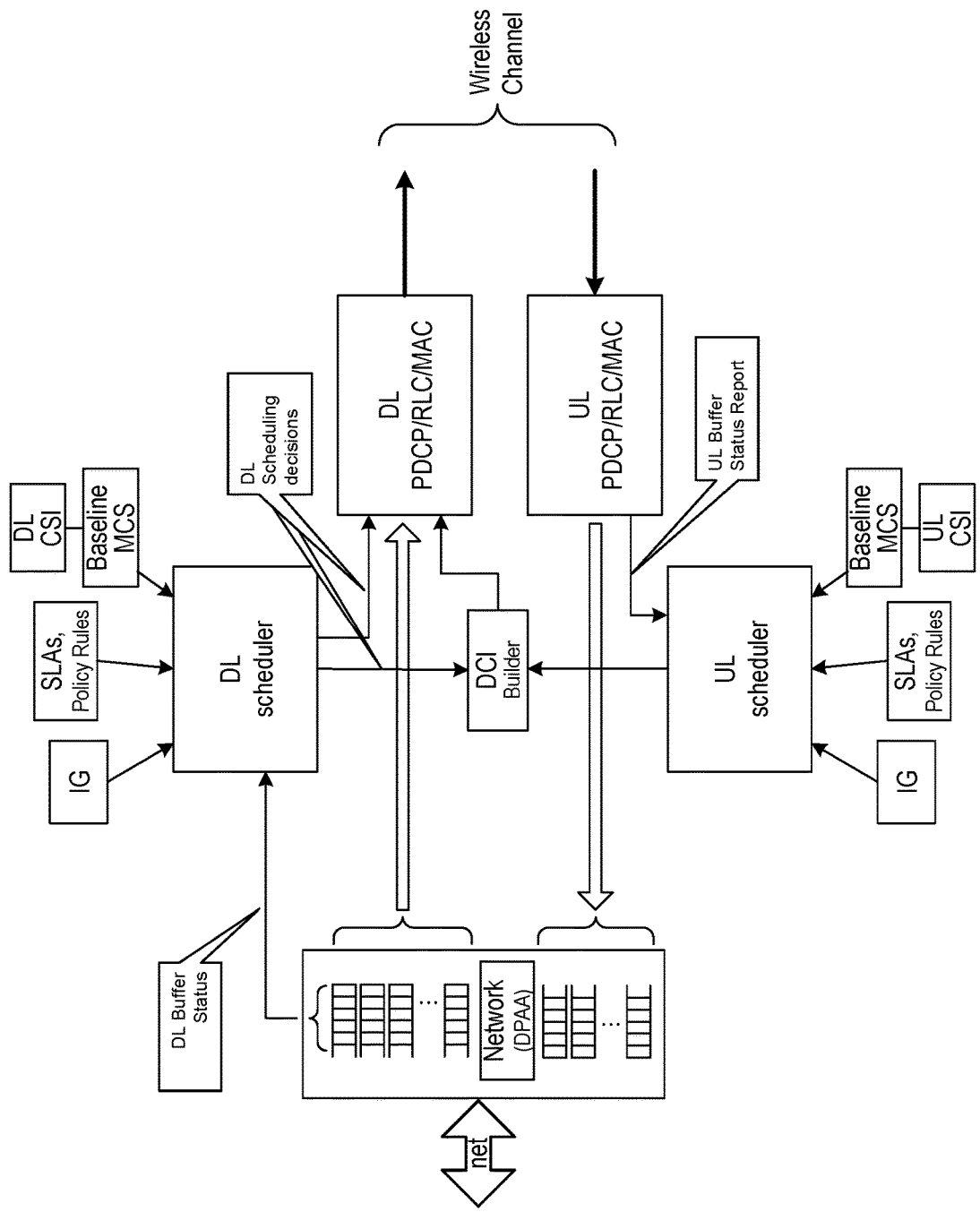
FIG. 29 is a block diagram showing an example of an uplink/downlink scheduler.

FIG. 29 shows an example implementation of a downlink and an uplink scheduler.

Figure 30:
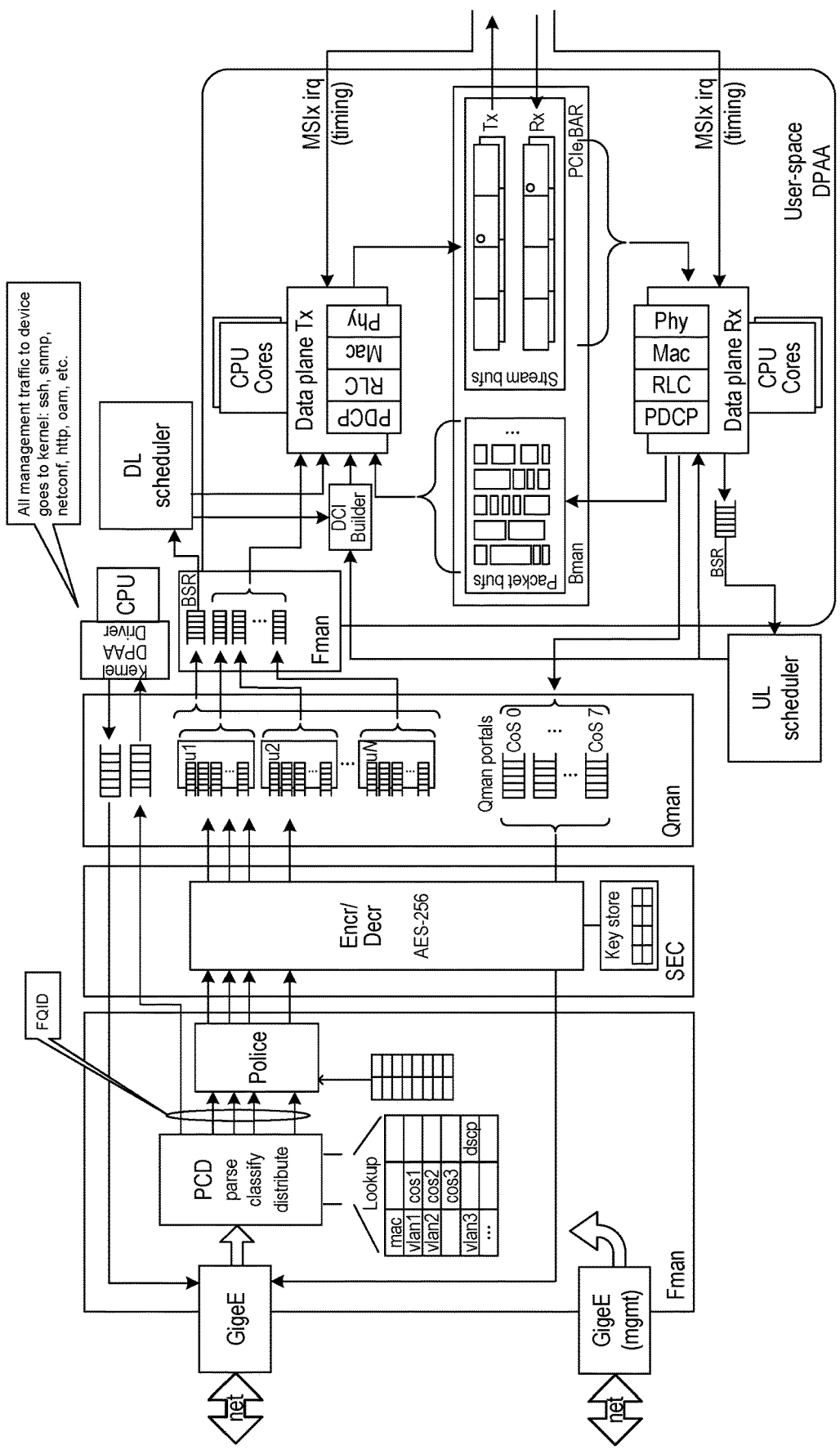
FIG. 30 is a block diagram of another example scheduler.

FIG. 30 shows an example of a distributed power allocation algorithm (DPAA) implemented with a scheduler of wireless transmissions in a wireless network.

Exemplary QoS policy includes the following: Operator backend network provisions QoS services. Examples include adding or dropping a voice call or video stream, creating/changing SLA for a user. QoS models for access equipment may be the following:

DOCSIS/WiMAX
PacketCable MultiMedia (PCMM)—provisioning.
Basic DOCSIS service flows: UGS, rtPS, nrtPS, BE
LTE
Policy and Charging Rules Function (PCRF)—provisioning.
Semi-persistent scheduling.
Metro ethernet
Device-specific provisioning
Y.1564 model, CIR/CBS/EIR/EBS, dscp & classifiers.

9.2 Multi-Beam Embodiments

Figure 31:
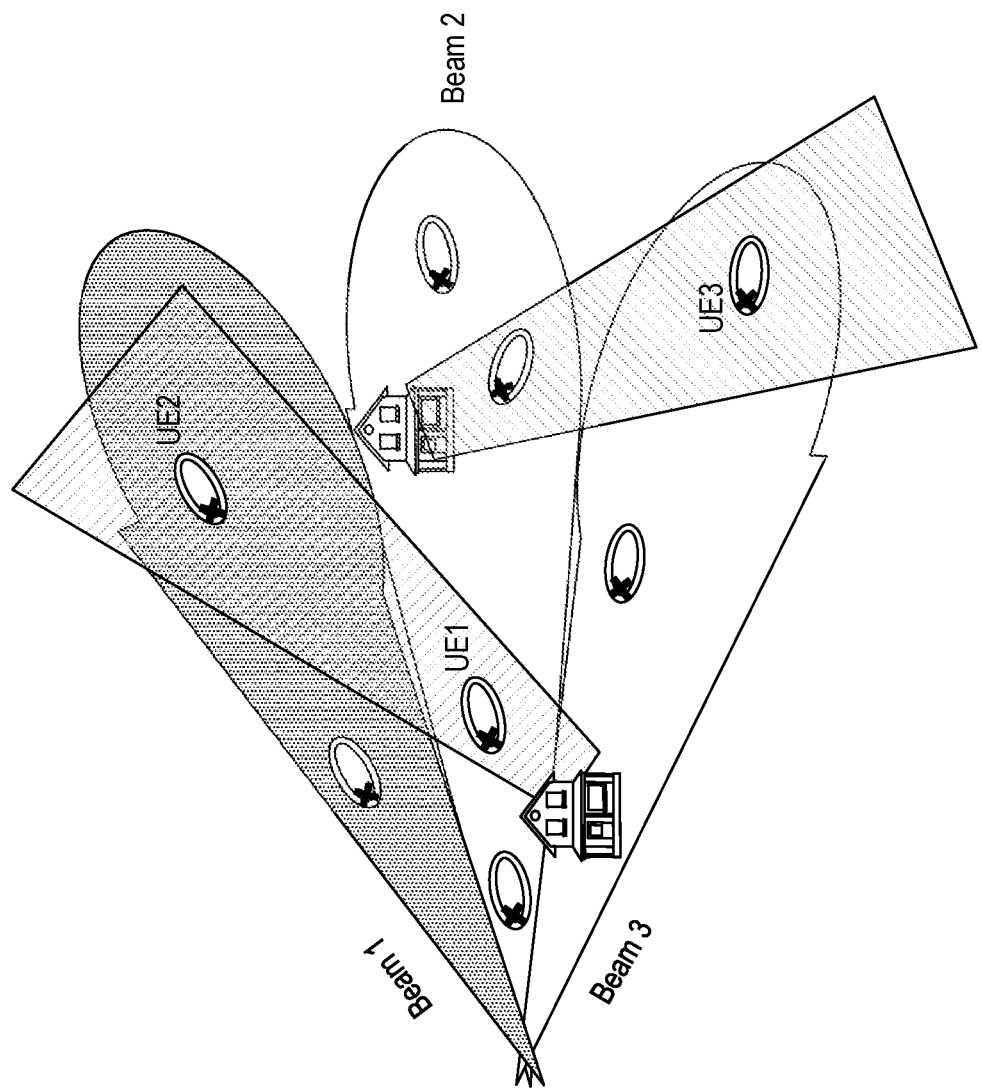
FIG. 31 shows an example of a multi-beam scenario.

FIG. 31 shows an example of a network configuration in which multi-beam wireless connectivity is provided. As shown therein, the varying levels of interference to and from different UE's are characterized by:

Some UE's near the center of a beam will be minimally impacted.
Some UE's interfere so strongly that it is silenced while allocating the other.
Other UE combinations produce SINR that will require QAM/MCS reduction.
Implies MCS per grant in DCI.
Implies creation of Interference Graph.
There will be scenarios with strong interference, and our scheduler-based interference mitigation/avoidance will be critical to our success.

10. Examples of Beam Scheduling

In recent years, new developments in wireless communication technology has made is possible for wireless systems to use spatial multiplexing in addition to the time/frequency/code division multiplexing. For example, in cellular networks such as the upcoming 5G networks and the above-described FWA networks, a network side node such as the tower 308 may form communication links with user devices using transmission beams that provide a spatially directed beam for transmitting to or receiving from user devices. In principle, transmission and reception can be made on different beams without causing interference between such signals due to their separation in the beam domain or spatial domain. This multiplexing can be advantageously used along with time/frequency/code division multiplexing to increase the data capacity of a wireless network. However, one difficulty faced by such systems is how to group all user devices to which the network node offers wireless connectivity into different groups such that the beam-based multiplexing maximally leverages the use of separation of transmission paths between the network node and the user devices.

The present document disclosed techniques that can be used by embodiments to increase the efficiency of scheduling transmissions in a beam-based wireless communication system. For example, embodiments may achieve this increased efficiency by first grouping user devices into groups such that each group can be served by a transmission beam. Each such group may further be divided into fractions (e.g., 2 or more groups) of user devices using a metric of transmission paths between the network node and the user devices. Then, transmissions may be scheduled to occur for each transmission beam to serve a user device in the subgroup, thereby having a fractional use of each beam for each group. The present document provides additional techniques and embodiments of the grouping and scheduling technique.

Figure 32:
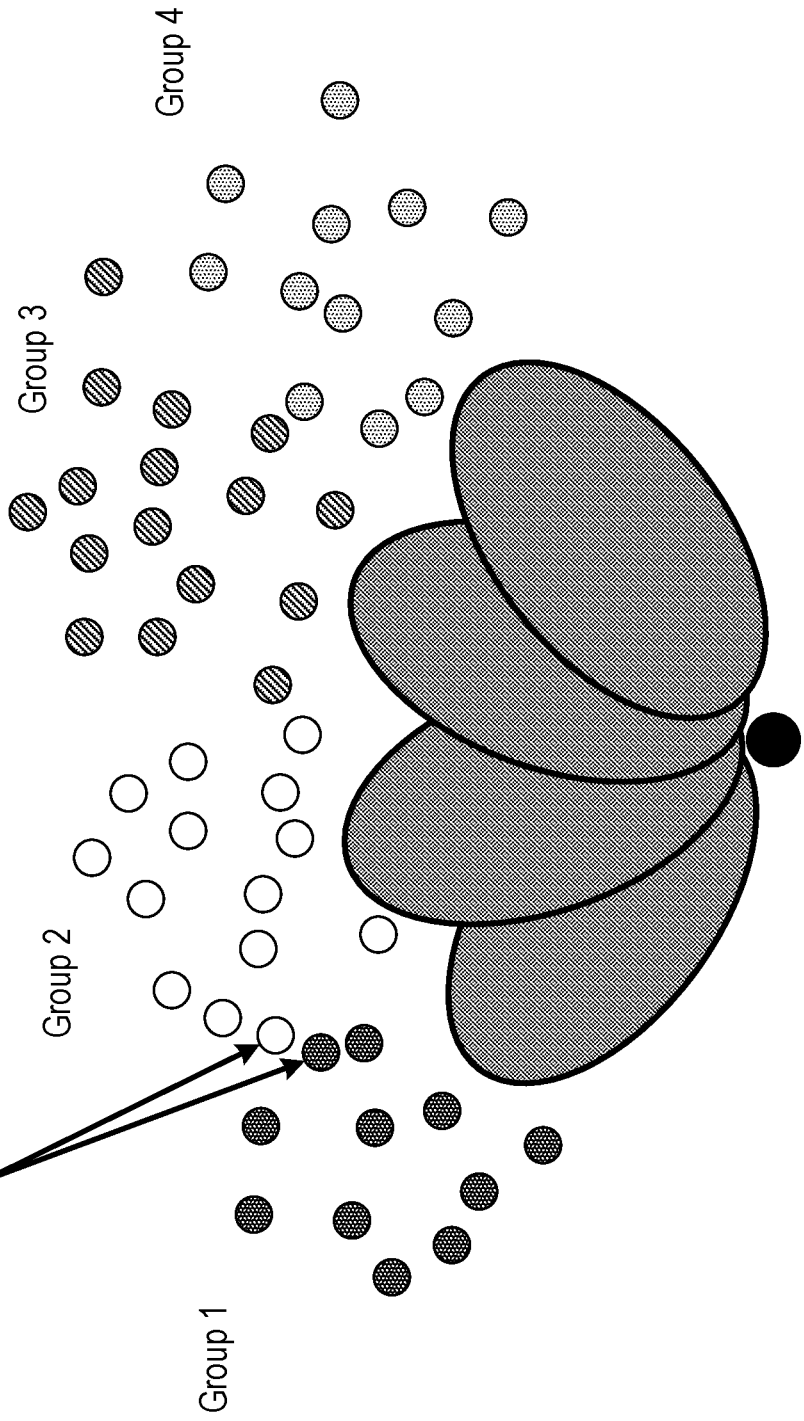
FIG. 32 shows an example of a fractional beam scheduling scenario.

FIG. 32 shows an example of scheduling multiple transmission beams for a plurality of user devices divided into different groups. As shown therein, Groups 1-4 comprise spatially separated user devices, such that the user devices (or users) in each group are covered by a single transmission beam. However, if two users with an angular separation that is lower than a threshold are selected from different groups, the resulting simultaneous transmission to these users would result in degraded performance due to high interference levels. Thus, a separation into groups based on the transmission beam may result in degraded transmissions.

Figure 33:
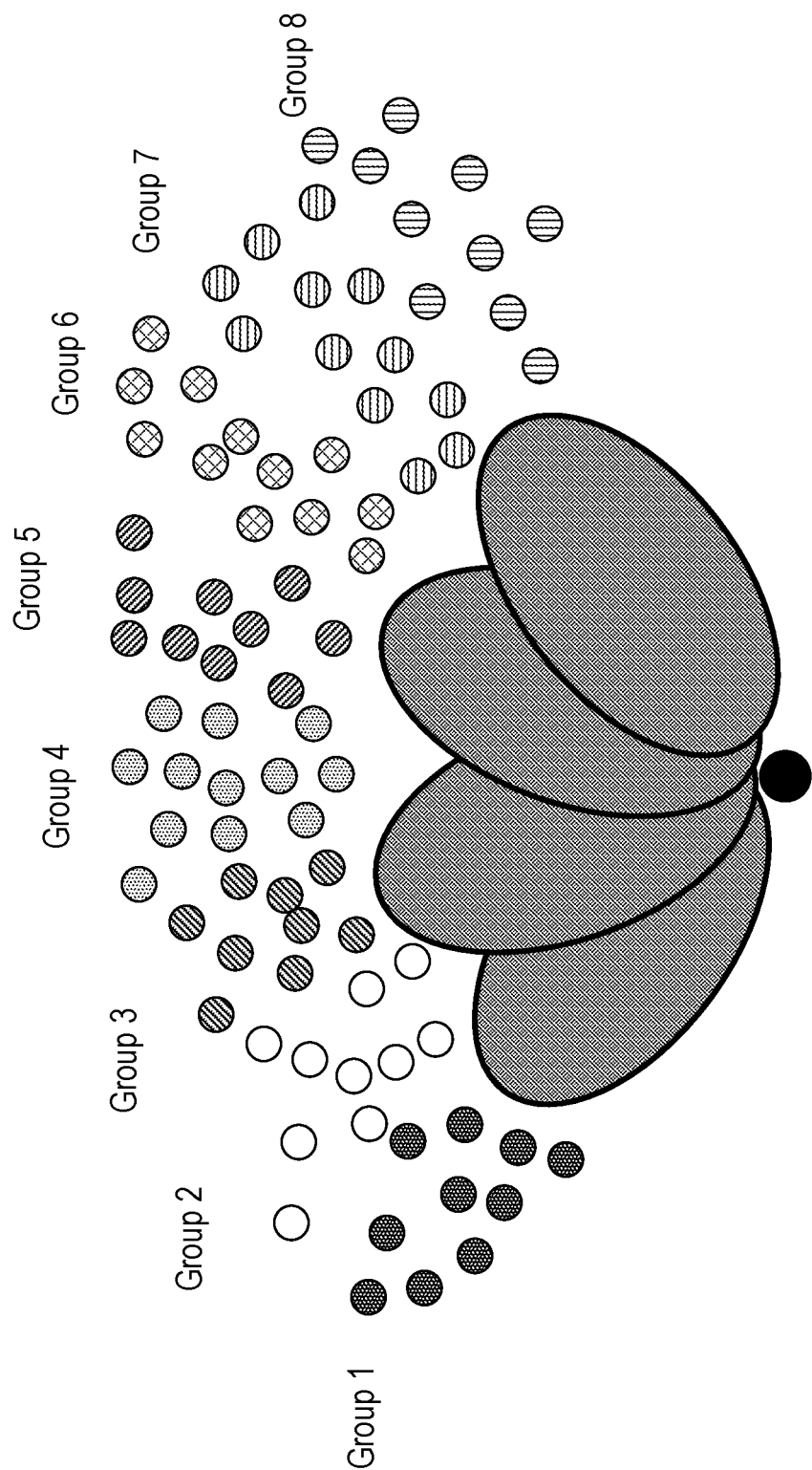
FIG. 33 shows another example of a fractional beam scheduling scenario.

FIG. 33 shows another example of scheduling multiple transmission beams for a plurality of user devices divided into groups and sub-groups. As shown therein, Groups 1-4 shown in FIG. 32 are halved and result in Groups 1-8, wherein two adjacent groups are covered by a single transmission beam. For example, Groups 1 and 2 are covered by a first transmission beam, and Groups 5 and 6 are covered by a third transmission beam. As will be described next, doubling the number of groups (referred to, in an example, as "half beam groups") may result in better performance.

Figure 34:
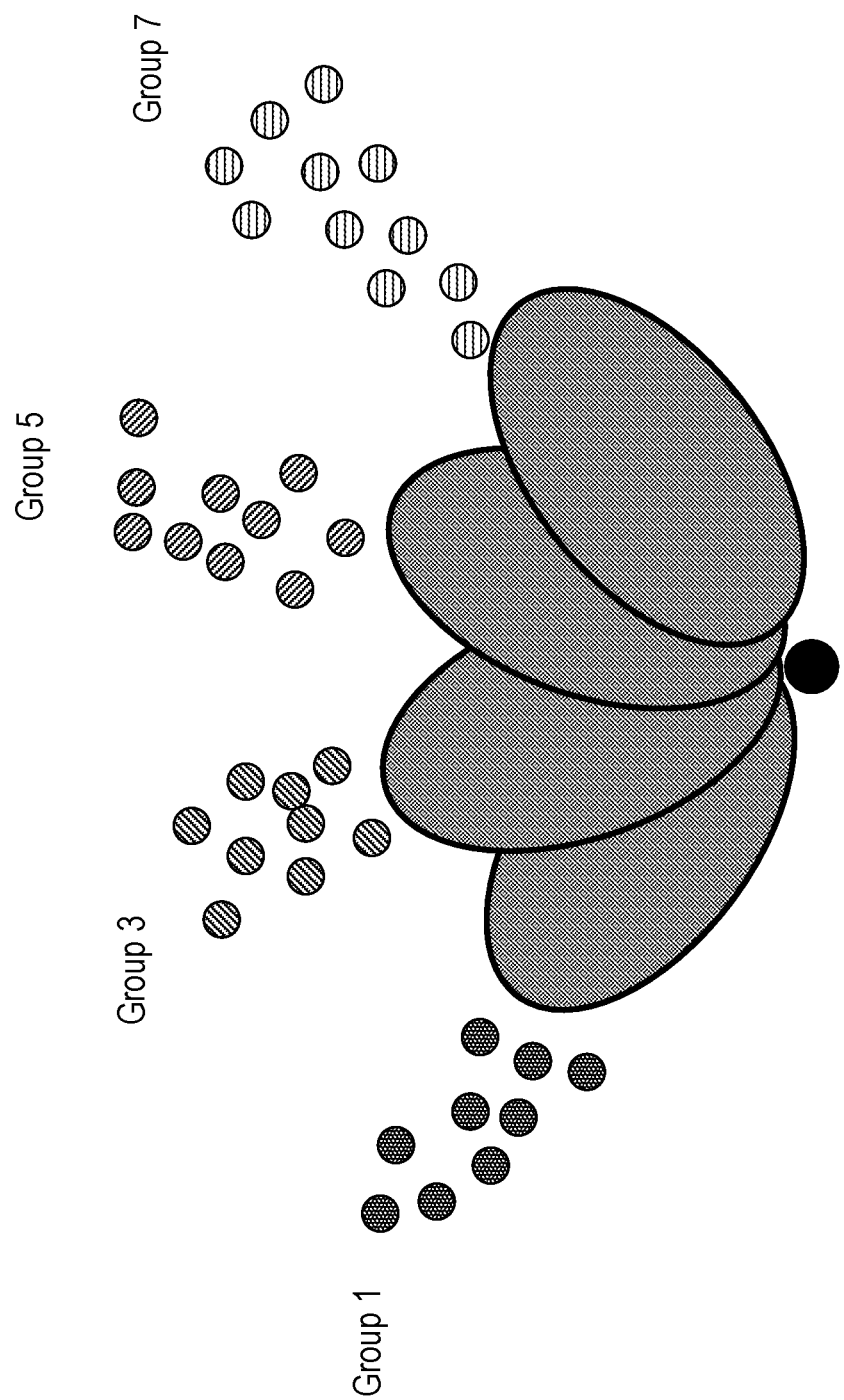
FIG. 34 shows yet another example of a fractional beam scheduling scenario.
Figure 35:
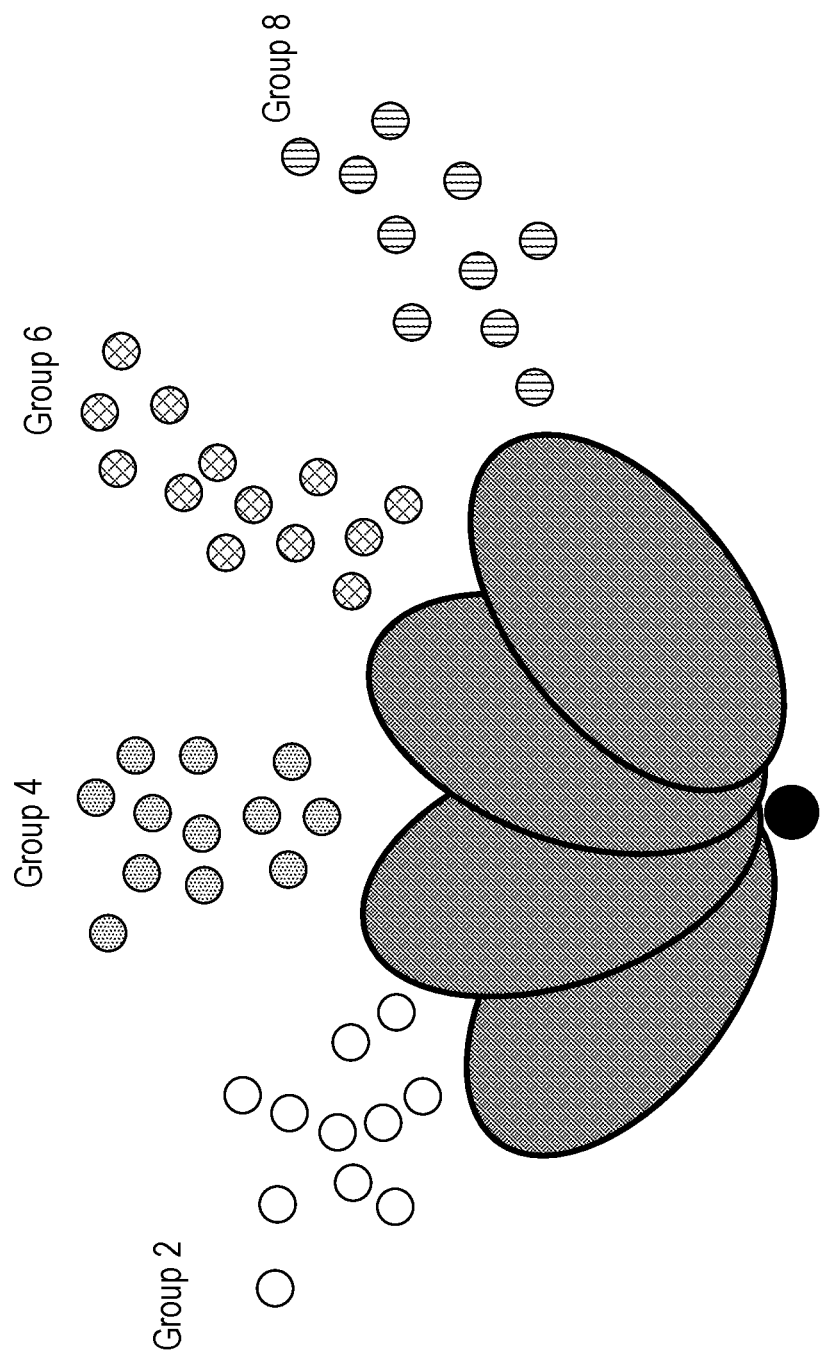
FIG. 35 shows yet another example of a fractional beam scheduling scenario.

FIGS. 34 and 35 shows an exemplary embodiment for scheduling multiple transmission beams, based on time-multiplexing, for a plurality of user devices. For example, the network node may simultaneously transmit to users (or user devices) in Groups 1, 3, 5 and 7 at a first time (as shown in FIG. 34), and to users in Groups 2, 4, 6 and 8 at a second time (as shown in FIG. 35). That is, users that are served at the same time have transmission metrics that are greater than a threshold. In an example, the threshold may be determined based on an intended level of interference that may be tolerated at the user devices. In some embodiments, the level of interference may be quantified using the signal-to-noise ratio (SNR) or the signal-to-interference-plus-noise ratio (SINR).

In some embodiments, user devices in the "half beam groups" may be scheduled simultaneously based on the transmissions being precoded at the network node, and the user devices implementing joint equalization techniques to process the received signals. For example, the precoding at the network node may be based on Tomlinson-Harashima precoding vectors.

The subsequent discussion in the present document includes parameters and setup information for numerical implementations of the disclosed technology. The various exemplary scenarios for which the fractional beam scheduling methods are implemented are (a) pure line-of-sight (LOS) with a square window, (b) synchronous unscheduled multiple access (SUMA) LOS with a square window, and (c) SUMA non-LOS (NLOS) with a Hamming window.

11. Examples of Fractional Beam Scheduling

In some example embodiments, fractional beam scheduling may be performed as follows. Let T1, T2, T3 and T4 be four transmission beams in a wireless communication network. User devices may be partitioned into corresponding four groups A, B, C and D such that the transmission path for each user device in one group corresponds to a same transmission beam (e.g., all user devices in group A use T1, all user devices in group B use T2, and so on).

According to some embodiments, the groups A, B, C and D may further be divided into multiple sub-groups. For example, A1, A2, B1, B2, C1, C2 and D1, D2 respectively. This grouping may be performed such that corresponding sub-groups in each group are isolated from each other by a transmission metric (e.g., their cross-effect, measured as SINR, is below a threshold). As an example, sub-groups A1, B1, C1 and D1 may form a first partition, while A2, B2, C2 and D2 may form a second partition. Therefore, a scheduler may schedule transmissions for all user devices of sub-groups in the first partition to occur at the same time, while being assured that the relative isolation between these transmissions will be maintained. Similarly, in a next time slot, the scheduler may schedule transmissions for user devices from the second partition, and so on, as described with respect to odd/even grouping in FIG. 32. Accordingly, it will be appreciated that using only a fraction of a group served by a transmission beam at a given time results in an overall improvement in the quality of signal transmissions received by user devices and the network node.

In some embodiments, a method that uses fractional beam scheduling in wireless systems includes determining a plurality of groups, corresponding to multiple transmission beams, by grouping user devices, partitioning user devices in each of the plurality of groups into one or more sub-groups according to a transmission metric for each user device, which is a measure of a wireless channel between a network node and the corresponding user device, and scheduling transmissions between the network node and the user devices based on time-multiplexing and multiplexing the multiple transmission beams, wherein a difference between the transmission metrics of user devices served at a same time or using a same transmission beam is above a threshold.

In some embodiments, an interference level at the subset of user devices is based on the transmission metrics of user devices.

In some embodiments, the transmission metric comprises one or more of a distance, an angular distance or a precoding vector. In one example, the precoding vector comprises a Tomlinson-Harashima precoding vector.

In some embodiments, the user devices are configured to implement a joint equalization algorithm to process the simultaneous transmissions that have been processed using precoding vectors based on the transmission metric corresponding to those user devices.

In some embodiments, the threshold is based on an intended interference level at each of the subset of user devices. In other words, the signal-to-interference-and-noise-ratio (SINR) is deterministic, and may be computed or calculated, based on the transmission metrics for each of the user devices.

For example, the precoding vectors for transmissions to the user devices may be selected based on the angular (or linear) separation between the user devices to ensure that the SINR at the user device remains below a predetermined threshold.

In some embodiments, another method that uses fractional beam scheduling in wireless systems includes determining a plurality of sub-groups by grouping user devices based on a transmission metric for each user device, which is a measure of a wireless channel between a network node and the corresponding user device, determining a subset of user devices that comprises at most one user device from each of the plurality of sub-groups, wherein a difference between the transmission metrics of each pair of user devices in the subset is greater than a threshold, and scheduling simultaneous transmissions between the network node and the subset of user devices using multiple transmission beams.

In some embodiments, the threshold is based on an intended interference level at each of the subset of user devices.

12. Examples of Distributed COMP Architectures

The described embodiments can be implemented in COMP architectures, e.g., in the context of previously described FIG. 18.

The present document describes a distributed COMP architecture in which a separation of a base station's functionality of transmission and reception of radio frequency (RF) signals between UEs and functionality of channel estimation, prediction, precoding and retransmission management. Furthermore, mmwave links may be established between the RF functionality sites and the remove or network-side computing server for exchanging information related to ongoing operation of the cellular network.

Figure 36:
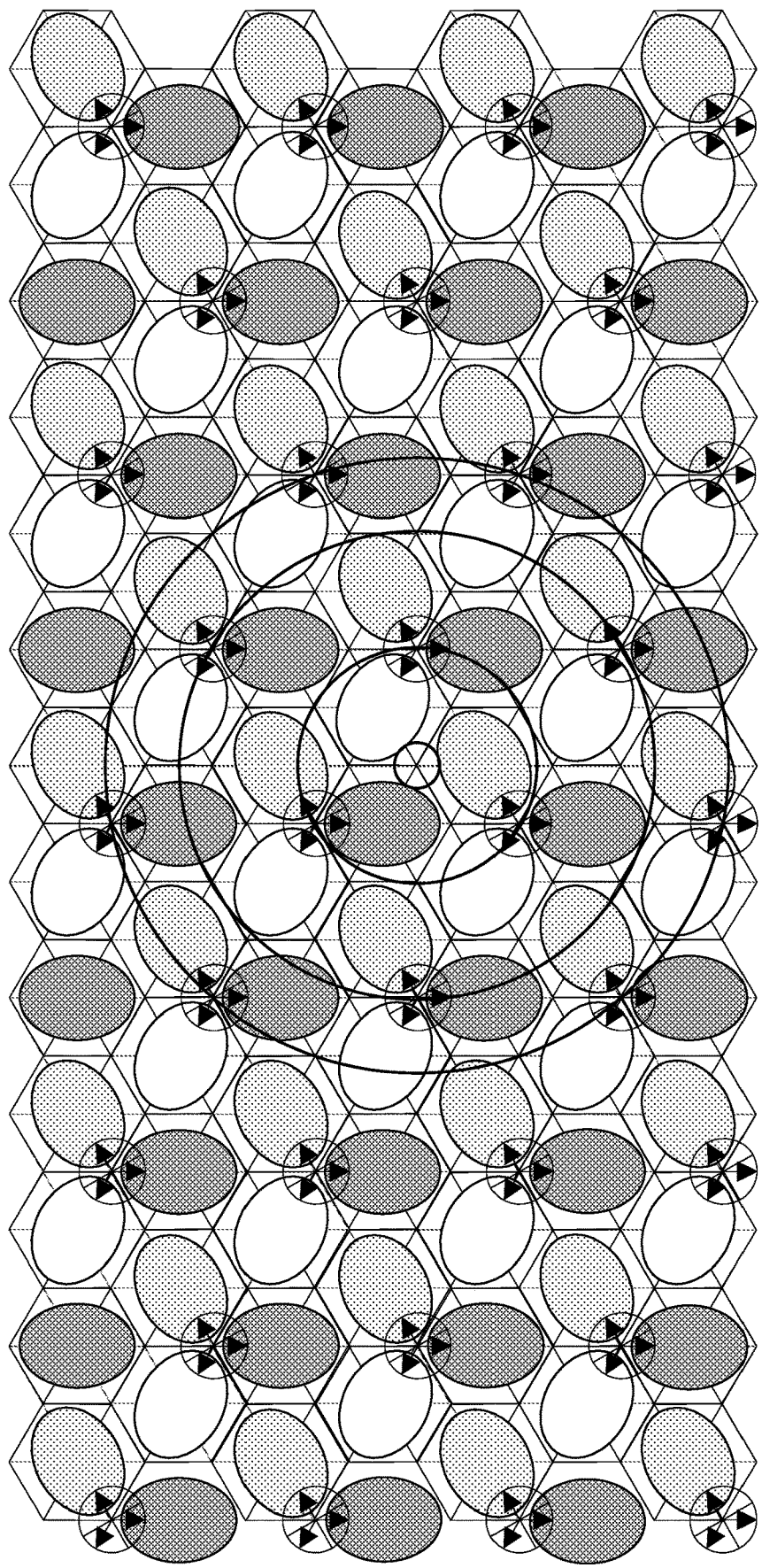
FIG. 36 shows an example of a cellular 3-sector hexagonal model.

FIG. 36 shows an example of a cellular 3-sector hexagonal model. In this model, a base station transceiver may be operated at center of each small circle and may provide wireless connectivity using three spatial sectors/beams that span 120 degrees surrounding the base station. The larger concentric circles show the neighboring cells in which a transition of a UE operating in a sector at the center may occur due to mobility. The concentric circles also show interference circumferences where neighboring sectors may affect signal quality in each other.

Figure 37:
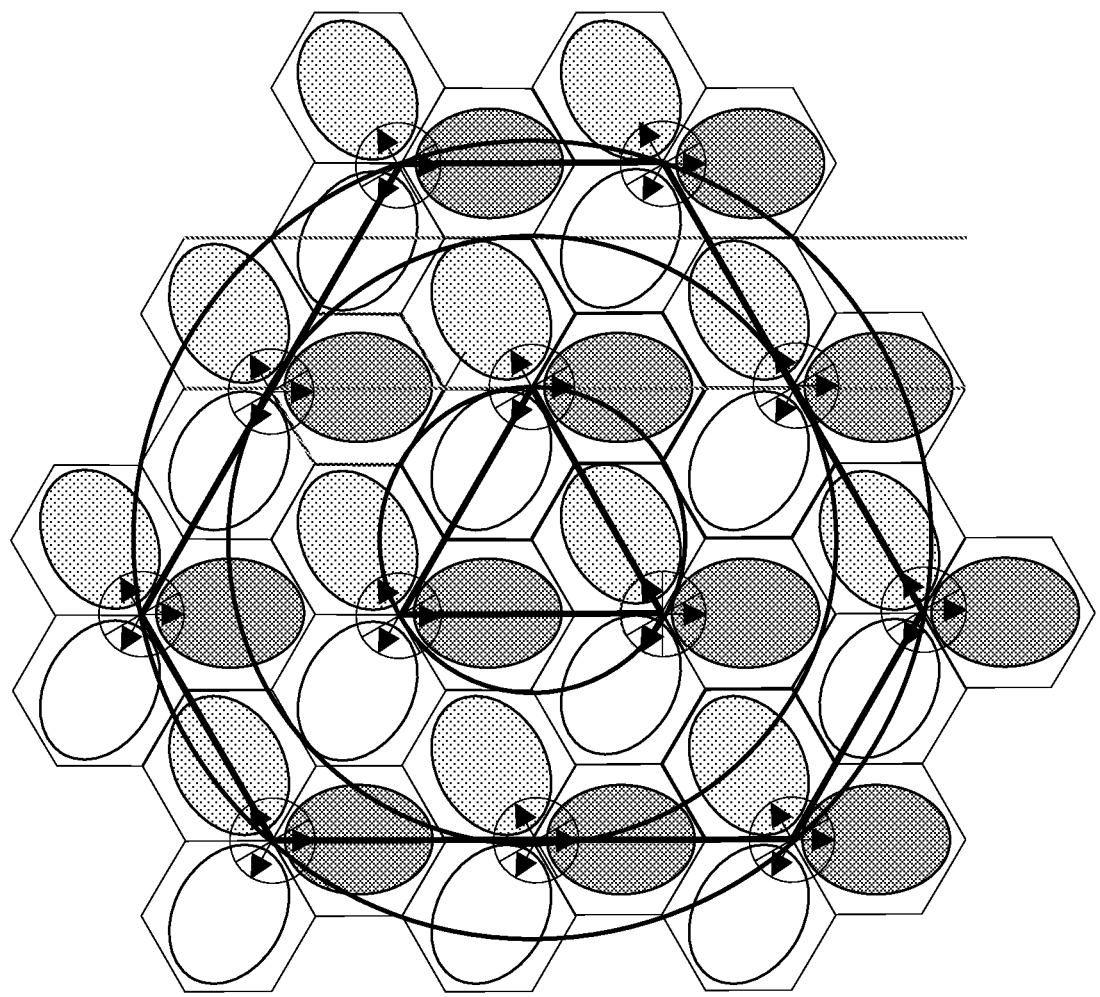
FIG. 37 shows examples of interference circumferences in wireless networks.

FIG. 37 shows an enlarged view of interference circumferences in the wireless network depicted in FIG. 36.

Figure 38:
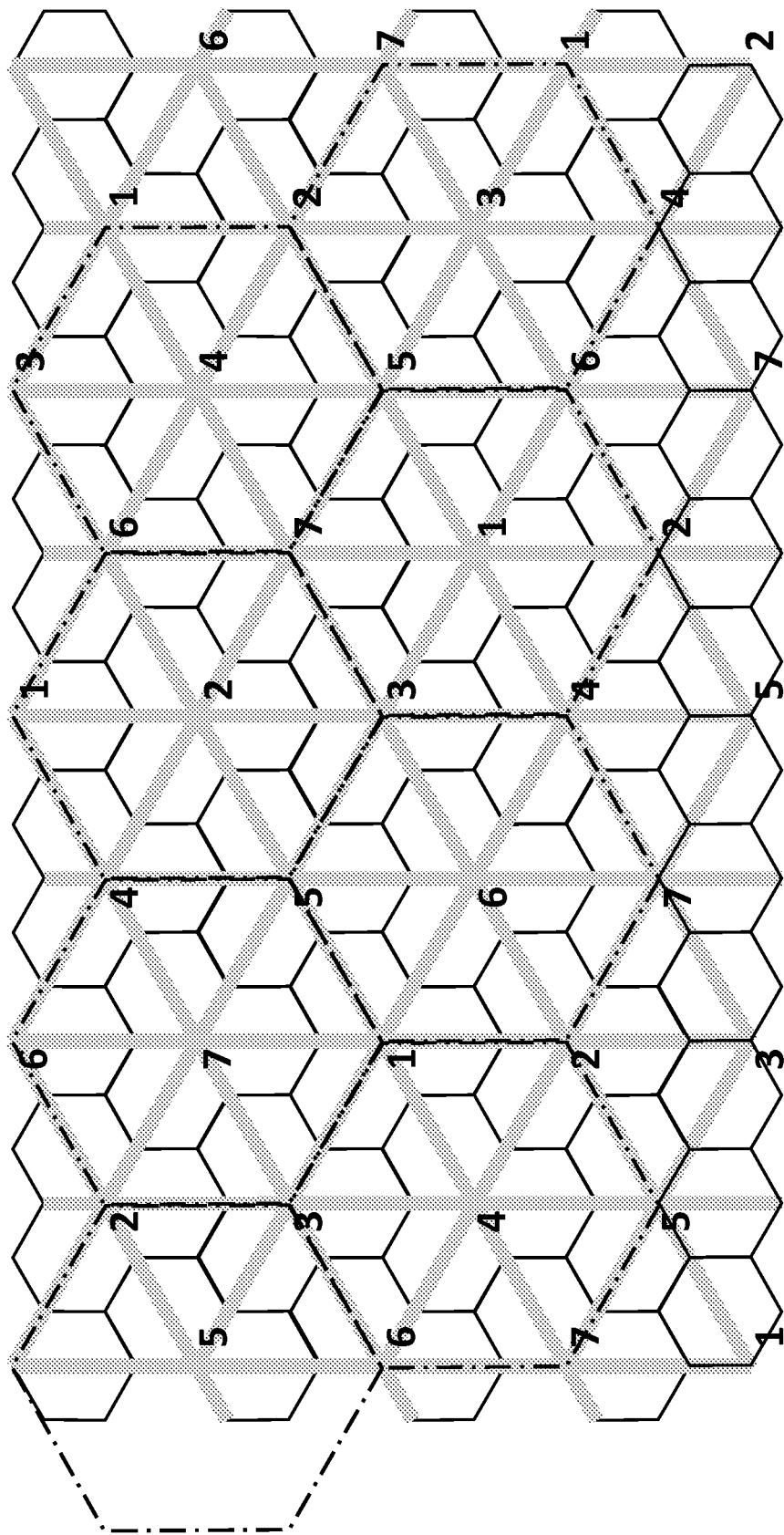
FIG. 38 shows an example of distributed cooperative multipoint (COMP) clusters.

FIG. 38 shows an example of distributed cooperative multipoint (COMP) clusters. In this example, each cluster includes base stations 1 to 7, where one base station is at a center and the other base station are vertices of a hexagonal around the center station. The base stations may offer 3-sector coverage as described with respect to FIG. 36. The base stations may be connected with a wireless connection (possibly with a Line of Sight), that is depicted as the straight lines joining each base station, or node, 1 to 7 to neighboring base stations.

Figure 39:
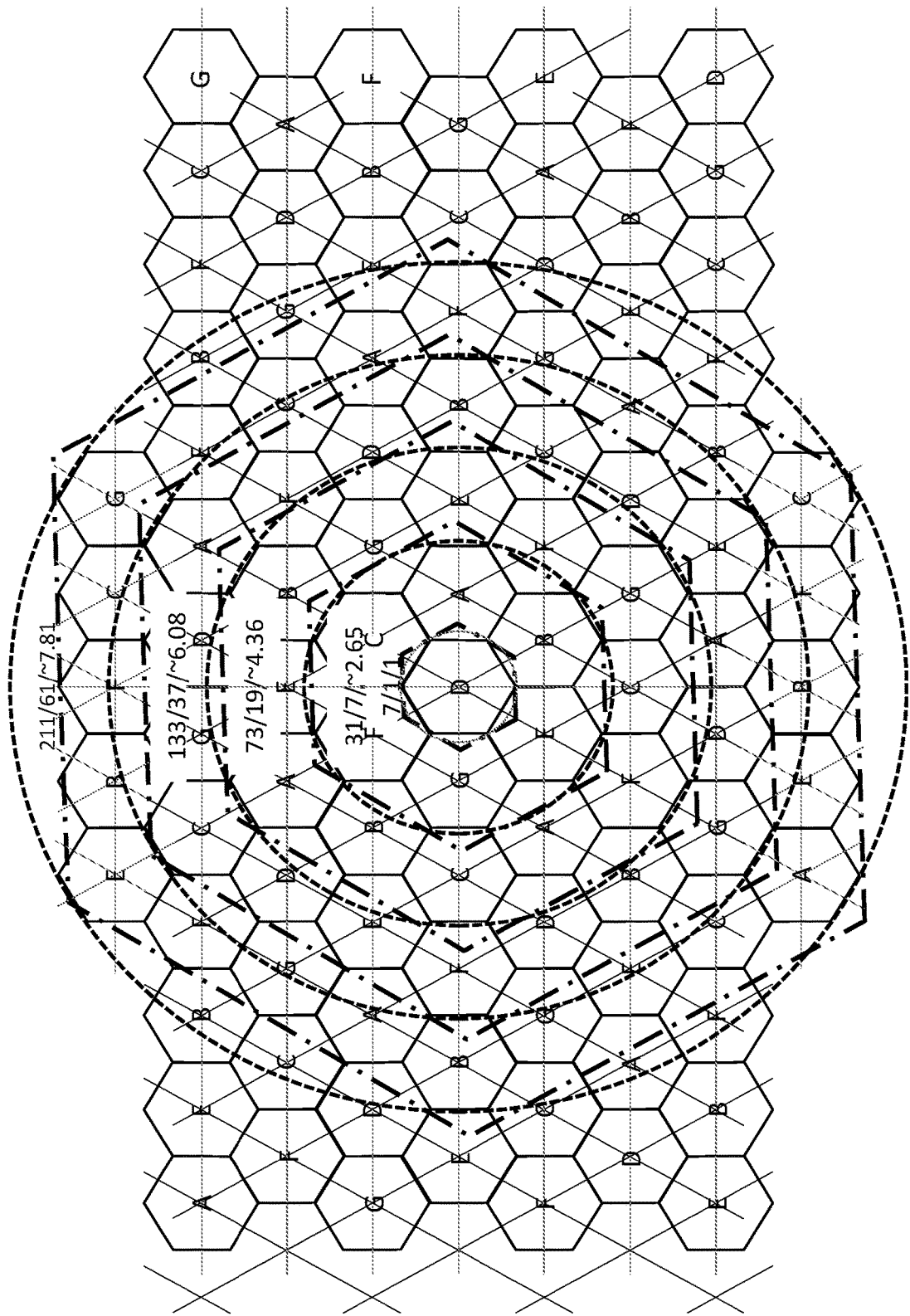
FIG. 39 shows examples of sizing of COMP clusters.

FIG. 39 shows examples of sizing of COMP clusters. For example, a single network-side resource may handle the channel determination and prediction tasks for all sectors within a given cluster.

The following calculations may be used for resource planning in the network.

Nodes=$9n^2-3n+1$

Clusters=$3n^2-3n+1$

Links=$6(3n^2-3n+1)$ $3n(n-1)+1=(R/D)^2$

The table below shows example values which may be used in some embodiments.

| n | cells | Clusters | R/D |
|---|---|---|---|
| 10 | 871 | 271 | 16.46 |
| 20 | 3541 | 1141 | 33.78 |
| 30 | 8011 | 2611 | 51.10 |

13. Multiple Access and Precoding in OTFS Systems

In some embodiments, the multiple access and precoding approaches described here can be implemented in the context of the spatial precoder or postcoder in FIG. 4, the MIMO precoder in FIG. 20, the precoding operations in FIGS. 21-22, and so on.

Figure 40:
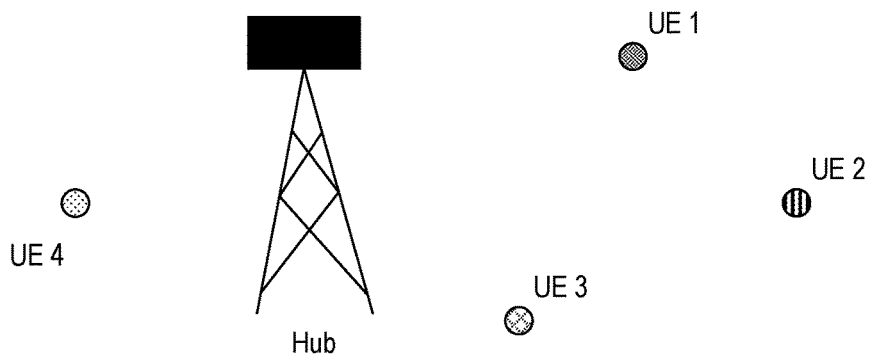
FIG. 40 depicts an example network configuration in which a hub services for user equipment (UE).

This section covers multiple access and precoding protocols that are used in typical OTFS systems. FIG. 40 depicts a typical example scenario in wireless communication is a hub transmitting data over a fixed time and bandwidth to several user devices (UEs). For example: a tower transmitting data to several cell phones, or a Wi-Fi router transmitting data to several devices. Such scenarios are called multiple access scenarios.

Orthogonal Multiple Access

Figure 41:
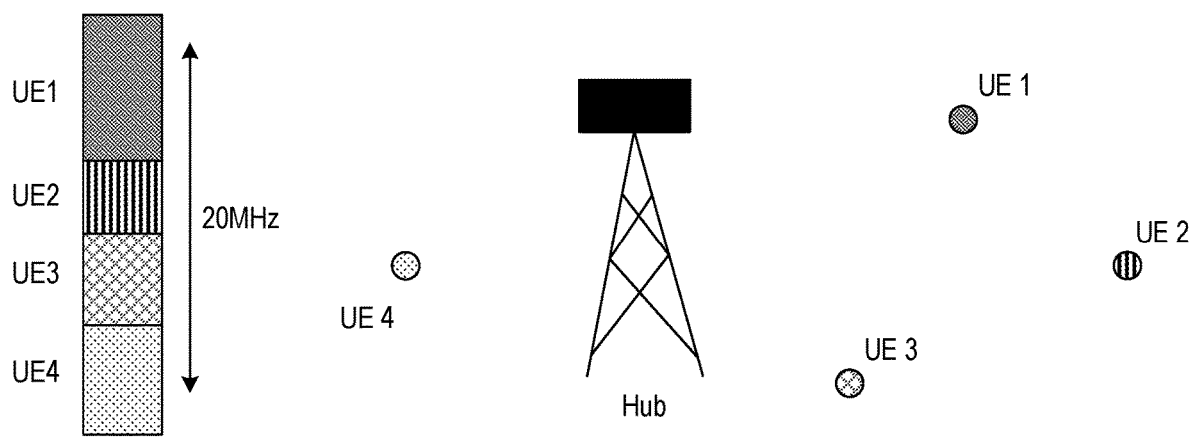
FIG. 41 depicts an example embodiment in which an orthogonal frequency division multiplexing access (OFDMA) scheme is used for communication.

Currently the common technique used for multiple access is orthogonal multiple access. This means that the hub breaks it's time and frequency resources into disjoint pieces and assigns them to the UEs. An example is shown in FIG. 41, where four UEs (UE1, UE2, UE3 and UE4) get four different frequency allocations and therefore signals are orthogonal to each other.

The advantage of orthogonal multiple access is that each UE experience its own private channel with no interference. The disadvantage is that each UE is only assigned a fraction of the available resource and so typically has a low data rate compared to non-orthogonal cases.

Precoding Multiple Access

Figure 42:
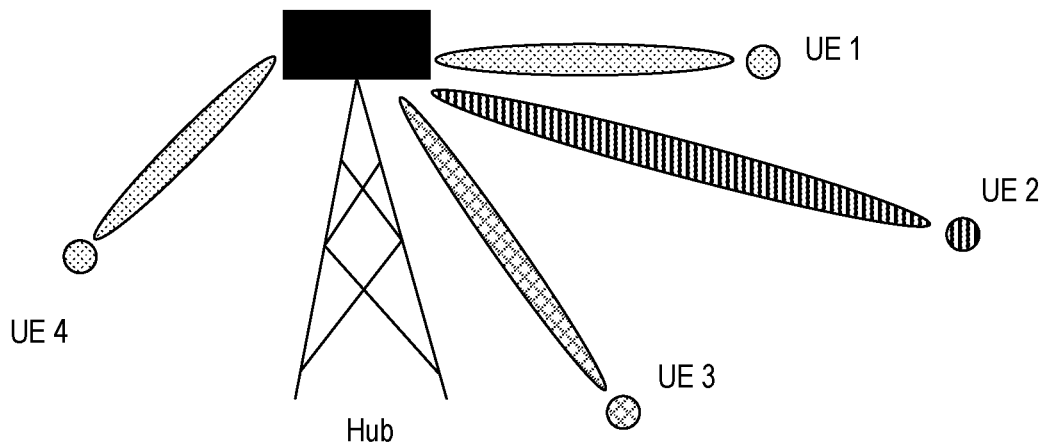
FIG. 42 illustrates the concept of precoding in an example network configuration.

Recently, a more advanced technique, precoding, has been proposed for multiple access. In precoding, the hub is equipped with multiple antennas. The hub uses the multiple antennas to create separate beams which it then uses to transmit data over the entire bandwidth to the UEs. An example is depicted in FIG. 42, which shows that the hub is able to form individual beams of directed RF energy to UEs based on their positions.

The advantage of precoding it that each UE receives data over the entire bandwidth, thus giving high data rates. The disadvantage of precoding is the complexity of implementation. Also, due to power constraints and noisy channel estimates the hub cannot create perfectly disjoint beams, so the UEs will experience some level of residual interference.

Introduction to Precoding

Precoding may be implemented in four steps: channel acquisition, channel extrapolation, filter construction, filter application.

Channel acquisition: To perform precoding, the hub determines how wireless signals are distorted as they travel from the hub to the UEs. The distortion can be represented mathematically as a matrix: taking as input the signal transmitted from the hubs antennas and giving as output the signal received by the UEs, this matrix is called the wireless channel.

Channel prediction: In practice, the hub first acquires the channel at fixed times denoted by $s_1, s_2, \ldots, s_n$. Based on these values, the hub then predicts what the channel will be at some future times when the pre-coded data will be transmitted, we denote these times denoted by $t_1, t_2, \ldots, t_m$.

Filter construction: The hub uses the channel predicted at $t_1, t_2, \ldots, t_m$ to construct precoding filters which minimize the energy of interference and noise the UEs receive.

Filter application: The hub applies the precoding filters to the data it wants the UEs to receive.

Channel Acquisition

This section gives a brief overview of the precise mathematical model and notation used to describe the channel.

Time and frequency bins: the hub transmits data to the UEs on a fixed allocation of time and frequency. This document denotes the number of frequency bins in the allocation by $N_f$ and the number of time bins in the allocation by $N_t$.

Number of antennas: the number of antennas at the hub is denoted by $L_h$, the total number of UE antennas is denoted by $L_u$.

Transmit signal: for each time and frequency bin the hub transmits a signal which we denote by $\varphi(f, t) \in \mathbb{C}^{L_h}$ for $f=1, \ldots, N_f$ and $t=1, \ldots, N_t$.

Receive signal: for each time and frequency bin the UEs receive a signal which we denote by $y(f, t) \in \mathbb{C}^{L_u}$ for $f=1, \ldots, N_f$ and $t=1, \ldots, N_t$.

White noise: for each time and frequency bin white noise is modeled as a vector of iid Gaussian random variables with mean zero and variance No. This document denotes the noise by $w(f, r) \in \mathbb{C}^{L_u}$ for $f=1, \ldots, N_f$ and $t=1, \ldots, N_t$.

Channel matrix: for each time and frequency bin the wireless channel is represented as a matrix and is denoted by $H(f, t) \in \mathbb{C}^{L_u \times L_h}$ for $f=1, \ldots, N_f$ and $t=1, \ldots, N_t$.

Figure 43:
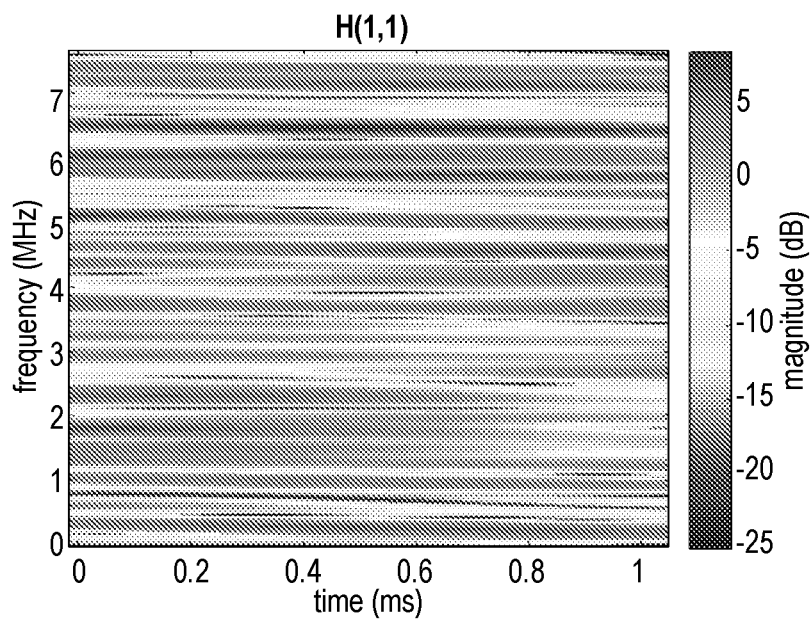
FIG. 43 is a spectral chart of an example of a wireless communication channel.

The wireless channel can be represented as a matrix which relates the transmit and receive signals through a simple linear equation:

$$y(f,t) = H(f,t)\varphi(f,t) + w(f,t) \quad (1)$$

for $f=1, \ldots, N_f$ and $t=1, \ldots, N_t$. FIG. 43 shows an example spectrogram of a wireless channel between a single hub antenna and a single UE antenna. The graph is plotted with time as the horizontal axis and frequency along the vertical axis. The regions are shaded to indicate where the channel is strong or weak, as denoted by the dB magnitude scale shown in FIG. 43.

Two common ways are typically used to acquire knowledge of the channel at the hub: explicit feedback and implicit feedback.

Explicit Feedback

In explicit feedback, the UEs measure the channel and then transmit the measured channel back to the hub in a packet of data. The explicit feedback may be done in three steps.

Pilot transmission: for each time and frequency bin the hub transmits a pilot signal denoted by $p(f, t) \in \mathbb{C}^{L_h}$ for $f=1, \ldots, N_f$ and $t=1, \ldots, N_t$. Unlike data, the pilot signal is known at both the hub and the UEs.

Channel acquisition: for each time and frequency bin the UEs receive the pilot signal distorted by the channel and white noise:

$$H(f,t)p(f,t) + w(f,t), \quad (2)$$

for f=1, ..., $N_f$ and t=1, ..., $N_t$. Because the pilot signal is known by the UEs, they can use signal processing to compute an estimate of the channel, denoted by $\hat{H}(f, t)$.

Feedback: the UEs quantize the channel estimates $\hat{H}(f, t)$ into a packet of data. The packet is then transmitted to the hub.

The advantage of explicit feedback is that it is relatively easy to implement. The disadvantage is the large overhead of transmitting the channel estimates from the UEs to the hub.

Implicit Feedback

Figure 44:
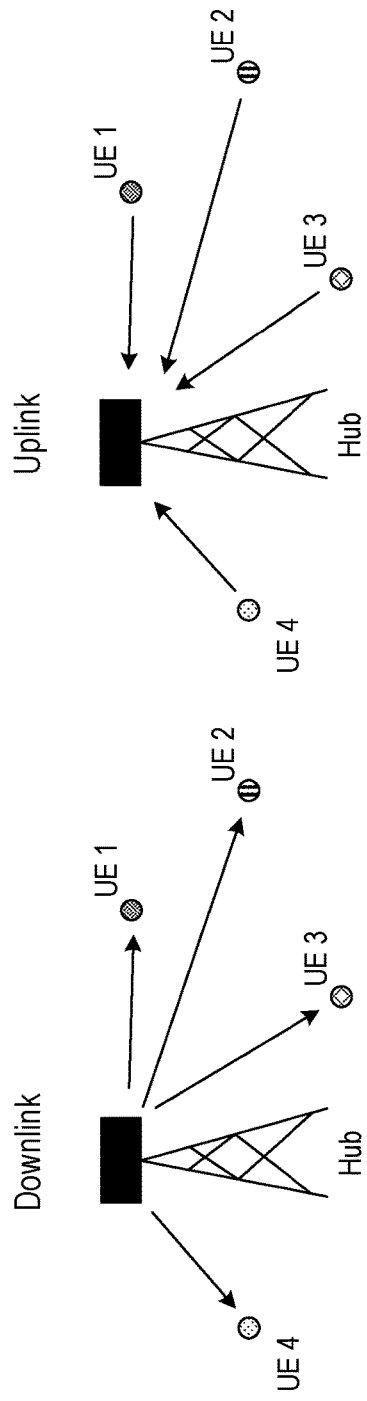
FIG. 44 illustrates examples of downlink and uplink transmission directions.

Implicit feedback is based on the principle of reciprocity which relates the uplink channel (UEs transmitting to the hub) to the downlink channel (hub transmitting to the UEs). FIG. 44 shows an example configuration of uplink and downlink channels between a hub and multiple UEs.

Specifically, denote the uplink and downlink channels by $H_{up}$ and $H$ respectively, then:

$$H(f,t) = A\, H_{up}^T(f,t) B, \qquad (3)$$

for f=1, ..., $N_f$ and t=1, ..., $N_t$. Where $H_{up}^T(f, t)$ denotes the matrix transpose of the uplink channel. The matrices $A \in \mathbb{C}^{L_u \times L_u}$ and $B \in \mathbb{C}^{L_h \times L_h}$ represent hardware non-idealities. By performing a procedure called reciprocity calibration, the effect of the hardware non-idealities can be removed, thus giving a simple relationship between the uplink and downlink channels:

$$H(f,t) = H_{up}^T(f,t) \qquad (4)$$

The principle of reciprocity can be used to acquire channel knowledge at the hub. The procedure is called implicit feedback and consists of three steps.

Reciprocity calibration: the hub and UEs calibrate their hardware so that equation (4) holds.

Pilot transmission: for each time and frequency bin the UEs transmits a pilot signal denoted by $p(f, t) \in \mathbb{C}^{L_u}$ for f=1, ..., $N_f$ and t=1, ..., $N_t$. Unlike data, the pilot signal is known at both the hub and the UEs.

Channel acquisition: for each time and frequency bin the hub receives the pilot signal distorted by the uplink channel and white noise:

$$H_{up}(f,t) p(f,t) + w(f,t) \qquad (5)$$

for f=1, ..., $N_f$ and t=1, ..., $N_t$. Because the pilot signal is known by the hub, it can use signal processing to compute an estimate of the uplink channel, denoted by $\widehat{H_{up}}(f, t)$. Because reciprocity calibration has been performed the hub can take the transpose to get an estimate of the downlink channel, denoted by $\hat{H}(f, t)$.

The advantage of implicit feedback is that it allows the hub to acquire channel knowledge with very little overhead; the disadvantage is that reciprocity calibration is difficult to implement.

Channel Prediction

Figure 45:
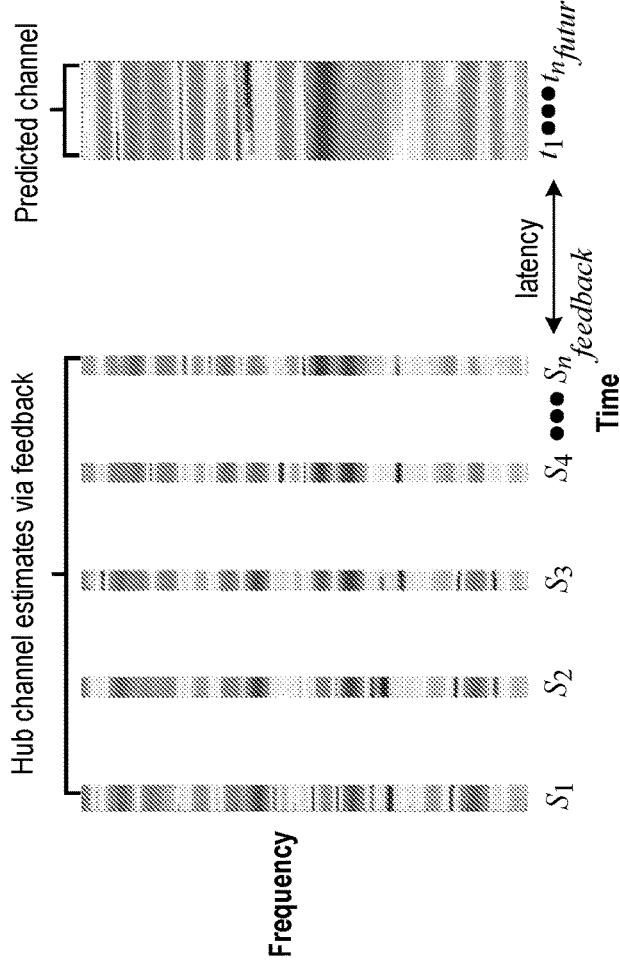
FIG. 45 illustrates spectral effects of an example of a channel prediction operation.

Using either explicit or implicit feedback, the hub acquires estimates of the downlink wireless channel at certain times denoted by $s_1, s_2, ..., s_n$ using these estimates it must then predict what the channel will be at future times when the precoding will be performed, denoted by $t_1, t_2, ..., t_m$. FIG. 45 shows this setup in which "snapshots" of channel are estimated, and based on the estimated snapshots, a prediction is made regarding the channel at a time in the future. As depicted in FIG. 45, channel estimates may be available across the frequency band at a fixed time slots, and based on these estimates, a predicated channel is calculated.

There are tradeoffs when choosing the feedback times $s_1, s_2, ..., s_n$.

Latency of extrapolation: Refers to the temporal distance between the last feedback time, $s_n$, and the first prediction time, $t_1$, determines how far into the future the hub needs to predict the channel. If the latency of extrapolation is large, then the hub has a good lead time to compute the pre-coding filters before it needs to apply them. On the other hand, larger latencies give a more difficult prediction problem.

Density: how frequent the hub receives channel measurements via feedback determines the feedback density. Greater density leads to more accurate prediction at the cost of greater overhead.

There are many channel prediction algorithms in the literature. They differ by what assumptions they make on the mathematical structure of the channel. The stronger the assumption, the greater the ability to extrapolate into the future if the assumption is true. However, if the assumption is false then the extrapolation will fail. For example:

Polynomial extrapolation: assumes the channel is smooth function. If true, can extrapolate the channel a very short time into the future ≈0.5 ms.

Bandlimited extrapolation: assumes the channel is a bandlimited function. If true, can extrapolated a short time into the future ≈1 ms.

MUSIC extrapolation: assumes the channel is a finite sum of waves. If true, can extrapolate a long time into the future ≈10 ms.

Precoding Filter Computation and Application

Using extrapolation, the hub computes an estimate of the downlink channel matrix for the times the pre-coded data will be transmitted. The estimates are then used to construct precoding filters. Precoding is performed by applying the filters on the data the hub wants the UEs to receive. Before going over details we introduce notation.

Channel estimate: for each time and frequency bin the hub has an estimate of the downlink channel which we denote by $\hat{H}(f, t) \in \mathbb{C}^{L_u \times L_h}$ for f=1, ..., $N_f$ and t=1, ..., $N_t$.

Precoding filter: for each time and frequency bin the hub uses the channel estimate to construct a precoding filter which we denote by $W(f, t) \in \mathbb{C}^{L_h \times L_u}$ for f=1, ..., $N_f$ and t=1, ..., $N_t$.

Data: for each time and frequency bin the UE wants to transmit a vector of data to the UEs which we denote by $x(f, t) \in \mathbb{C}^{L_u}$ for f=1, ..., $N_f$ and t=1, ..., $N_t$.

Hub Energy Constraint

When the precoder filter is applied to data, the hub power constraint is an important consideration. We assume that the total hub transmit energy cannot exceed $N_f N_t L_h$. Consider the pre-coded data:

$$W(f,t) x(f,t), \qquad (6)$$

for f=1, ..., $N_f$ and t=1, ..., $N_t$. To ensure that the pre-coded data meets the hub energy constraints the hub applies normalization, transmitting:

$$\lambda W(f,t) \times (f,t), \qquad (7)$$

for f=1, ..., $N_f$ and t=1, ..., $N_t$. Where the normalization constant $\lambda$ is given by:

$$\lambda = \sqrt{\frac{N_f N_t L_h}{\sum_{f,t} \|W(f,t) x(f,t)\|^2}} \qquad (8)$$

Receiver SNR

The pre-coded data then passes through the downlink channel, the UEs receive the following signal:

$$\lambda H(f,t)W(f,t)\times(f,t)+w(f,t), \quad (9)$$

for f=1, ..., $N_f$ and t=1, ..., $N_t$. The UE then removes the normalization constant, giving a soft estimate of the data:

$$x_{soft}(f, t) = H(f, t)W(f, t)x(f, t) + \frac{1}{\lambda}w(f, t), \quad (10)$$

for f=1, ..., $N_f$ and t=1, ..., $N_t$. The error of the estimate is given by:

$$x_{soft}(f, t) - x(f, t) = H(f, t)W(f, t)x(f, t) - x(f, t) + \frac{1}{\lambda}w(f, t), \quad (11)$$

The error of the estimate can be split into two terms. The term H(f, t)W(f, t)−x(f, t) is the interference experienced by the UEs while the term $$\frac{1}{\lambda}w(f, t)$$

gives me noise experienced by the UEs.

When choosing a pre-coding filter there is a tradeoff between interference and noise. We now review the two most popular pre-coder filters: zero-forcing and regularized zero-forcing.

Zero Forcing Precoder

Figure 46:
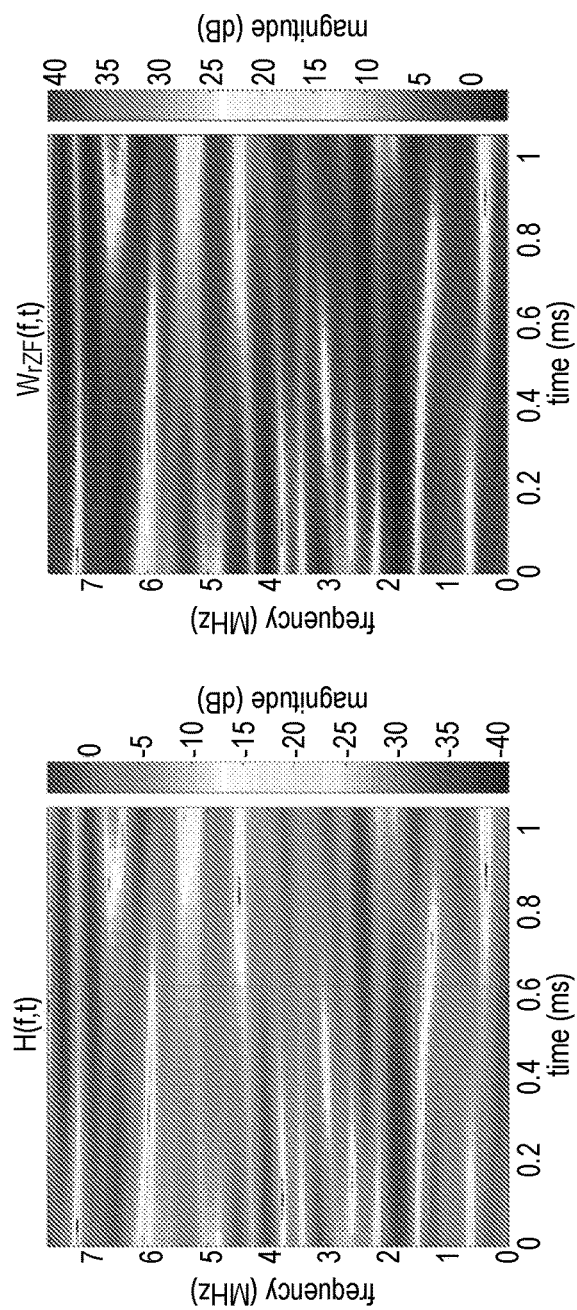
FIG. 46 graphically illustrates operation of an example implementation of a zero-forcing precoder (ZFP).

The hub constructs the zero forcing pre-coder (ZFP) by inverting its channel estimate:

$$W_{ZF}(f,t)=(\hat{H}^*(f,t)\hat{H}(f,t))^{-1}\hat{H}^*(f,t), \quad (12)$$

for f=1, ..., $N_f$ and t=1, ..., $N_t$. The advantage of ZPP is that the UEs experience little interference (if the channel estimate is perfect then the UEs experience no interference). The disadvantage of ZFP is that the UEs can experience a large amount of noise. This is because at time and frequency bins where the channel estimate Ĥ(f, t) is very small the filter $W_{ZF}$(f, t) will be very large, thus causing the normalization constant A to be very small giving large noise energy. FIG. 46 demonstrates this phenomenon for a SISO channel.

Regularized Zero-Forcing Pre-Coder (rZFP)

Figure 47:
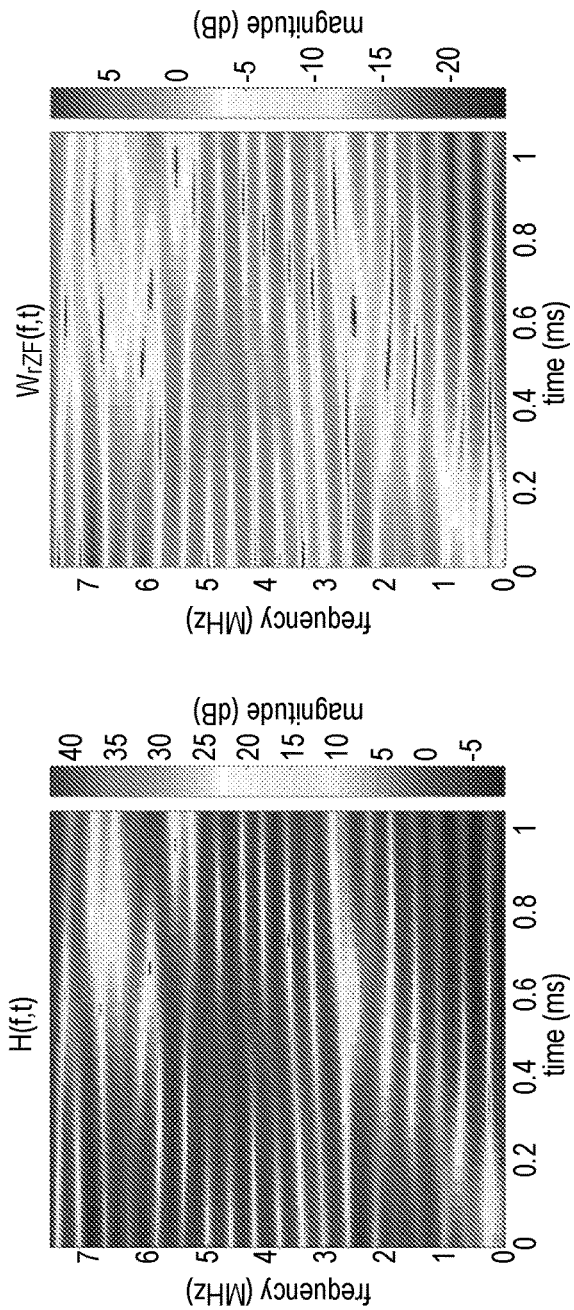
FIG. 47 graphically compares two implementations—a ZFP implementation and regularized ZFP implementation (rZFP).

To mitigates the effect of channel nulls (locations where the channel has very small energy) the regularized zero forcing precoder (rZFP) is constructed be taking a regularized inverse of its channel estimate:

$$W_{rZF}(f,t)=(\hat{H}^*(f,t)\hat{H}(f,t)+\alpha I)^{-1}\hat{H}^*(f,t), \quad (13)$$

for f=1, ..., $N_f$ and t=1, ..., $N_t$. Where $\alpha>0$ is the normalization constant. The advantage of rZFP is that the noise energy is smaller compared to ZPF. This is because rZFP deploys less energy in channel nulls, thus the normalization constant A is larger giving smaller noise energy. The disadvantage of rZFP is larger interference compared to ZFP. This is because the channel is not perfectly inverted (due to the normalization constant), so the UEs will experience residual interference. FIG. 47 demonstrates this phenomenon for a SISO channel.

Figure 48:
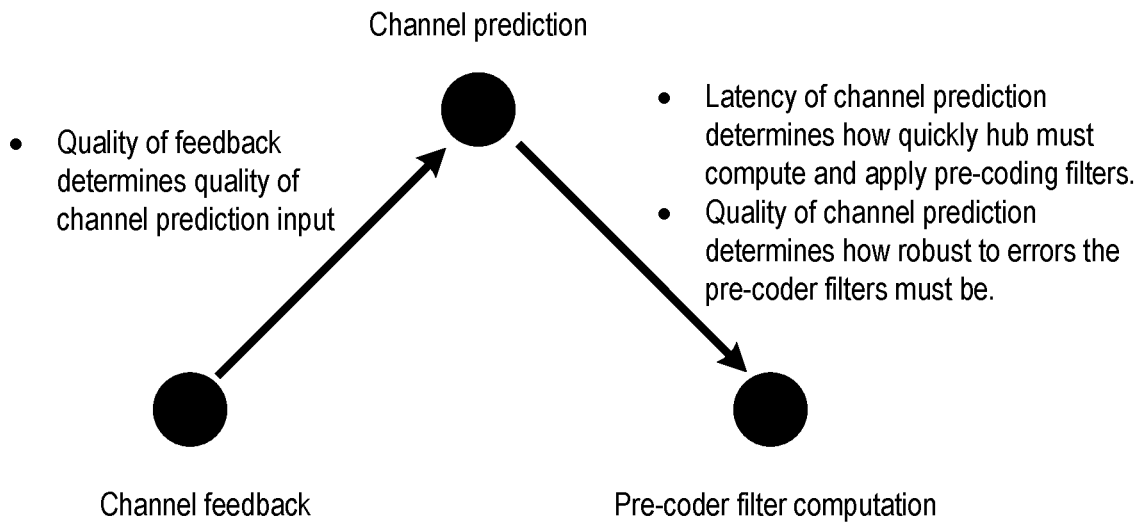
FIG. 48 shows components of an example embodiment of a precoding system.

As described above, there are three components to a precoding system: a channel feedback component, a channel prediction component, and a pre-coding filter component. The relationship between the three components is displayed in FIG. 48.

OTFS Precoding System

Various techniques for implementing OTFS precoding system are discussed. Some disclosed techniques can be used to provide the ability to shape the energy distribution of the transmission signal. For example, energy distribution may be such that the energy of the signal will be high in regions of time frequency and space where the channel information and the channel strength are strong. Conversely, the energy of the signal will be low in regions of time frequency and space where the channel information or the channel strength are weak.

Figure 49:
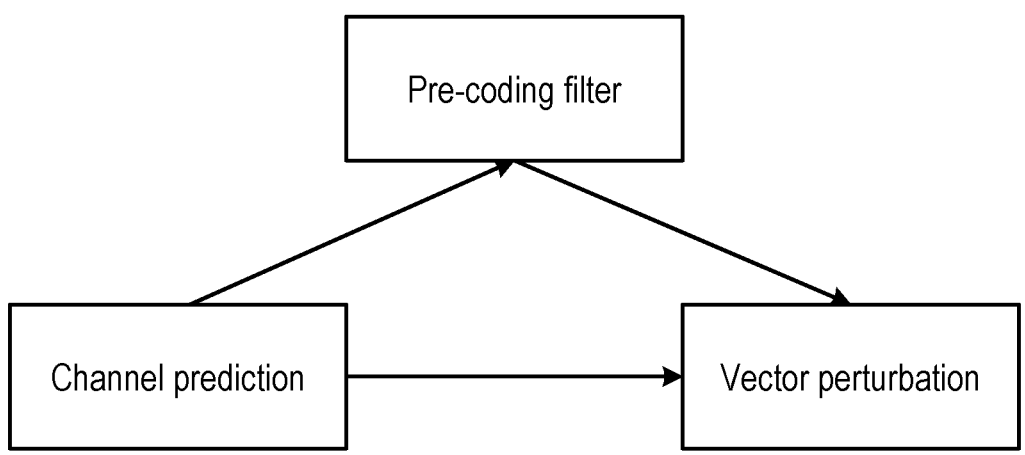
FIG. 49 is a block diagram depiction of an example of a precoding system.

Some embodiments may be described with reference to three main blocks, as depicted in FIG. 49.

Channel prediction: During channel prediction, second order statistics are used to build a prediction filter along with the covariance of the prediction error.

Optimal precoding filter: using knowledge of the predicted channel and the covariance of the prediction error: the hub computes the optimal precoding filter. The filter shapes the spatial energy distribution of the transmission signal.

Vector perturbation: using knowledge of the predicted channel, precoding filter, and prediction error, the hub perturbs the transmission signal. By doing this the hub shapes the time, frequency, and spatial energy distribution of the transmission signal.

MMSE Channel Prediction

Channel prediction is performed at the hub by applying an optimization criterion, e.g., the Minimal Mean Square Error (MMSE) prediction filter to the hub's channel estimates (acquired by either implicit or explicit feedback). The MMSE filter is computed in two steps. First, the hub computes empirical estimates of the channel's second order statistics. Second, using standard estimation theory, the hub uses the second order statistics to compute the MMSE prediction filter. Before going into details, we introduce notation:

We denote the number of antennas at the hub by $L_h$. We denote the number of UE antennas by $L_u$. We index the UE antennas by u=1, ..., $L_u$. We denote the number frequency bins by $N_f$. We denote the number of feedback times by $n_{past}$. We denote the number of prediction times by $r_{future}$.

For each UE antenna, the channel estimates for all the frequencies, hub antennas, and feedback times can be combined to form a single $N_f L_h n_{past}$ dimensional vector. We denote this by:

$$\hat{H}_{past}(u) \in \mathbb{C}^{N_f L_h n_{past}}, \quad (19)$$

Likewise, the channel values for all the frequencies, hub antennas, and prediction times can be combined to form a single $N_f L_h n_{future}$ dimensional vector. We denote this by:

$$H_{future}(u) \in \mathbb{C}^{N_f L_h n_{future}}, \quad (20)$$

In typical implementations, these are extremely high dimensional vectors and that in practice some form of compression should be used. For example, principal component compression may be one compression technique used.

Empirical Second Order Statistics

Empirical second order statistics are computed separately for each UE antenna in the following way:

At fixed times, the hub receives through feedback N samples of $\hat{H}_{past}(u)$ and estimates Of $H_{future}(u)$. We denote them by: $\hat{H}_{past}(u)_i$ and $\hat{H}_{future}(u)_i$ for i=1, ..., N.

The hub computes an estimate of the covariance of $\hat{H}_{past}(u)$, which we denote by $\hat{R}_{past}(u)$:

$$\hat{R}_{past}(u) = \frac{1}{N}\sum_{i=1}^{N} \hat{H}_{past}(u)_i \hat{H}_{past}(u)_i^* \quad (21)$$

The hub computes an estimate of the covariance of H future(U), which we denote by $\hat{R}_{future}(u)$:

$$\hat{R}_{future}(u) = \frac{1}{N}\Sigma_{i=1}^{N} \hat{H}_{future}(u)_i \hat{H}_{future}(u)_i^* \quad (22)$$

The hub computes an estimate of the correlation between $H_{future}(U)$ and $\hat{H}_{past}(u)$, which we denote by $\hat{R}_{past,future}(u)$:

$$\hat{R}_{future,past}(u) = \frac{1}{N}\Sigma_{i=1}^{N} \hat{H}_{future}(u)_i \hat{H}_{past}(u)_i^* \quad (23)$$

In typical wireless scenarios (pedestrian to highway speeds) the second order statistics of the channel change slowly (on the order of 1-10 seconds). Therefore, they should be recomputed relatively infrequently. Also, in some instances it may be more efficient for the UEs to compute estimates of the second order statistics and feed these back to the hub.

MMSE Prediction Filter

Using standard estimation theory, the second order statistics can be used to compute the MMSE prediction filter for each UE antenna:

$$C(u) = \hat{R}_{future,past}(u)\hat{R}_{past}^{-}(u), \quad (24)$$

Where C(u) denotes the MMSE prediction filter. The hub can now predict the channel by applying feedback channel estimates into the MMSE filter:

$$\hat{H}_{future}(u) = C(u)\hat{H}_{past}(u). \quad ((25)$$

Prediction Error Variance

We denote the MMSE prediction error by $\Delta H_{future}(u)$ then:

$$H_{future}(U) = \hat{H}_{future}(u) + \Delta H_{future}(U). \quad (26)$$

We denote the covariance of the MMSE prediction error by $R_{error}(U)$, with:

$$R_{error}(U) = \mathbb{E}\left[\Delta H_{future}(u)\Delta H_{future}(u)^*\right] \quad (27)$$

Using standard estimation theory, the empirical second order statistics can be used to compute an estimate of $R_{error}(u)$:

$$\hat{R}_{error}(u) = C(u)\hat{R}_{past}(u)C(u)^* - C(u)$$
$$\hat{R}_{future,past}(u)^* - \hat{R}_{future,past}(u)C(u)^* + \hat{R}_{future}(u) \quad (28)$$

Spatial Tomlinson Harashima precoding

This section provides additional details of achieving spatial precoding and the beneficial aspects of using Tomlinson Harashima precoding algorithm in implementing spatial precoding in the delay Doppler domain. The embodiments consider a flat channel (with no frequency or time selectivity).

Review of Linear Precoding

In precoding, the hub wants to transmit a vector of QAMs to the UEs. We denote this vector by $x \in \mathbb{C}^{L_u}$. The hub has access to the following information:

An estimate of the downlink channel, denoted by: $\hat{H} \in \mathbb{C}^{L_u \times L_h}$.

The matrix covariance of the channel estimation error, denoted by: $R_{\Delta H} \in \mathbb{C}^{L_h \times L_h}$.

From this information, the hub computes the "optimal" precoding filter, which minimizes the expected error energy experienced by the UEs:

$$W_{opt} = \left(\hat{H}^*\hat{H} + R_{\Delta H} + \frac{N_0 L_u}{L_h}I\right)^{-1}\hat{H}^*$$

By applying the precoding filter to the QAM vector the hub constructs a signal to transmit over the air: $\lambda W_{opt} x \in \mathbb{C}^{L_h}$ where $\lambda$ is a constant used to enforce the transmit energy constraints. The signal passes through the downlink channel and is received by the UEs:

$$\Delta H W_{opt} x + w,$$

Where $w \in \mathbb{C}^{L_u}$ denotes AWGN noise. The UEs remove the normalization constant giving a soft estimate of the QAM signal:

$$x + e,$$

where $e \in \mathbb{C}^{L_u}$ denotes the estimate error. The expected error energy can be computed using the error metric:

expected error energy$= x^* M_{error} x$ where $M_{error}$ is a positive definite matrix computed by:

$$M_{error} = (\hat{H}W_{opt} - I)^*(\hat{H}W_{opt} - I) + W_{opt}^*\left(R_{\Delta H} + \frac{N_0 L_u}{L_h}\right)W_{opt}$$

Review of Vector Perturbation

The expected error energy can be greatly reduced by perturbing the QAM signal by a vector $v \in \mathbb{C}^{L_u}$. The hub now transmits $\lambda W_{opt}(x+v) \in \mathbb{C}^{L_h}$. After removing the normalization constant, the UEs have a soft estimate of the perturbed QAM signal:

$$x + v + e$$

Again, the expected error energy can be computed using the error metric:

expected error energy$=(x+v)^* M_{error}(x+v)$

The optimal perturbation vector minimizes the expected error energy:

$$v_{opt} = \mathrm{argmin}_v(x+v)^* M_{error}(x+v).$$

Computing the optimal perturbation vector is in general NP-hard, therefore, in practice an approximation of the optimal perturbation is computed instead. For the remainder of the document we assume the following signal and perturbation structure:

The QAMs lie in the box $[-1, 1] \times [-1, 1]$.

The perturbation vectors lie on the coarse lattice: $(2\mathbb{Z} + 2\mathbb{Z})^{L_u}$.

Spatial Tomlinson Harashima Precoding

In spatial THP a filter is used to compute a "good" perturbation vector. To this end, we make use of the Cholesky decomposition of the positive definite matrix $M_{error}$:

$$M_{error} = U^* D U,$$

where D is a diagonal matrix with positive entries and U is unit upper triangular. Using this decomposition, the expected error energy can be expressed as:

expected error energy$=(U(x+v))^*$
$D(U(x+v))=z^* Dz = \Sigma_{n=1}^{L_u} D(n,n)|z(n)|^2,$ where $z=U(x+v)$. We note that minimizing the expected error energy is equivalent to minimizing the energy of the z entries, where:

$$z(L_u) = x(L_u) + v(L_u),$$

$$z(n) = x(n) + v(n) + \Sigma_{m=n+1}^{L_u} (n,m)(x(m)+v(m)),$$

for n=1, 2, . . . , $L_u$−1. Spatial THP iteratively choses a perturbation vector in the following way.

$$v(L_u) = 0$$

Figure 50:
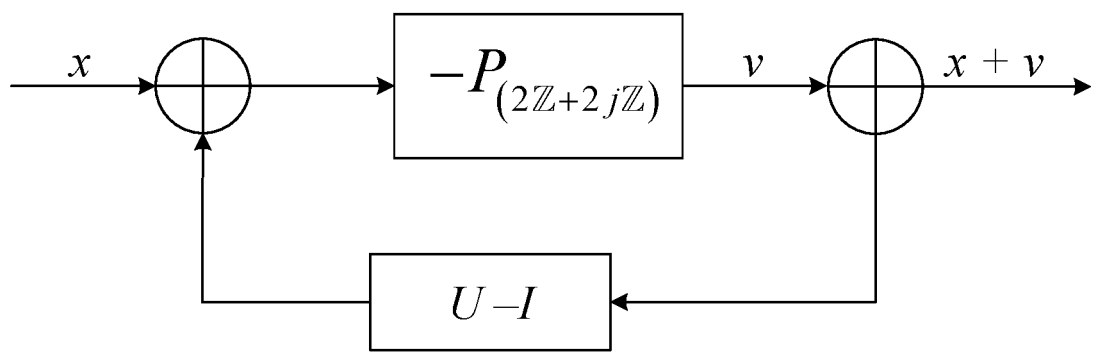
FIG. 50 is a block diagram of an example spatial Tomlinson Harashima precoder.

Suppose v(n+1), v(n+2), . . . , v($L_u$) have been chosen, then:

$$v(n) = -\mathcal{P}_{(2\mathbb{Z}+2j\mathbb{Z})}(x(n) + \Sigma_{m=n+1}^{L_u} U(n,m)(x(m)+v(m)))$$

where $\mathcal{P}_{(2\mathbb{Z}+2j\mathbb{Z})}$ denotes projection onto the coarse lattice. We note that by construction the coarse perturbation vector bounds the energy of the entries of z by two. FIG. 50 displays a block diagram of spatial THP.

14. Examples Approaches for Channel Estimation and Prediction

In some embodiments, the approaches for channel estimation and channel prediction described here (e.g., sparse channel representation, reciprocal calibration, second-order statistics, and/or reciprocal geometric precoding) can be used for predicting feature snapshots at different times or frequencies.

14.1 Sparse Channel Representation

Figure 51:
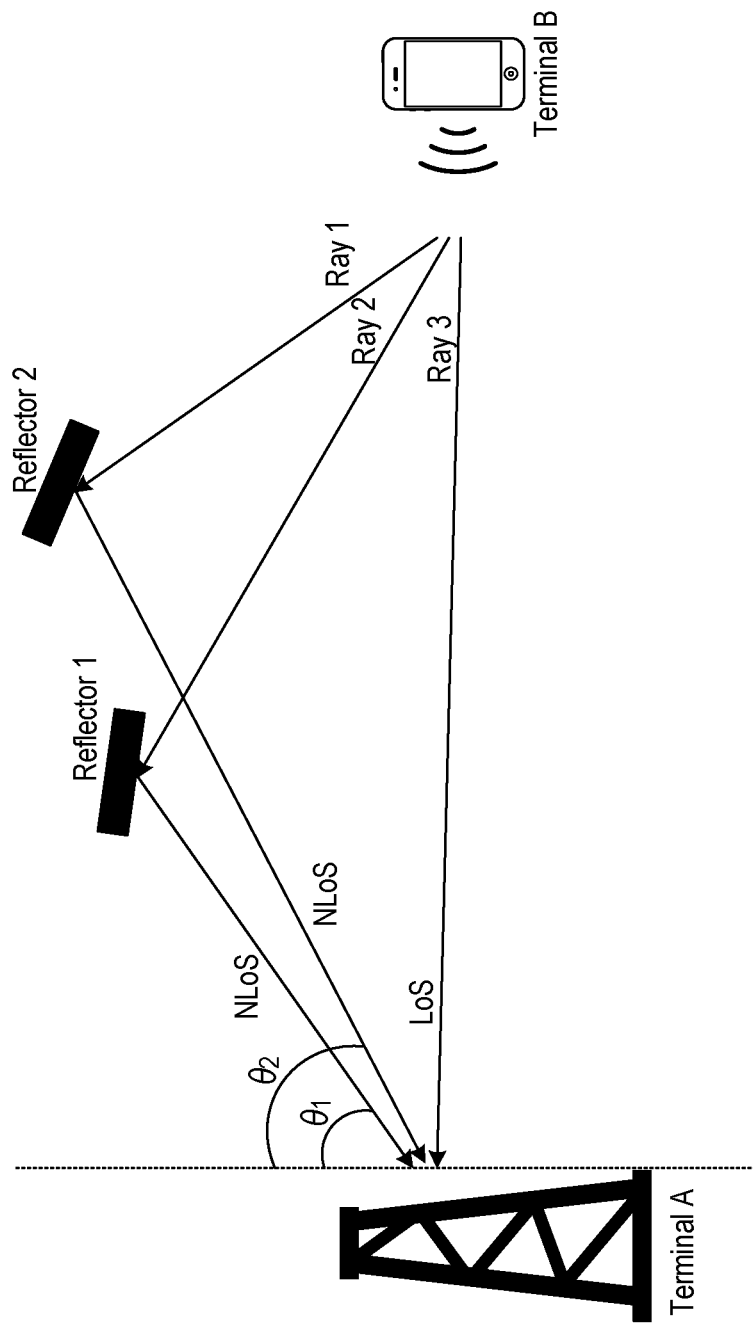
FIG. 51 shows an example of wireless channels between a first wireless terminal (terminal A) and a second wireless terminal (Terminal B).

A wireless channel, between a transmitting antenna of a device to a receiving antenna of another device, may be described by a geometric model of rays originating from the transmitting device, as shown in FIG. 51. Some of these rays may be directly received by the antenna of the other device, when there is a Line-of-Sight (LoS) between the antennas, and some may be reflected from objects and only then received in a Non-Line-of-Sight (NLoS) trace between the antennas. Each ray may be associated with a certain propagation delay, complex gain and angle of arrival (AoA) with respect to the receiving antenna. The two antennas and/or the reflecting objects may not be stationary, resulting in the well-known Doppler effect. The receiving device may use multiple antennas (antenna array) to receive the transmitted signal.

More formally, let $\alpha_i$, $\tau_i$, $\theta_i$ and $v_i$ represent the complex gain, delay, AoA and Doppler of ray i, respectively. Then, for $N_r$ rays (or reflectors), the wireless channel response at time t, space s and frequency f is $$H(t, s, f) = \sum_{i=1}^{N_r} \alpha_i \cdot e^{2\pi j f \tau_i} \cdot e^{2\pi j s \cdot \sin(\theta_i)} \cdot e^{2\pi j t v_i}$$

where the space dimension is used for multiple receive antennas.

The channel response, H, may be considered to be a super-position of all received rays. This patent document describes a method for extracting the values $\alpha_i$, $\tau_i$, $\theta_i$ and $v_i$ from H (t, s, f), under the assumptions that IV, is small (for example, typical situations may have between zero to 10 reflectors). Obtaining these values, gives a sparse and compact channel representation of equation (0)), regardless of how large the frequency, time and space dimensions are.

For example, a channel with 3 NLoS reflectors, received over 16 antennas, 512 frequency tones and 4 time samples, will be described by 3×4=12 values (gain, delay, angle and Doppler for 3 reflectors) instead of 16×512×4=32768 values.

Furthermore, with the knowledge of the values of $\alpha_i$, $\tau_i$, $\theta_i$ and $v_i$, a covariance matrix for the channel, $R_{HH}$, can be constructed for any desired frequency, time and space instances. This can be applied for predicting the channel response in any one of these dimensions.

Two methods for constructing the covariance matrix under the sparse channel assumptions, both of which use convex optimization techniques, include ray detection and maximum likelihood.

14.1.1 Prediction Filter Examples

Once the reflectors (shown in FIG. 51) are detected (using ray detection), or the covariance weights are determined (using maximum likelihood), a covariance matrix can be constructed for any frequency, space and time grids. If we denote these grids as a set of elements, Y, and denote X as a subset of Y, and representing the grid elements for an instantaneous measurement of the channel as H_X, then the prediction filter may be computed as $$C = R_{YX} \cdot (R_{XX})^{-1}$$

and the predicted channel is computed as $$\hat{H}_Y = C \cdot H_X$$

The matrices $R_{YX}$ and $R_{XX}$ are a column decimated, and a row-column decimated, versions of the channel constructed covariance matrix. These matrices are decimated to the grid resources represented by X.

14.1.2 Examples of Channel Prediction

The described sparse channel representation techniques may be used for predicting the wireless channels in a Time Division Duplex (TDD) or a Frequency Division Duplex (FDD) system. Such a system may include base stations (BS) and multiple user equipment (UE). This technique is suitable for both stationary and mobile UE. Generally, these techniques are used to compute a correct covariance matrix representing the wireless channels, based on a sparse multi-dimensional geometric model, from a relatively small number of observations (in frequency, time and space). From this covariance matrix, a prediction filter is computed and applied to some channel measurements, to predict the channels in some or all the frequency, space and time dimensions. The predicted channels for the UE, along with other predicted channels for other UE, may be used to generate a precoded downlink transmission from one BS to multiple UE (Multi-User MIMO, Mu-MIMO), or from several BS to multiple UE (also known as CoMP, described above in this document).

In the TDD scenario, the BS predicts the wireless channels from its antennas to the UE in a future time instance. This may be useful for generating a precoded downlink transmission. The UE may transmit at certain time instances reference signals to the BS, from which the BS will estimate the wireless channels response. Note, that typically, a small number of time instances should be sufficient, which makes it a method, suitable for mobile systems. Then, the estimated channel responses (whole or partial), are used with one of the described methods, to determine the covariance matrix of the channels and compute a prediction filter. This processing may take place in the base station itself, or at a remote or a network-side processing unit (also known as "cloud" processing). The prediction filter may be applied to some of the channel responses already received, or to some other estimated channel responses, to generate a prediction of the wireless channels, at a future time instance and over the desired frequency and space grids.

In the FDD scenario, the BS predicts the wireless channels from its antennas to the UE in a future time instance. However, the UE to BS uplink transmissions and the BS to UE downlink transmissions are over different frequency bands. The generation of the of prediction filter is similar to TDD systems. The UE may transmit at certain time instances reference signals to the BS, from which the BS will estimate the wireless channels response. Then, the estimated channel responses (whole or partial), are used with one of the described methods, to determine the covariance matrix of the channels and compute a prediction filter. In parallel, at any time instance, the BS may transmit reference signals to the UE. The UE will feedback to the BS through its uplink, some the received reference signals (all or partial), as raw or processed information (implicit/explicit feedback). The BS will generate, if needed, an estimated channel response for the downlink channel, from the information received from the UE and apply the prediction filter to it. The result is a predicted channel at the downlink frequency band and at a future time instance.

In some embodiments, it is useful for the BS to know the quality of the prediction of the channels in order to determine correctly which modulation and coding (MCS) to use for its precoded transmission. The more accurate the channels are represented by the computed covariance matrix; the higher prediction quality is achieved, and the UE will have a higher received SNR.

14.2 Channel Estimation in OTFS Systems

Figure 52:
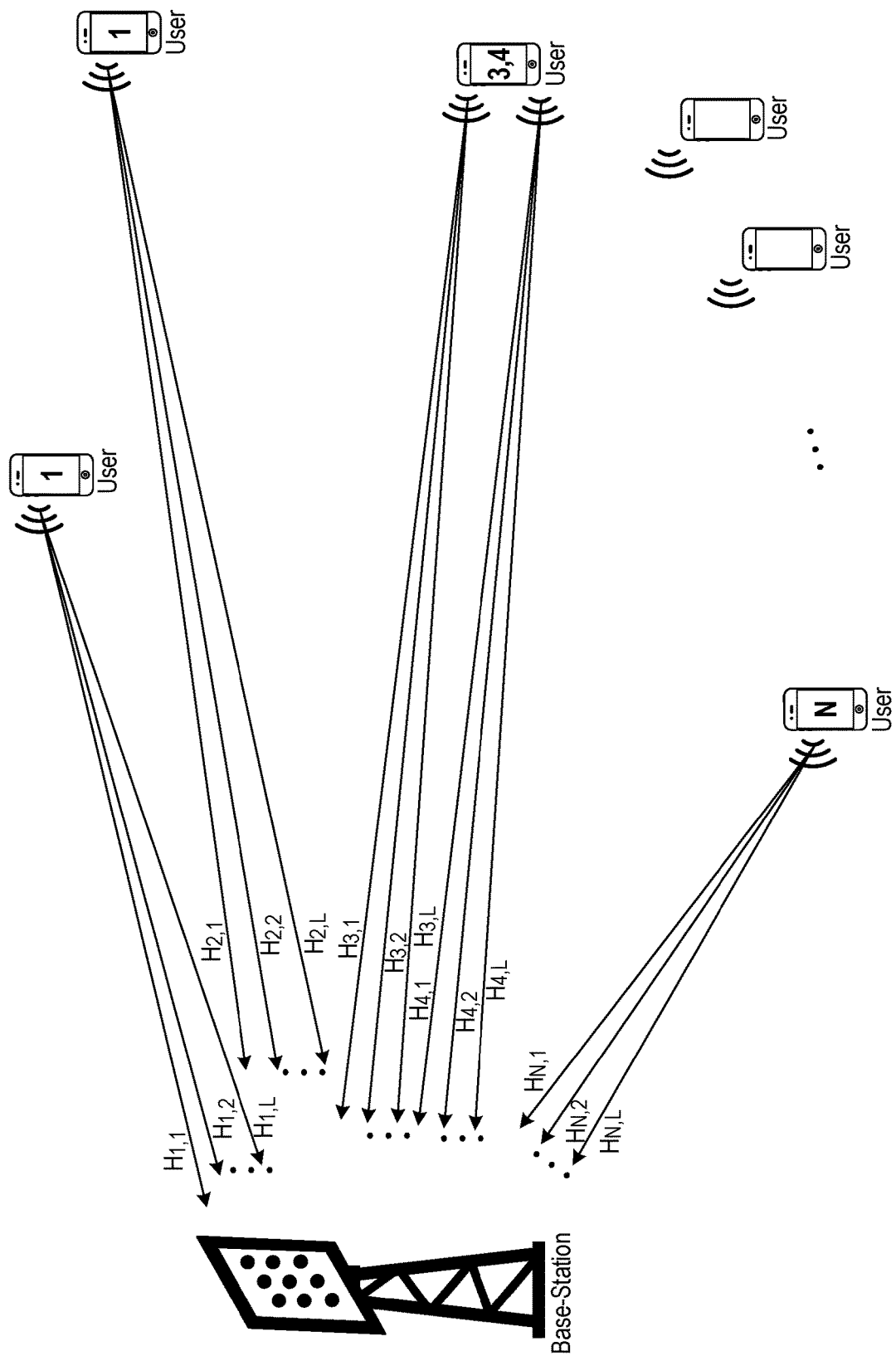
FIG. 52 shows an example of a wireless system including a base station with L antennas and multiple users.

This section overviews channel estimation for OTFS systems, and in particular, aspects of channel estimation and scheduling for a massive number of users. A wireless system, with a multi-antenna base-station and multiple user antennas, is shown in FIG. 52. Each transmission from a user antenna to one of the base-station antennas (or vice versa), experiences a different channel response (assuming the antennas are physically separated enough). For efficient communication, the base-station improves the users' received Signal-to-Interference-Noise-Ratio (SINR) by means of precoding. However, to precode, the base-station needs to have an accurate estimation of the downlink channels to the users during the transmission time.

In some embodiments, and when the channels are not static and when the number of users is very large, some of the challenges of such a precoded system include:
  Accurately and efficiently estimating all the required channels
  Predicting the changes in the channels during the downlink transmission time Typical solutions in systems, which assume a low number of users and static channels, are to let each user transmit known pilot symbols (reference signals) from each one of its antennas. These pilots are received by all the base-station antennas and used to estimate the channel. It is important that these pilot symbols do not experience significant interference, so that the channel estimation quality is high. For this reason, they are typically sent in an orthogonal way to other transmissions at the same time. There are different methods for packing multiple pilots in an orthogonal (or nearly-orthogonal) way, but these methods are usually limited by the number of pilots that can be packed together (depending on the channel conditions) without causing significant interference to each other. Therefore, it becomes very difficult to have an efficient system, when the number of user antennas is high and the channels are not static. The amount of transmission resources that is needed for uplink pilots may take a considerable amount of the system's capacity or even make it unimplementable. For prediction of the channel, it is typically assumed that the channel is completely static and will not change from the time it was estimated till the end of the downlink transmission. This assumption usually causes significant degradation in non-static channels.

It is assumed that the downlink and uplink channels are reciprocal and after calibration it is possible to compensate for the difference in the uplink-downlink and downlink-uplink channel responses.

Embodiments of the disclosed technology include a system and a method for packing and separating multiple non-orthogonal pilots, as well as a method for channel prediction. In such a system, it is possible to pack together a considerably higher number of pilots comparing to other commonly used methods, thus allowing an accurate prediction of the channel for precoding.

Second-Order Training Statistics

The system consists of a preliminary training step, in which all users send uplink orthogonal pilots to the base-station. Although these pilots are orthogonal, they may be sent at a very low rate (such as one every second) and therefore do not overload the system too much. The base-station receives a multiple of $N_{SOS}$ such transmissions of these pilots, and use them to compute the second-order statistics (covariance) of each channel.

Figure 53:
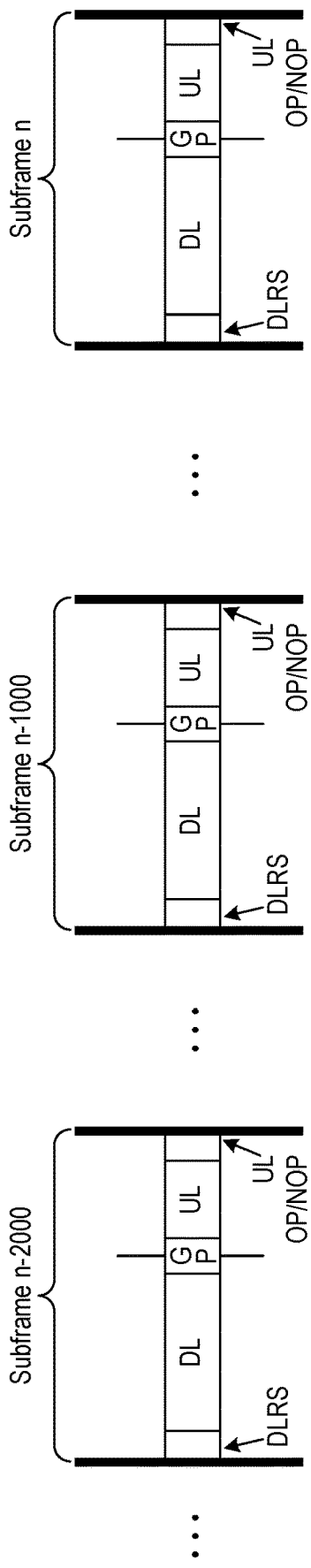
FIG. 53 shows an example of a subframe structure that can be used to compute second-order statistics for training.

FIG. 53 shows an example of such a system, where a subframe of length 1 msec consists of a downlink portion (DL), a guard period (GP) and an uplink portion (UL). Some of the uplink portion is dedicated to orthogonal pilots (OP) and non-orthogonal pilots (NOP). Each specific user is scheduled to send on these resources its pilots every 1000 subframes, which are equivalent to 1 sec. After the reception of $N_{SOS}$ subframes with pilots (equivalent to $N_{SOS}$ seconds), the base-station will compute the second-order statistics of this channel.

The computation of the second-order statistics for a user antenna u is defined as:
  For each received subframe i=1, 2, . . . , $N_{SOS}$ with orthogonal pilots and for each one of the L base-station receive antennas—estimate the channel along the entire frequency band ($N_f$ grid elements) from the pilots and store it as the i-th column of the matrix $H^{(u)}$ with dimensions $(N_f L) \times N_{SOS}$.
  Compute the covariance matrix $R_{HH}^{(u)} = (H^{(u)})^H H^{(u)}$, where $(\bullet)^H$ is the Hermitian operator.
  For the case that the channel $H^{(u)}$ is non-zero-mean, both the mean and the covariance matrix should be determined.

To accommodate for possible future changes in the channel response, the second-order statistics may be updated later, after the training step is completed. It may be recomputed from scratch by sending again $N_{SOS}$ orthogonal pilots, or gradually updated. One possible method may be to remove the first column of $H^{(u)}$ and attach a new column at the end and then re-compute the covariance matrix again.

The interval at which these orthogonal pilots need to be repeated depends on the stationarity time of the channel, e.g., the time during which the second-order statistics stay approximately constant. This time can be chosen either to be a system-determined constant, or can be adapted to the environment. In particular, users can determine through observation of downlink broadcast pilot symbols changes in the second-order statistics, and request resources for transmission of the uplink pilots when a significant change has been observed. In another embodiment, the base-station may use the frequency of retransmission requests from the users to detect changes in the channel, and restart the process of computing the second-order statistics of the channel.

To reduce the computational load, it is possible to use principal component analysis (PCA) techniques on $R_{HH}^{(u)}$. We compute $\{\lambda^{(u)}\}$, the $K^{(u)}$ most dominant eigenvalues of $R_{HH}^{(u)}$, arranged in a diagonal matrix $D^{(u)} = \text{diag}(\lambda_1^{(u)}, \lambda_2^{(u)}, \ldots, \lambda_{K^{(u)}}^{(u)})$ and their corresponding eigenvectors matrix $V^{(u)}$. Typically, $K^{(u)}$ will be in the order of the number of reflectors along the wireless path. The covariance matrix can then be approximated by $R_{HH}^{(u)} \approx V^{(u)} \cdot D^{(u)} \cdot (V^{(u)})^H$.

Non-Orthogonal Pilots

The non-orthogonal pilots (NOP), $P^{(u)}$, for user antenna u, may be defined as a pseudo-random sequence of known symbols and of size $N_{NOP}$, over a set of frequency grid elements. The base-station can schedule many users to transmit their non-orthogonal pilots at the same subframe using overlapping time and frequency resources. The base-station will be able to separate these pilots and obtain a high-quality channel estimation for all the users, using the method describes below.

Define the vector Y of size $(L \cdot N_{NOP}) \times 1$, as the base-station received signal over all its antennas, at the frequency grid elements of the shared non-orthogonal pilots. Let $\tilde{V}^{(u)}$ be the eigenvectors matrix $V^{(u)}$ decimated along its first dimension (frequency-space) to the locations of the non-orthogonal pilots.

The base-station may apply a Minimum-Mean-Square-Error (MMSE) estimator to separate the pilots of every user antenna:

For every user antenna u, compute $$R_{YY}^{(u)} = [\tilde{V}^{(u)} \odot P^{(u)}] \cdot D^{(u)} \cdot [\tilde{V}^{(u)} \odot P^{(u)}]^H$$

$$R_{XY}^{(u)} = \tilde{V}^{(u)} \cdot D^{(u)} \cdot [\tilde{V}^{(u)} \odot P^{(u)}]^H$$

Herein, $\odot$ is defined as the element-by-element multiplication. For a matrix A and vector B, the $A \odot B$ operation includes replicating the vector B to match the size of the matrix A before applying the element-by-element multiplication.

If principal component analysis (PCA) is not used, the covariance matrices can be computed directly as:

$$R_{YY}^{(u)} = (P^{(u)}[P^{(u)}]^H) \odot R_{HH}^{(u)}$$

$$R_{XY}^{(u)} = (1[P^{(u)}]^H) \odot R_{HH}^{(u)}$$

For the set of user antennas shared on the same resources $u \in U$, compute $$R_{YY} = E_{u \in U} R_{YY}^{(u)}$$

and invert it. Note that it is possible to apply PCA here as well by finding the dominant eigenvalues of $R_{YY}$ ($D_{R_{YY}}$) and their corresponding eigenvectors matrix ($V_{R_{YY}}$) and approximating the inverse with $R_{YY}^{-1} \approx V_{R_{YY}} \cdot D_{R_{YY}}^{-1} \cdot (V_{R_{YY}})^H$.

For each user antenna u, compute the pilot separation filter $$C_P^{(u)} = R_{XY}^{(u)} \cdot R_{YY}^{-1}$$

For each user antenna u, separate its non-orthogonal pilots by computing $$H_{NOP}^{(u)} = C_P^{(u)} \cdot Y$$

Note that $H_{NOP}^{(u)}$ is the channel response over the frequency grid-elements of the non-orthogonal pilots for the L base-station received antennas. It may be also interpolated along frequency to obtain the channel response over the entire bandwidth.

Prediction Training

Figure 54:
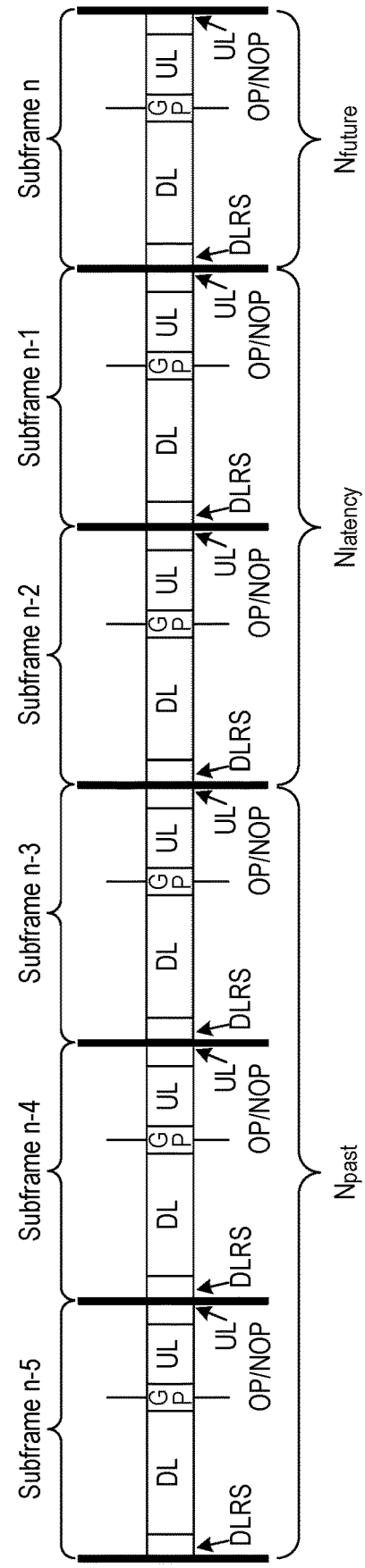
FIG. 54 shows an example of prediction training for channel estimation.

The method described in the previous section for separating non-orthogonal pilots is applied to train different users for prediction. In this step, a user sends uplink non-orthogonal pilots on consecutive subframes, which are divided to 3 different sections, as shown in the example in FIG. 54.

1. Past—the first $N_{past}$ subframes. These subframes will later be used to predict future subframes.

2. Latency—the following $N_{latency}$ subframes are used for the latency required for prediction and precoding computations.

3. Future—the last $N_{future}$ subframes (typically one), where the channel at the downlink portion will be later predicted.

Each user, is scheduled $N_{PR}$ times to send uplink non-orthogonal pilots on consecutive $N_{past} + N_{latency} + N_{future}$ subframes. Note that in one uplink symbol in the subframe, both orthogonal and non-orthogonal pilots may be packed together (although the number of orthogonal pilots will be significantly lower than the number of non-orthogonal pilots). The base-station applies the pilot separation filter for the non-orthogonal pilots of each user and computes $H_{NOP}^{(u)}$. To reduce storage and computation, the channel response may be compressed using the eigenvector matrix computed in the second-order statistics step $$H_K^{(u)} = (\tilde{V}^{(u)})^H \cdot H_{NOP}^{(u)}$$

For subframes, which are part of the "Past" section, store $H_K^{(u)}$ as columns in the matrix $H_{past(i)}^{(u)}$, where i=1, 2, ..., $N_{PR}$. Use all or part of the non-orthogonal pilots to interpolate the channel over the whole or part of the downlink portion of the "Future" subframes, compress it using $\tilde{V}^{(u)}$ and store it as $H_{future,(i)}^{(u)}$. Compute the following covariance matrices:

$$R_{past,(i)}^{(u)} = H_{past,(i)}^{(u)} \cdot (H_{past,(i)}^{(u)})^H$$

$$R_{future,(i)}^{(u)} = H_{future,(i)}^{(u)} \cdot (H_{future,(i)}^{(u)})^H$$

$$R_{future\_past,(i)}^{(u)} = H_{future,(i)}^{(u)} \cdot (H_{past,(i)}^{(u)})^H$$

After all $N_{PR}$ groups of prediction training subframes have been scheduled, compute the average covariance matrices for each user $$R_{past}^{(u)} = \frac{1}{N_{PR}} \sum_{i=1}^{N_{PR}} R_{past,(i)}^{(u)}$$

$$R_{future}^{(u)} = \frac{1}{N_{PR}} \sum_{i=1}^{N_{PR}} R_{future,(i)}^{(u)}$$

$$R_{future\_past}^{(u)} = \frac{1}{N_{PR}} \sum_{i=1}^{N_{PR}} R_{future\_past,(i)}^{(u)}$$

Finally, for each user compute the MMSE prediction filter $$C_{PR}^{(u)} = R_{future\_past}^{(u)} \cdot (R_{past}^{(u)})^{-1}$$

and its error variance for the precoder)

$$R_E^{(u)} = R_{future}^{(u)} - C_{PR}^{(u)} \cdot (R_{future\_past}^{(u)})^H.$$

Scheduling a Downlink Precoded Transmission

Figure 55:
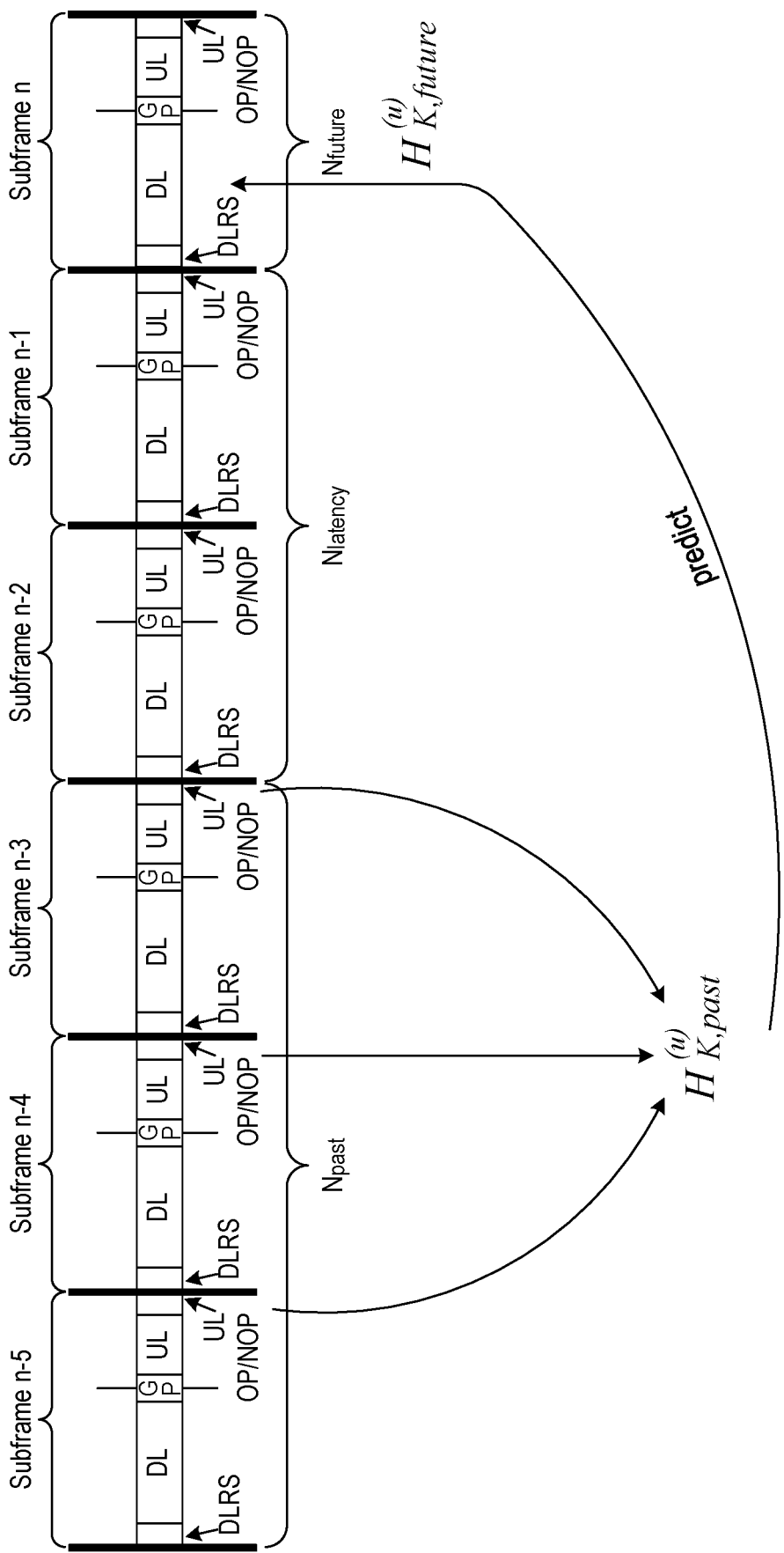
FIG. 55 shows an example of prediction for channel estimation.

For each subframe with a precoded downlink transmission, the base-station should schedule all the users of that transmission to send uplink non-orthogonal pilots for $N_{past}$ consecutive subframes, starting $N_{past} + N_{latency}$ subframes before it, as shown in FIG. 55. The base-station will separate the non-orthogonal pilots of each user, compress it and store the channel response as $H_{K,past}^{(u)}$. Then, it will apply the prediction filter to get the compressed channel response for the future part $$H_{K,future}^{(u)} = C_{PR}^{(u)} \cdot H_{K,past}^{(u)}$$

Finally, the uncompressed channel response is computed as $$H_{future}^{(u)} = \tilde{V}^{(u)} \cdot H_{K,future}^{(u)}$$

The base-station may correct for differences in the reciprocal channel by applying a phase and amplitude correction, α(f), for each frequency grid-element $$H_{future\_reciprocity}^{(u)}(f) = \alpha(f) \cdot H_{future}^{(u)}(f)$$

Then, use $H_{future\_reciprocity}^{(u)}$ and $R_E^{(u)}$ of the participating users to compute the precoder for the downlink transmission.

Scheduling of the Uplink Pilots

If during a frame there are multiple orthogonal resources available for pilot transmission (e.g., different timeslots or different frequency grid elements), then the set of uplink pilots that needs to be transmitted can be divided into sets such that each set is transmitted on a different resource. The criterion of for the division into sets can be, e.g., the achievable pilot SINR. The transmission of non-orthogonal pilots leads to a reduction in the achievable pilot SINR, which is the more pronounced the stronger the alignment of the vector spaces containing the correlation matrices from different users is. Thus, arranging users in sets such that two pilots with very similar correlation matrices are not transmitted at the same time improves performance. However, other criteria are possible as well. For example, for users that have only a low SINR during data transmission, achieving a high pilot SINR might be wasteful; thus, achieving an optimal "matching" of the pilot SINR to the data SINR might be another possible criterion.

The embodiments of the disclosed technology described in this section may be characterized, but not limited by, the following features:

A wireless system in which a network node performs precoded downlink transmissions, which support a massive number of users, consisting of channel prediction, reciprocity adjustment and precoding, based on the second-order statistics of the channels.

A system including a mix of uplink orthogonal pilots and non-orthogonal pilots.

Computing the second-order statistics of a channel based on orthogonal pilots.

Separating non-orthogonal pilots from multiple users, using second-order statistics and computation of channel estimation.

Training for prediction of channel estimates.

Scheduling non-orthogonal uplink pilots based on second-order statistics.

Compressing channel responses using PCA 14.3 Reciprocal Calibration of a Communication Channel This section covers reciprocal calibration of a communication channel for reverse channel estimation. In the recent years, to meet the increased demand on available bandwidth, many new techniques have been introduced in wireless communications. For example, the amount of bandwidth, measured as a total number or as a number of bits per Hertz per second number, has grown steadily over years in prevalent communication standards such as the Long Term Evolution (LTE). This trend is expected to grow even more due to the explosion of smartphones and multimedia streaming services.

Of the available bandwidth in a wireless network, some bandwidth is typically used by system overhead signaling that may be used for maintaining operational efficiency of the system. Examples of the overhead signaling includes transmission of pilot signals, transmission of system information, and so on. With time-varying nature of a communication channel between mobile end point(s), the system messages may have to be exchanged more frequently and the overhead may end up becoming significant. The embodiments described in the present document can be used to alleviate such bandwidth overhead, and solve other problems faced in wireless communication systems.

Figure 56:
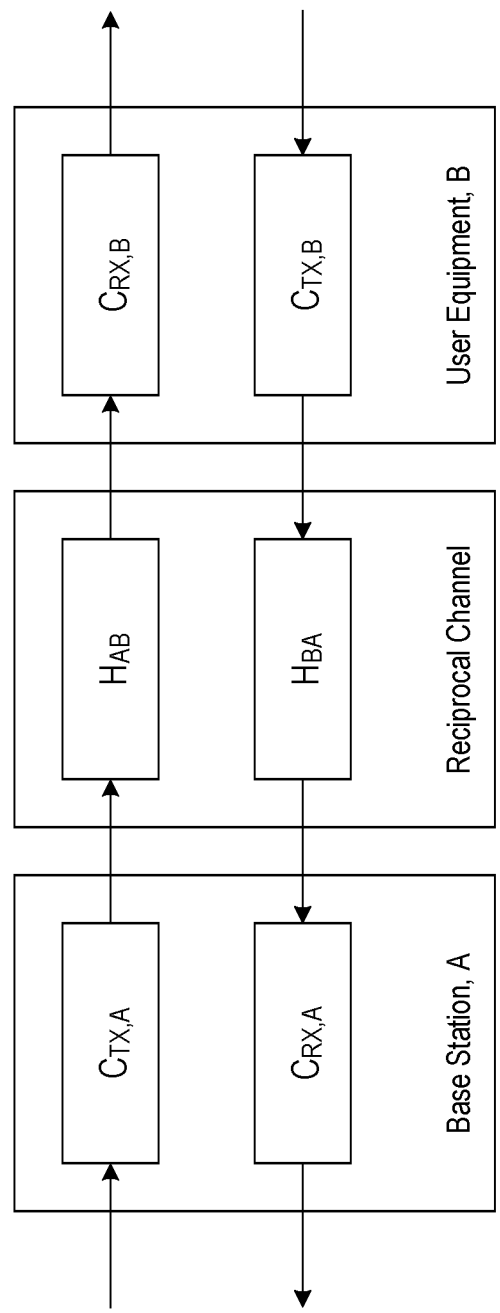
FIG. 56 shows an example of a wireless channel with reciprocity.

FIG. 56 shows an example block diagram of a communication channel with reciprocity. The composite wireless channel from A to B may be represented as: $\hat{H}_{A,B} = C_{RX,B} \cdot H_{A,B} \cdot C_{TX,A}$.

For the reciprocal channel, assume that $H_{AB} = \lambda H_{AB}^T$ for a complex scalar λ.

In the case of a non-reciprocal channel, with analog and RF components, Non-reciprocal analog and RF components: $C_{TX,A}, C_{RX,A}, C_{RX,B}, C_{TX,B}$, ideally for simplicity, it is beneficial if each matrix is a diagonal matrix. Such an embodiment may also use a design that minimizes the coupling between Tx and Rx paths.

Similarly, the composite channel from B to A is given by $\hat{H}_{B,A} = C_{RX,A} \cdot H_{B,A} \cdot C_{TX,B}$.

If all the C matrices can be estimated a priori, the BS to UE channel can be estimated from the UE to BS channel. In such a case, feeding back channel state information for transmit beamforming may not be needed, thereby making the upstream bandwidth available for data instead of having to transmit channel state information. Estimation of the C matrices may also improve system efficiency. In some embodiments disclosed herein, the reciprocity calibration may be performed by calibrating Tx and Rx of the BS and UE side during a startup or a pre-designated time. The diagonal matrices $C_{TX,A}, C_{RX,A}, C_{RX,B}, C_{TX,B}$ may be estimated. These matrices may be re-estimated and updated periodically. The rate of change of the C matrices will typically be slow and may be related to factors such as the operating temperature of the electronics used for Tx and Rx.

Brief Discussion

In point to multi-point (P2MP) systems and fixed wireless access (FWA) systems, multi-user MIMO (MU-MIMO) is used for increasing the system throughput. One of the components of MU-MIMO is a transmit pre-coder based beam-forming at the Base Station (BS) transmitter. BS sends signals to all User Equipments (UE) (say n of them) simultaneously.

In operation, n−1 signals, intended for n−1 individual UEs, will act as interference for the target UE. A transmit pre-coder cancels the interference generated at the target UE by the n −1 un-intended signals meant for other UEs. To build a pre-coder, down link channel state information (CSI) is used.

In an extrinsic beamforming technique, CSI is fed back from the UE to BS through a feedback up-link channel. However, considerable amount of data BW is used for this, thus affecting the overall system throughput efficiency.

For Time Division Duplex (TDD) systems, the physical channel in the air (sometimes called the radio channel) is reciprocal within the channel coherence time. e.g., the case wherein the uplink (UE to BS) and downlink (BS to UE) are identical (in SISO (transpose in MIMO). However, when the transceiver front-end (FE) hardware is also taken into account, channel reciprocity no longer holds. This is due to the non-symmetric characteristics of the RF hardware. It includes PA non-linearity, RF chain crosstalk, phase noise, LNA non-linearity and noise figure, carrier and clock drifts etc.

In some embodiments, a calibration mechanism can be designed to calibrate for the nonreciprocal components of the wireless link such that embodiments can estimate the downlink by observing the up-link with the help of these calibration coefficients. If this is feasible, no CSI feedback is necessary (as in the case of extrinsic beam forming), thus improving the overall system throughput efficiency. The associated beamforming is also sometimes called intrinsic beamforming. The technique disclosed in this patent document can be used to solve the above discussed problem, and others.

Notation

In the description herein, $h_{a1a2}$ denotes the channel from transmitter (TX) a1 to receiver (RX) a2. This notation is different from the conventional MIMO channel notation. In the conventional methods, this will be denoted as $h_{a2a1}$. Also, conjugate of a complex quantity is represented with a *, e.g., conj(h)=h*.

Reciprocity Calibration for Precoding

A precoded transmission is based on the knowledge of the exact channel response between the transmitting antenna(s) of a first terminal denoted by A—typically a base-station (BS)—to the receiving antenna(s) of a second terminal denoted by B—typically a piece of Consumer Premises Equipment (CPE) or a user equipment (UE). This channel response can be considered to be composed of three different parts as illustrated in FIG. 56. First, the channel response of the transmitter in terminal A. Second, the channel response of the different reflectors. Third, the channel response of the receiver in terminal B. The transmitter channel responses may be due to the transmit chain circuitry such as power amplifiers, digital to analog converters (DACs), frequency upconverters and so on. The receiver channel response may be due to receiver-side circuitry such as low noise block (LNB), frequency downconverter, analog to digital conversion circuitry (ADC).

There are two main differences between the channel responses at terminals A and B and the channel response of the wireless channel reflectors:

1. The channel response of the wireless channel reflectors in a time-division duplex (TDD) system is reciprocal whereas the channel response of the terminals is not.

2. The channel response of the wireless channel reflectors may change rapidly (e.g., in 1-10 milliseconds, depending on the Doppler of the reflectors and terminals), but the channel response of the terminals changes slowly, mostly with temperature.

There are several methods for obtaining the complete channel response from terminal A to B described in the literature. For example, an explicit method would be to send known reference signals from terminal A to B and have terminal B transmit back the values of the received reference signals to terminal A. This is often referred to as explicit feedback. However, each value must be represented with multiple bits, and in a system where terminal A has many antennas, there are many user terminals and significant Doppler effects causing the propagation channel to change rapidly, the amount of information that needs to be transmitted can severely reduce the overall system efficiency. In the extreme case with high levels of Doppler, it is simply not possible to feedback all the required Channel State Information (CSI) quickly enough, resulting in stale CSI and suboptimal precoding.

Instead, a TDD system can use an approach known as "reciprocity calibration" to obtain the relationship between the non-reciprocal parts of the channel response in both transmission directions: the AB (from A to B) and the BA (from B to A). Terminal B first transmits known reference signals that allow terminal A to compute the AB channel response. Using knowledge of the non-reciprocal relationship, terminal A can adjust the BA channel response to make it suitable for precoding a transmission back to terminal B.

More formally, for a multi-carrier TDD system that uses multi-carrier modulation, where the channel can be described as a complex value in the frequency domain for a specific sub-carrier (tone), the three components of the AB channel response can be denoted as $H_A^{TX}$, $H^{CH}$ and $H_B^{RX}$. Similarly, the three components of the BA channel response are $H_B^{TX}$, $H^{CH}$ and $H_A^{RX}$. The overall downlink (AB) channel response is $$H_{AB}=H_A^{TX} \cdot H^{CH} \cdot H_B^{RX} \tag{55}$$

and the overall uplink (BA) channel response is $$H_{BA}=H_B^{TX} \cdot H^{CH} \cdot H_A^{RX} \tag{56}$$

From $H_{AB}$ and $H_{BA}$, the reciprocity calibration factor can be written as $$\alpha = \frac{H_A^{TX} \cdot H_B^{RX}}{H_B^{TX} \cdot H_A^{RX}} \tag{57}$$

Therefore, if $H_{BA}$ is known at terminal A, it can compute $H_{AB}=\alpha H_{BA}$. The question that remains is how to obtain $\alpha$. Note that for the multi-carrier system, the above Equations (55) to (57) will provide reciprocity calibration values and channel responses on a per sub-carrier basis for sub-carriers on which reference signals are transmitted.

Different methods exist within the literature for computing the reciprocity calibration factor. The most straight forward of these is to utilize explicit feedback as described above, but only feed back $H_{AB}$ when $\alpha$ is re-calculated. Since the transmitter and receiver channel responses change relatively slowly, the rate of feedback is typically in the order of minutes and thus represents negligible overhead for a modest number of terminals and antennas. However, when the number of antennas in terminal A and the number of CPEs (terminal B) is large, as can be the case in a massive multiple-input multiple-output (MIMO) system with many subscribers, the feedback overhead can consume a considerable portion of the system capacity.

Another approach is to have terminal A transmit reference signals between its own antennas and calculate calibration factors for only $H_A^{TX}$ and $H_A^{RX}$. That is, obtain:

$$\alpha_A = \frac{H_A^{TX}}{H_A^{RX}} \tag{58}$$

which results in $$\tilde{H}_{AB}=\alpha_A \cdot H_{BA}=H_A^{TX} \cdot H_B^{TX} \cdot H^{CH} \tag{59}$$

Terminal A will then precode one reference symbol using $\tilde{H}_{AB}$ that terminal B can use to remove its $H_B^{TX}$ and $H_B^{RX}$ contributions from all subsequent precoded transmissions. This technique may be called relative calibration. Whilst this approach entirely removes the need for feedback of $H_{BA}$, the need for terminal A to transmit to itself during a calibration procedure and then to CPEs that could be located many hundreds of meters or even kilometers away can create dynamic range challenges. It is typically desirable to use the same hardware gain stages in the transmit chain when calibrating as those used for transmission, since having to switch gain stages between calibration and transmission can change the nature of $H_A^{TX}$ and $H_A^{RX}$.

This document describes a new approach for computing the reciprocity calibration factor that avoids the dynamic range concern of relative calibration whilst maintaining high levels of efficiency when scaling to a larger number of antennas and terminals. As described herein, the reference signals transmitted for calibration and at the same power level as typical signal transmissions, and hence are better suited to capture and calibrate the distortions introduced by transmit/receive circuitry.

Reciprocity Calibration via Receiver-Side Inversion

Let Terminal A transmit known reference signals over a subset of multi-carrier tones and P be a specific reference signal at one of these tones. For example, Terminal A may use every Mth subcarrier for reference signal transmission, where M is an integer. For example, M may be 8 or 16 in practical systems. Terminal B receives $$Y_B = H_{AB} \cdot P + W \qquad (60)$$

where W is additive white Gaussian noise with zero mean and variance $N_0$. Note that the above equation is a scalar equation because the equation represents the received signal at a single subcarrier. For each subcarrier on which a reference is transmitted, there will be one such equation. Terminal B estimates $H_{AB}$ from $Y_B$ and inverts it. To avoid singularities and cope with a large dynamic range, regularized zero forcing may be used to compute the inversion:

$$\tilde{H}_{AB}^{-1} = \frac{H_{AB}^*}{H_{AB}^* \cdot H_{AB} + N_0} \approx H_{AB}^{-1} \qquad (61)$$

Terminal B then transmits $\tilde{H}_{AB}^{-1}$ back to terminal A over the same tone. This transmission should quickly follow the first one—especially in the presence of Doppler—to ensure $H^{CH}$ remains relatively constant. Terminal A then receives $$Y_B = H_{BA} \cdot \tilde{H}_{AB}^{-1} + W \qquad (62)$$

Ignoring the noise term, which may be averaged out over multiple transmissions, it can be seen that $Y_B$ is the inverse of the reciprocity calibration factor:

$$Y_B \approx \frac{H_B^{TX} \cdot H^{CH} \cdot H_A^{RX}}{H_A^{TX} \cdot H^{CH} \cdot H_B^{RX}} = \frac{H_B^{TX} \cdot H_A^{RX}}{H_A^{TX} \cdot H_B^{RX}} = \alpha^{-1} \qquad (63)$$

Since these are scalar values, the inversion processing is for both $H_{AB}$ and $Y_B$ is straightforward. Here, the inverse reciprocity calibration factor represents a ratio of circuitry channel from Terminal B to Terminal A, and a circuitry channel from Terminal A to Terminal B.

In multi-carrier systems, the above-described procedure may be repeated over multiple tones and the result interpolated to yield the full set of calibration factors over the bandwidth of interest. This full set may be obtained, for example, by averaging or interpolating the calibration factors are the subcarriers at which reference signals were transmitted. Since the Tx and Rx contributions of both terminal A and B will be relatively flat across frequency, it should be possible to use a sparse subgrid of tones with the appropriate interpolation to obtain an accurate level of calibration.

The results of the channel estimation as above may be combined with channel estimation of the $H^{CH}$ channel to obtain an estimate of the overall channel $H_{AB}$ and $H_{BA}$.

14.4 Examples of Reciprocal Geometric Precoding

Embodiments of the disclosed technology include a method for applying MU-MIMO (Multi-User Multiple-In-Multiple-Out) in a wireless system. In MU-MIMO, a transmitter with multiple antennas (typically a cellular base-station) is transmitting to multiple independent devices (also referred to as UE—User Equipment), each having one or more receiving antennas, on the same time and frequency resources. To enable a receiving device to correctly decode its own targeted data, a precoder is applied to the transmitted signal, which typically tries to maximize the desired received signal level at the receiving device and minimize the interference from transmissions targeted to other devices. In other words, maximize the SINR (Signal to Interference and Noise Ratio) at each receiving device. The transmitted signal is arranged in layers, where each layer carries data to a specific user device.

Figure 57:
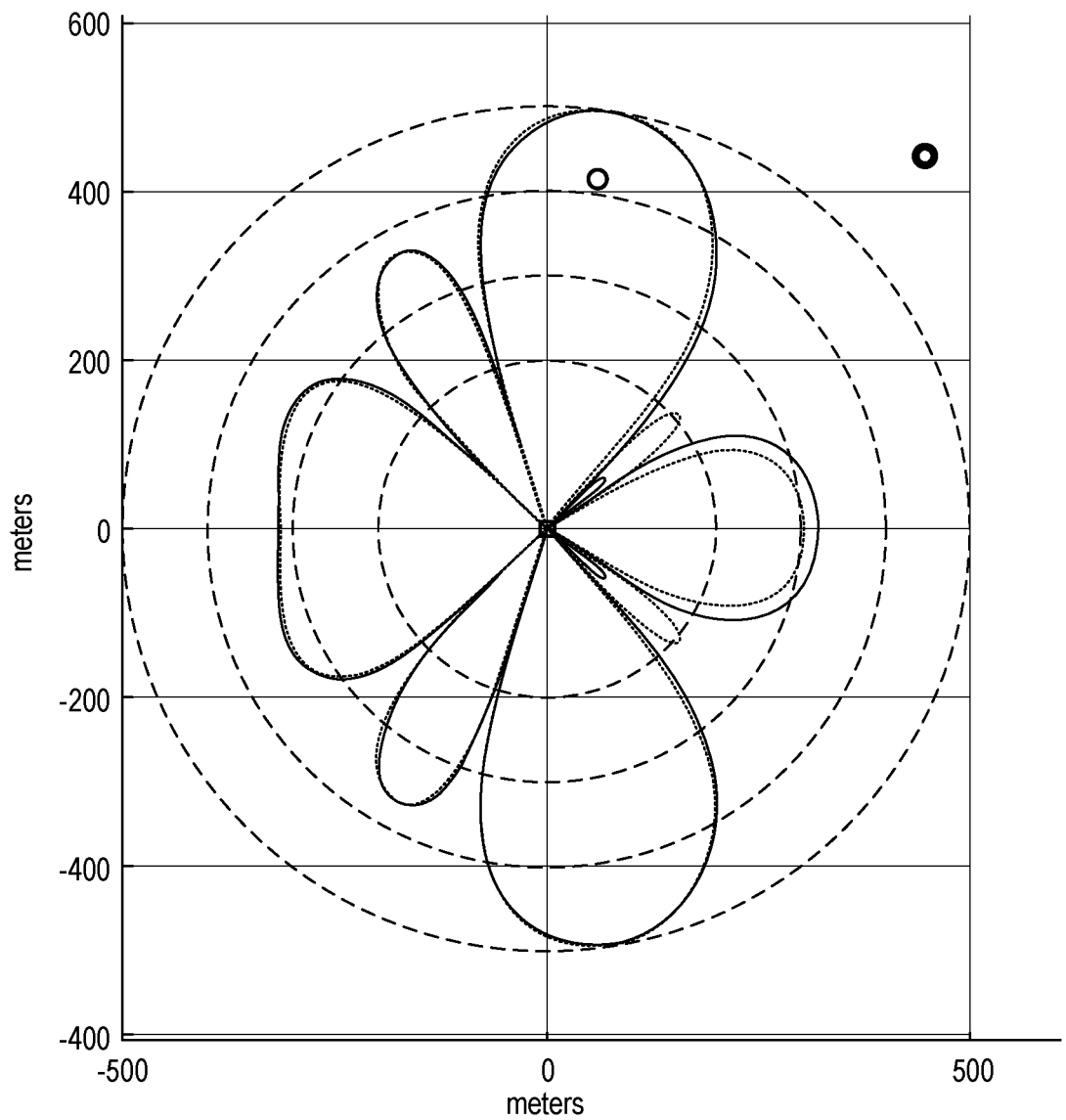
FIG. 57 shows an example transmission pattern using precoding in a communication network.

A spatial precoder is a precoder that operates in the spatial domain by applying in each layer different weights and phases to the transmission of each antenna. This shapes the wave-front of the transmitted signal and drives more of its energy towards the targeted device, while minimizing the amount of energy that is sent towards other devices. FIG. 57 shows an example of a spatial precoder.

To simplify the following description, without any loss of generality, the downlink transmitting device is referred to as the base-station (BS) and the downlink receiving device is referred to as the UE (see, for example, FIG. 1).

Codebook-Based Precoding

In this technique there is a predefined set of known precoders, available for both BS and UE. Upon receiving a precoded transmission, a UE may blindly assume that each one of the precoders was used and try to decode the received signal accordingly. This method is not very efficient, especially when the codebook is large. Another approach is based on feedback. The UE analyzes a reception of a known reference signal by computationally applying different precoders from the codebook. The UE selects the precoder that maximizes its received SINR and sends a feedback to the BS, which one is the preferable precoder.

In some implementations, this technique has the following limitations:
(1) The codebook has a limited number of entries and therefore, may not have a good enough spatial resolution to optimally address all the cases of the targeted UE. Also, the computational complexity at the UE, grows when this codebook is large.
(2) Each UE selects the best precoder for itself, however, this precoder may not be optimal for other UEs. To address that, the BS needs to carefully selects the set of UE for each precoded transmission, in such a way, that their precoders are as orthogonal as possible. This imposes a heavy constraint on the scheduler at the BS, especially in scenarios with a large number of layers.

Precoding Based on Explicit Feedback

From the dirty paper coding theorem, we can derive that if all the channels from the BS antennas to the receiving UE antennas are known, we can optimally precode the transmission to all UE. The implementation of such a precoding scheme in a real system, is challenging and may require that the UE will send feedback to the BS on the received downlink channel. When the UE or any of the wireless channel reflectors are mobile, the feedback of the channel response may no longer represent the state of the channel, at the time the precoder is applied and prediction may also be required. Note, that this precoder, in some sense, tries to invert the channel.

Reciprocal Geometric Precoding

A wireless channel is a super-position of reflections. A geometric precoder is based on the geometry of these reflectors. This geometry tends to change relatively slow comparing to typical communication time scales. For example, considering the spatial domain, the Angle of Arrival (AoA) of the rays from the wireless reflectors (or directly from the UE) to the BS antennas, will be relatively constant in a time scale of tens of milliseconds and frequency independent. This is unlike the channel state, which is time and frequency dependent. The reciprocal property of the wireless channel allows us to use information about the channel obtained from uplink transmissions (UE to BS) for downlink precoded transmissions (BS to UE).

The geometric precoder, projects the transmission of each layer into a subspace, which is spanned by the reflectors of a specific user and orthogonal as much as possible to the reflectors of other layers. This subspace is time and frequency independent and relies solely on the geometry of the channel. The channel geometry is captured by means of a covariance matrix. The proposed technique may use uplink reference signals to compute the channel response at each one of the BS receiving antennas and the covariance matrix of these measurements.

For example, in an LTE/5G NR system, the BS may use the uplink Sounding Reference Signals (SRS) transmitted by a UE, or the uplink Demodulation Reference Signals (DMRS) to compute the channel response at different time and frequency resource elements and from them compute the spatial covariance matrix.

More formally, let i=1, . . . , K be a user (or layer) index and L represent the number of BS antennas. Let $H_i(f, t)$ be a complex column vector, representing the channel response at the L BS antennas, at time t=1, . . . , $N_t$ and frequency f=1, . . . , $N_f$. Note, that $N_t$ may be 1 and $N_f$ may also represent a small part of the used bandwidth. The L x L covariance matrix may be computed directly by $$R_i = \frac{1}{N_f \cdot N_t} \sum_{f,t} H_i(f, t) \cdot H_i^H(f, t)$$

Herein, $(\bullet)^H$ is the Hermitian operator, or indirectly using techniques like maximum likelihood (e.g., a Toeplitz maximum likelihood technique).

Finding the Vector Space

Let K represent the number of users for the precoded transmission and $R_i$ their uplink spatial covariance matrices. Let's also assume some normalized uplink power allocation for each user, denoted by $q_i \geq 0$ and satisfying, $\Sigma_{i=1}^K q_i=1$.

The optimal uplink vector space, $V\_i^*$, that spans the desired channels from the user to the BS and orthogonal to the channels from the other users, is the one that maximizes the SINR at the BS:

$$V_i^* = \underset{V_i}{\text{argmax}} \left\{ \frac{q_i V_i^H R_i V_i}{\Sigma_{j \neq i} q_j V_i^H R_j V_i + N_0} \right\}$$

Herein, the enumerator term is the signal and the denominator terms are the interference and the additive noise variance.

Herein, $V_i^*$ can be directly computed as the maximum eigenvector of the following uplink SINR matrix:

$$\text{SINR}_i^{(UL)} = (\Sigma_{j \neq i} q_j R_j + N_0 I)^{-1} \cdot q_i R_i$$

Downlink Duality

Due to the reciprocal property of the wireless channel, the same vector space computed for the uplink can be used for downlink precoding as well. Therefore, by using just uplink reference signals, we can obtain the optimal vector space for the downlink. This is in contrasts to the explicit feedback method, which required actual channel state information of the downlink to be transmitted as data in the uplink, or the codebook-based precoding approach, which requires feedback of the selected precoder.

However, the selected uplink power allocation is not dual and therefore not optimal for the downlink. In the uplink, the BS receives, per layer, different channels and projects them all into a single vector space, whereas in the downlink the UE receives on the same channel, transmissions on different vector spaces.

In can be mathematically proven, that there exists a dual power allocation, $p_i \geq 0$ for the downlink, satisfying $\Sigma_{i=1}^K p_i = 1$, that can achieve the same SINR as the uplink:

$$SINR_i^{\star(UL)} = \frac{q_i V_i^{\star H} R_i V_i^\star}{\Sigma_{j \neq i} q_j V_i^{\star H} R_j V_i^\star + N_0} = \frac{p_i V_i^{\star H} R_i V_i^\star}{\Sigma_{j \neq i} p_j V_j^{\star H} R_i V_j^\star + N_0} = SINR_i^{\star(DL)}$$

Downlink Power Allocation

To compute the dual downlink power allocation, we define a user cross-interference matrix, $A_{K \times K}^{(DL)}$, with entries $$A_{i,j}^{(DL)} = \begin{cases} SINR_i^{\star(UL)} \cdot \dfrac{N_0}{V_i^{\star H} R_i V_i^\star} & i = j \\ SINR_i^{\star(UL)} \cdot \dfrac{(V_j^{\star H} R_i V_j^\star + N_0)}{V_i^{\star H} R_i V_i^\star} & i \neq j \end{cases}$$

Herein, i, j=1, . . . , K. Note, that a dual cross-interference matrix can be computed for the uplink as well.

It can be mathematically proven that the optimal power allocation for the downlink is derived from the normalized absolute value of the elements of the maximum eigenvector of $A^{(DL)}$, denoted by $V_{A^{(DL)}}$:

$$p_i = \frac{|V_{A^{(DL)}}(i)|}{\Sigma_i |V_{A^{(DL)}}(i)|}$$

Note, that this power allocation is statistically targeting equal SINR at each receiving UE. However, when scheduling users, a BS may adjust this power allocation to allow different SINRs for different UE, according to their downlink traffic requirements.

Precoder

The precoder for user i is computed as $$P_i = p_i \cdot \text{conj}(V_i^*)$$

Examples of Reference Signals

This precoder, which projects the transmitted signal into different vector spaces, does not "invert" the channel and the UE must equalize the channel. Therefore, the UE must receive precoded reference signals as well along with the precoded data. The reference signals may be one of the conventional reference signals, such as a demodulation reference signal or a sounding reference signal. Alternatively, or in addition, a new reference signal may be used for facilitating the computations described herein.

Scheduling

When the number of available users for precoded downlink transmission is larger than K, the BS may want to specifically select K users that are spatially separated as much as possible. The BS may use the spatial covariance matrices, $R_i$, to determine this set of users.

Example Procedure

Figure 58:
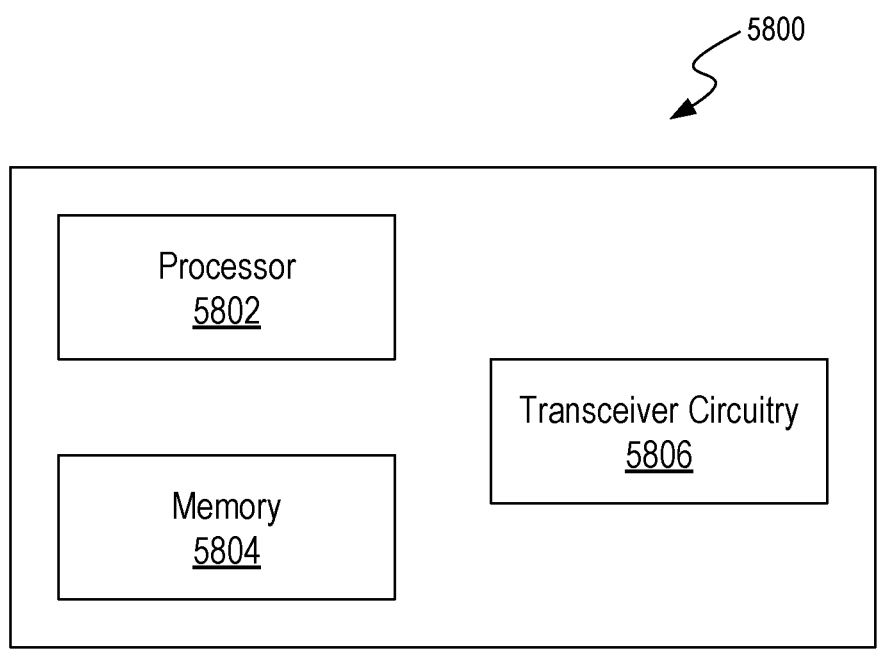
FIG. 58 shows an example of a hardware platform.

One example procedure for computing a reciprocal geometric precoder is as follows:
(1) Choose an uplink power allocation (may be simply a uniform allocation, $q_i=1/K$).
(2) For each user i, receive uplink reference signals and compute channel response $H_i(f, t)$
(3) For each user i, from the received channel response, compute covariance matrix $R_i$
(4) For each user i, compute uplink SINR matrix, $SINR_i^{(UL)}$, and find its maximum eigenvector $V_i^*$
(5) Compute downlink user cross-interference matrix, $A^{(DL)}$ and find its maximum eigenvector $V_A^{(DL)}$
(6) For each user i, compute downlink power allocation, $p_i$ from $V_A^{(DL)}$
(7) For each user i, compute geometric precoder $P_i$ from $p_i$ and $V_i^*$ 15. Examples of Embodiments of the Disclosed Technology FIG. 58 is a block diagram representation of a wireless hardware platform 5800 which may be used to implement the various methods described in the present document. The hardware platform 5800 may be incorporated within a base station or a user device. The hardware platform 5800 includes a processor 5802, a memory 5804 and a transceiver circuitry 5806. The processor may execute instructions, e. g., by reading from the memory 5804, and control the operation of the transceiver circuitry 5806 and the hardware platform 5800 to perform the methods described herein. In some embodiments, the memory 5804 and/or the transceiver circuitry 5806 may be partially or completely contained within the processor 5802 (e.g., same semiconductor package).

The following examples highlight some embodiments that use one or more of the techniques described herein.

The following solutions may be used for UE side antenna calibration.

Figure 59:
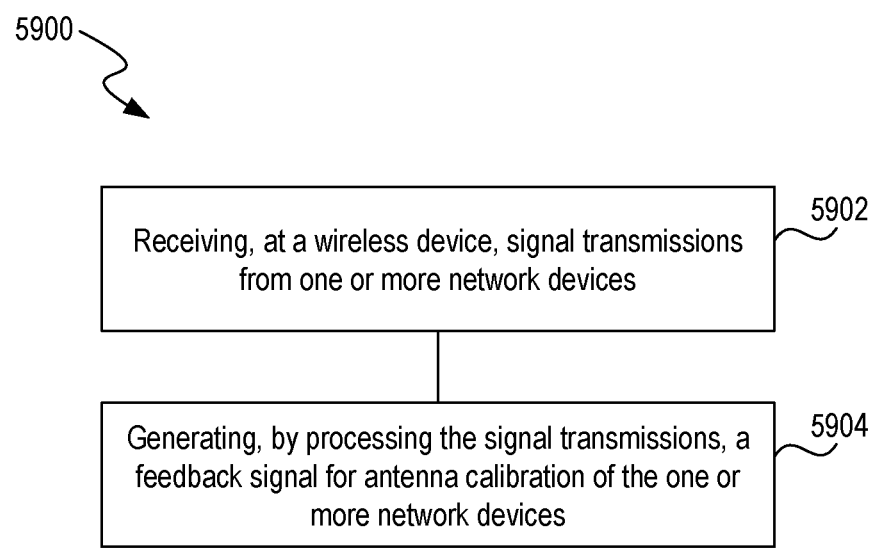
FIGS. 59 to 62 are flowcharts for various example methods of wireless communication.

1. A method of wireless communication (e.g., method 5900 depicted in FIG. 59), comprising: receiving (5902), at a wireless device, signal transmissions from one or more network devices; and generating, by processing (5904) the signal transmissions, a feedback signal for antenna calibration of the one or more network devices.

2. The method of solution 1, further including: receiving a schedule from one of the one or more network devices, wherein the schedule is determined based on the feedback signal; and performing a communication according to the schedule.

3. The method of solution 1, wherein the feedback signal includes a power estimate, a channel quality estimate, a phase estimate or a rank estimate.

The following solutions may be used for network-side antenna calibration.

Figure 60:
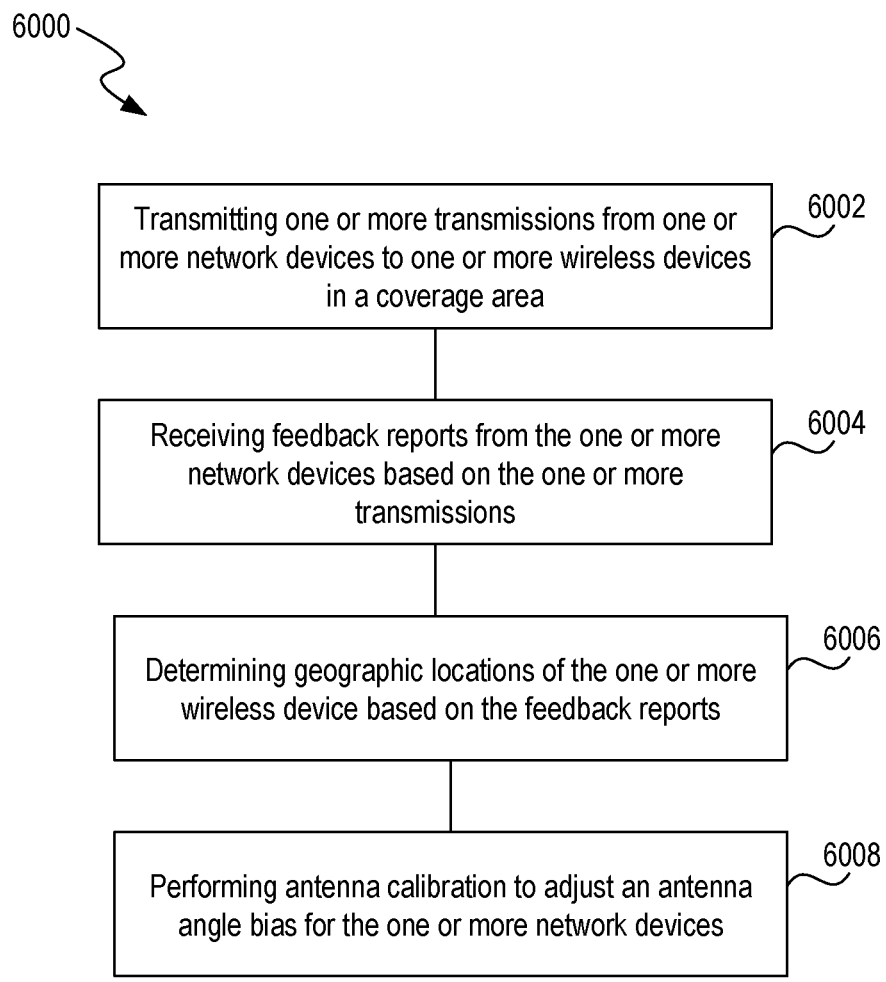

4. A method of wireless communications (e.g., method 6000 depicted in FIG. 60), comprising: transmitting (6002) one or more transmissions from one or more network devices to one or more wireless devices in a coverage area; receiving (6004) feedback reports from the one or more network devices based on the one or more transmissions; determining (6006) geographic locations of the one or more wireless device based on the feedback reports; and performing (6008) antenna calibration to adjust an antenna angle bias for the one or more network devices.

5. The method of solution 4, further including: associating, with each wireless device, a corresponding channel quality estimate based on the feedback report.

6. The method of solution 4, including: generating a feature map for the coverage area by associating, with the geographic locations, corresponding one or more channel quality parameters based on measurements performed on the feedback reports.

7. The method of solution 6, including: using the feature map for grouping wireless devices according to similarities in the one or more channel quality parameters; and scheduling transmissions in the coverage area according to the grouping.

In the above solutions, a frequency diverse reference signal may be used to achieve robust antenna calibration. The frequency diverse reference signal may be designed to cover all frequencies of a frequency band on a subcarrier basis such that over a period of time the entire band is covered.

The following solutions may be implemented by a network device for localization and feature mapping.

Figure 61:
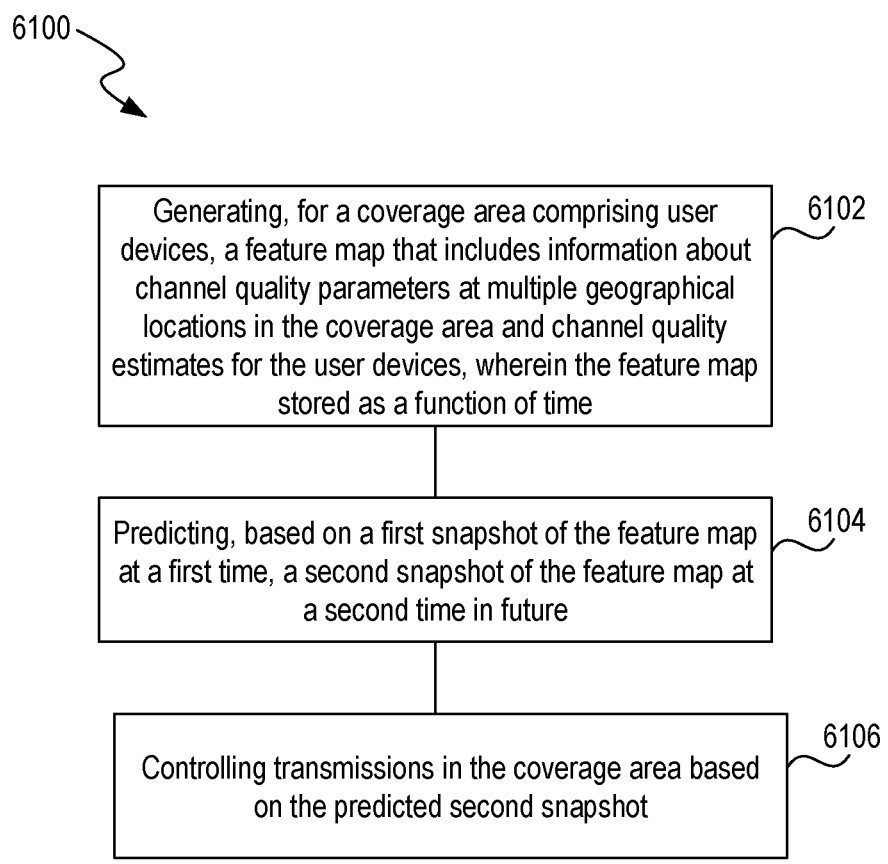

8. A method of wireless communication (e.g., method 6100 depicted in FIG. 61), comprising: generating (6102), for a coverage area comprising user devices, a feature map that includes information about channel quality parameters at multiple geographical locations in the coverage area and channel quality estimates for the user devices, wherein the feature map stored as a function of time; predicting (6104), based on a first snapshot of the feature map at a first time, a second snapshot of the feature map at a second time in future; and controlling (6106) transmissions in the coverage area based on the predicted second snapshot.

9. The method of solution 8, wherein the coverage area is served by at least three base stations and wherein the multiple geographical locations are determined using a triangulation process based on signals received from or at the at least three base stations.

10. The method of any of solutions 8-9, wherein the first snapshot is generated based on measurements in a first frequency band and the second snapshot of the feature map is in a second frequency band different from the first frequency band.

The prediction of the second snapshot may be performed using a channel prediction technique such as described in Section 14.

The following solutions may be implemented by a network device for estimating pose of a user device.

Figure 62:
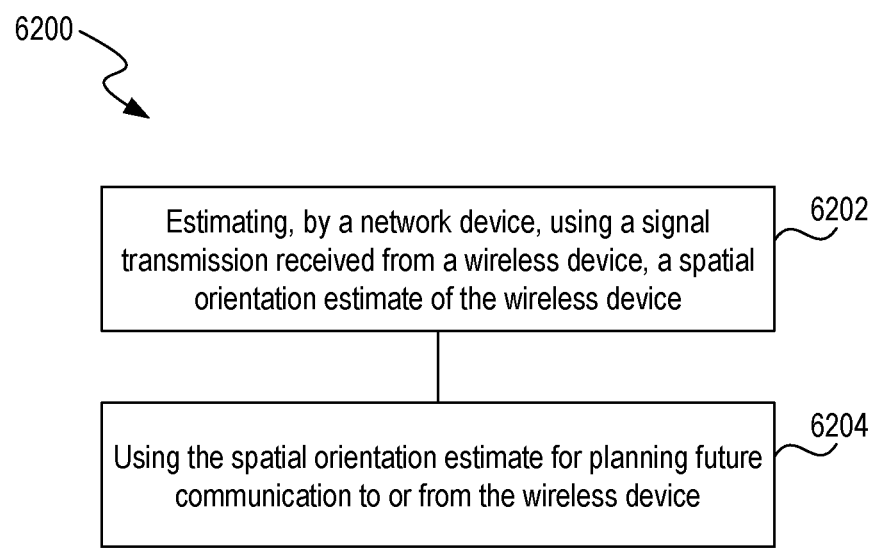

11. A method of wireless communication (e.g., method 3200 depicted in FIG. 62), comprising: estimating (6202), by a network device, using a signal transmission received from a wireless device, a spatial orientation estimate of the wireless device; and using (6204) the spatial orientation estimate for planning future communication to or from the wireless device.

12. The method of solution 11, further including: determining a device trajectory for the wireless device based on multiple spatial orientation estimates estimated at multiple time instances in a time period.

13. The method of solution 12, further including: making the device trajectory available to external devices via an application programmer's interface.
14. The method of solution 11, wherein the planning the future communication includes determining a group that the wireless device belongs to or a rank used for communication to or from the wireless device or a precoding scheme used for transmissions to or from the wireless device.
15. A wireless communication apparatus comprising a processor and a transceiver, wherein the processor is configured to perform a method recited in any one or more of above solutions.
16. A system comprising a plurality of wireless communication apparatus, each apparatus comprising one or more processors, configured to implement a method recited in any one or more of above solutions.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:
1. A method of wireless communications, comprising:
    transmitting one or more transmissions from one or more network devices to one or more wireless devices in a coverage area;
    receiving feedback reports from the one or more network devices based on the one or more transmissions;
    determining geographic locations of the one or more wireless devices based on the feedback reports;
    performing antenna calibration to adjust an antenna angle bias at the one or more network devices;
    estimating, using signals transmission received from the one or more wireless devices, spatial orientation estimates of the one or more wireless devices; and
    using the spatial orientation estimates for planning a future communication to or from the one or more wireless devices.

2. The method of claim 1, further comprising:
associating, with each wireless device of the one or more wireless devices, a corresponding channel quality estimate based on the feedback reports.

3. The method of claim 1, further comprising:
generating a feature map for the coverage area by associating, with the geographic locations, corresponding one or more channel quality parameters based on measurements performed on the feedback reports.

4. The method of claim 3, further comprising:
using the feature map for grouping the one or more wireless devices according to similarities in the corresponding one or more channel quality parameters; and
scheduling transmissions in the coverage area according to the grouping.

5. The method of claim 4, wherein the feature map that includes information about channel quality parameters at multiple geographical locations in the coverage area and channel quality estimates for the one or more wireless devices, wherein the feature map stored as a function of time; the method further comprising:
predicting, based on a first snapshot of the feature map at a first time, a second snapshot of the feature map at a second time in future; and
controlling transmissions in the coverage area based on the second snapshot.

6. The method of claim 5, wherein the coverage area is served by at least three base stations and wherein the multiple geographical locations are determined using a triangulation process based on signals received from or at the at least three base stations.

7. The method of claim 6, wherein the first snapshot of the feature map is generated based on measurements in a first frequency band and the second snapshot of the feature map is in a second frequency band different from the first frequency band.

8. The method of claim 1, further comprising:
determining a device trajectory for a wireless device of the one or more wireless devices based on multiple spatial orientation estimates estimated at multiple time instances in a time period.

9. The method of claim 8, further comprising:
making the device trajectory available to external devices via an application programmer's interface.

10. The method of claim 1, wherein the planning the future communication includes determining a group that a wireless device of the one or more wireless devices belongs to or a rank used for communication to or from the wireless device or a precoding scheme used for transmissions to or from the wireless device.

11. An apparatus comprising one or more processors configured to cause the apparatus to:
receive feedback reports from one or more network devices based on one or more transmissions from one or more wireless devices in a coverage area;
determine geographic locations of the one or more wireless devices based on the feedback reports;
perform antenna calibration to adjust an antenna angle bias at the one or more network devices;
estimate, using signals transmission received from the one or more wireless devices, spatial orientation estimates of the one or more wireless devices; and
use the spatial orientation estimates for planning a future communication to or from the one or more wireless devices.

12. The apparatus of claim 11, wherein the one or more processors are further configured to:
associate, with each wireless device of the one or more wireless devices, a corresponding channel quality estimate based on the feedback reports.

13. The apparatus of claim 11, wherein the one or more processors are further configured to:
generate a feature map for the coverage area by associating, with the geographic locations, corresponding one or more channel quality parameters based on measurements performed on the feedback reports.

14. The apparatus of claim 13, wherein the one or more processors are further configured to:
use the feature map for grouping the one or more wireless devices according to similarities in the corresponding one or more channel quality parameters; and
schedule transmissions in the coverage area according to the grouping.

15. The apparatus of claim 14, wherein the feature map that includes information about channel quality parameters at multiple geographical locations in the coverage area and channel quality estimates for the one or more wireless devices, wherein the feature map stored as a function of time, and wherein the one or more processors are further configured to:
predict, based on a first snapshot of the feature map at a first time, a second snapshot of the feature map at a second time in future; and
control transmissions in the coverage area based on the second snapshot.

16. The apparatus of claim 15, wherein the coverage area is served by at least three base stations and wherein the multiple geographical locations are determined using a triangulation process based on signals received from or at the at least three base stations.

17. The apparatus of claim 16, wherein the first snapshot of the feature map is generated based on measurements in a first frequency band and the second snapshot of the feature map is in a second frequency band different from the first frequency band.

18. The apparatus of claim 11, wherein the one or more processors are further configured to:
determine a device trajectory for a wireless device of the one or more wireless devices based on multiple spatial orientation estimates estimated at multiple time instances in a time period.

19. The apparatus of claim 18, wherein the one or more processors are further configured to:
make the device trajectory available to external devices via an application programmer's interface.

20. The apparatus of claim 11, wherein the planning the future communication includes determining a group that a wireless device of the one or more wireless devices belongs to or a rank used for communication to or from the wireless device or a precoding scheme used for transmissions to or from the wireless device.

* * * * *

UNITED STATES PATENT AND TRADEMARK OFFICE
CERTIFICATE OF CORRECTION

PATENT NO. : 12,101,145 B2　　　　　　　　　　　　　　　　　　　　　　　　Page 1 of 1
APPLICATION NO. : 18/006470
DATED : September 24, 2024
INVENTOR(S) : Ronny Hadani et al.

It is certified that error appears in the above-identified patent and that said Letters Patent is hereby corrected as shown below:

In the Specification

In Column 34, Line 46, delete "$R_{HH}^{(u)}=(H^{(u)}))^H H^{(u)}$," and insert $$R_{HH}^{(u)} = \left(H^{(u)}\right)^H H^{(u)},$$

In Column 35, Line 48, delete "u E U," and insert -- $u \in U$, --

In Column 35, Line 50, delete "$R_{YY}=E_{u\in U} R_{YY}^{(u)}$" and insert -- $R_{YY} = \sum_{u \in U} R_{YY}^{(u)}$ --

In Column 37, Line 9, delete "$H_{future}^{(u)} = \tilde{V}^{(u)} \cdot H_{K,future}^{(u)}$" and insert $$H_{future}^{(u)} = \tilde{V}^{(u)} \cdot H_{K,future}^{(u)}$$

In Column 38, Line 16, delete "$CT_{X,A}$." and insert -- $C_{TX,A}$. --

In Column 38, Line 17, delete "$H_{AB}=\lambda H_{AB}^T$" and insert -- $H_{AB} = \lambda H_{BA}^T$ --

In Column 40, Line 62, delete "$\acute{H}_{AB}$" and insert -- $\tilde{H}_{AB}$ --

Signed and Sealed this
Nineteenth Day of November, 2024

Katherine Kelly Vidal
*Director of the United States Patent and Trademark Office*